(12) United States Patent
Akbarzadeh et al.

(10) Patent No.: US 12,416,714 B2
(45) Date of Patent: Sep. 16, 2025

(54) SENSOR DATA POINT CLOUD GENERATION FOR MAP CREATION AND LOCALIZATION FOR AUTONOMOUS SYSTEMS AND APPLICATIONS

(71) Applicant: NVIDIA CORPORATION, Santa Clara, CA (US)

(72) Inventors: Amir Akbarzadeh, San Jose, CA (US); Andrew Carley, Kenmore, WA (US); Birgit Henke, Seattle, WA (US); Si Lu, San Jose, CA (US); Ivana Stojanovic, Oakland, CA (US); Jugnu Agrawal, San Jose, CA (US); Michael Kroepfl, Kirkland, WA (US); Yu Sheng, San Diego, CA (US); David Nister, Bellevue, WA (US); Enliang Zheng, Redmond, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 665 days.

(21) Appl. No.: 17/655,781

(22) Filed: Mar. 21, 2022

(65) Prior Publication Data
US 2023/0296758 A1 Sep. 21, 2023

Related U.S. Application Data

(60) Provisional application No. 63/269,602, filed on Mar. 18, 2022.

(51) Int. Cl.
*G01S 13/04* (2006.01)
*B60W 40/10* (2012.01)
(Continued)

(52) U.S. Cl.
CPC ............ *G01S 13/04* (2013.01); *B60W 40/10* (2013.01); *B60W 40/12* (2013.01);
(Continued)

(58) Field of Classification Search
CPC . G01S 13/04; G01S 7/003; G01S 7/40; G01S 13/86; G01S 13/89; G01S 13/931;
(Continued)

(56) References Cited

U.S. PATENT DOCUMENTS 10,816,654 B2 * 10/2020 Rohani ................. G01S 13/876
2019/0266779 A1 * 8/2019 Kulkarni ................. G06T 15/04
(Continued)

OTHER PUBLICATIONS

Qian, K., He, Z., & Zhang, X. (2020). 3D point cloud generation with millimeter-wave radar. Proceedings of the ACM on Interactive, Mobile, Wearable and Ubiquitous Technologies, 4(4), 1-23. (Year: 2020).*

*Primary Examiner* — Gregory A Morse
*Assistant Examiner* — Renae A Bitor
(74) *Attorney, Agent, or Firm* — Maschoff Brennan

(57) ABSTRACT

Embodiments of the present disclosure relate to generating RADAR (RAdio Detection And Ranging) point clouds based on RADAR data obtained from one or more RADAR sensors disposed on one or more ego-machines. In these or other embodiments, the RADAR point clouds may be used to generate map data. Additionally or alternatively, the RADAR point clouds may be used for performing localization.

19 Claims, 23 Drawing Sheets

(51) Int. Cl.
*B60W 40/12* (2012.01)
*B60W 60/00* (2020.01)
*G01S 7/00* (2006.01)
*G01S 7/40* (2006.01)
*G01S 13/86* (2006.01)
*G01S 13/89* (2006.01)
*G01S 13/931* (2020.01)
*G01S 17/04* (2020.01)
*G01S 17/931* (2020.01)
*G06T 7/73* (2017.01)
*G06V 10/26* (2022.01)
*G06V 10/28* (2022.01)

(52) U.S. Cl.
CPC .......... *B60W 60/001* (2020.02); *G01S 7/003* (2013.01); *G01S 7/40* (2013.01); *G01S 13/86* (2013.01); *G01S 13/89* (2013.01); *G01S 13/931* (2013.01); *G01S 17/04* (2020.01); *G01S 17/931* (2020.01); *G06T 7/73* (2017.01); *G06V 10/26* (2022.01); *G06V 10/28* (2022.01); *B60W 2420/408* (2024.01); *G01S 2013/9316* (2020.01); *G06T 2207/10044* (2013.01); *G06T 2207/30252* (2013.01)

(58) Field of Classification Search
CPC .................. G01S 17/04; G01S 17/931; G01S 2013/9316; G01S 2013/93185; G01S 2013/93272; G01S 15/931; G01S 13/862; G01S 13/865; G01S 13/867; G01S 17/89; G01S 17/894; G01S 2013/9318; G01S 2013/9319; G01S 2013/932; G01S 2013/9323; G01S 2013/93271; G01S 13/881; G01S 13/874; B60W 40/10; B60W 40/12; B60W 60/001; B60W 2420/408; G06T 7/73; G06T 2207/10044; G06T 2207/30252; G06V 10/26; G06V 10/28; G06V 10/82; G06V 20/58
See application file for complete search history.

(56) References Cited

U.S. PATENT DOCUMENTS

| | | | |
|---|---|---|---|
| 2021/0005016 A1* | 1/2021 | Oh | G06T 9/001 |
| 2021/0063198 A1* | 3/2021 | Nister | G06N 3/045 |
| 2021/0141093 A1* | 5/2021 | Kim | G05D 1/0231 |
| 2023/0186642 A1* | 6/2023 | Chang | G06T 7/337 |
| | | | 382/181 |
| 2023/0194269 A1* | 6/2023 | Sakr | G01C 21/3867 |
| | | | 701/400 |
| 2024/0192355 A1* | 6/2024 | Zhang | G01S 7/2883 |

* cited by examiner

US 12,416,714 B2

SENSOR DATA POINT CLOUD GENERATION FOR MAP CREATION AND LOCALIZATION FOR AUTONOMOUS SYSTEMS AND APPLICATIONS

RELATED APPLICATION

This application claims priority to U.S. Provisional Patent Application No. 63/269,602, filed Mar. 18, 2022, and titled "SENSOR DATA BASED MAP CREATION AND LOCALIZATION FOR AUTONOMOUS SYSTEMS AND APPLICATIONS." the entire contents of which are incorporated by reference in the present disclosure.

BACKGROUND

Vehicles, robots, and other machines may include sensors disposed thereon that may obtain corresponding sensor data. For example, the sensors may include RADAR (RAdio Detection And Ranging) sensors, and/or LIDAR (LIght Detection And Ranging) sensors that may respectively be configured to obtain RADAR data and/or LIDAR data.

SUMMARY

One or more embodiments of the present disclosure relate to generation of map data based on sensor data, particularly sensor data captured and/or generated using one or more sensors disposed or otherwise corresponding to vehicles, robots, robotic platforms, and other machines capable of autonomous or semi-autonomous operation (collectively, "ego-machines"). Additionally or alternatively, one or more embodiments of the present disclosure relate to performing localization based on the sensor data.

For example, one or more embodiments may relate to generating RADAR (RAdio Detection And Ranging) point clouds based on RADAR data obtained from one or more RADAR sensors disposed on one or more ego-machines. In these or other embodiments, the RADAR point clouds may be used to generate map data. Additionally or alternatively, the RADAR point clouds may be used for performing localization.

BRIEF DESCRIPTION OF THE DRAWINGS

The present systems and methods for sensor data processing are described in detail below with reference to the attached drawing figures, wherein.

DETAILED DESCRIPTION

Figure 1A:
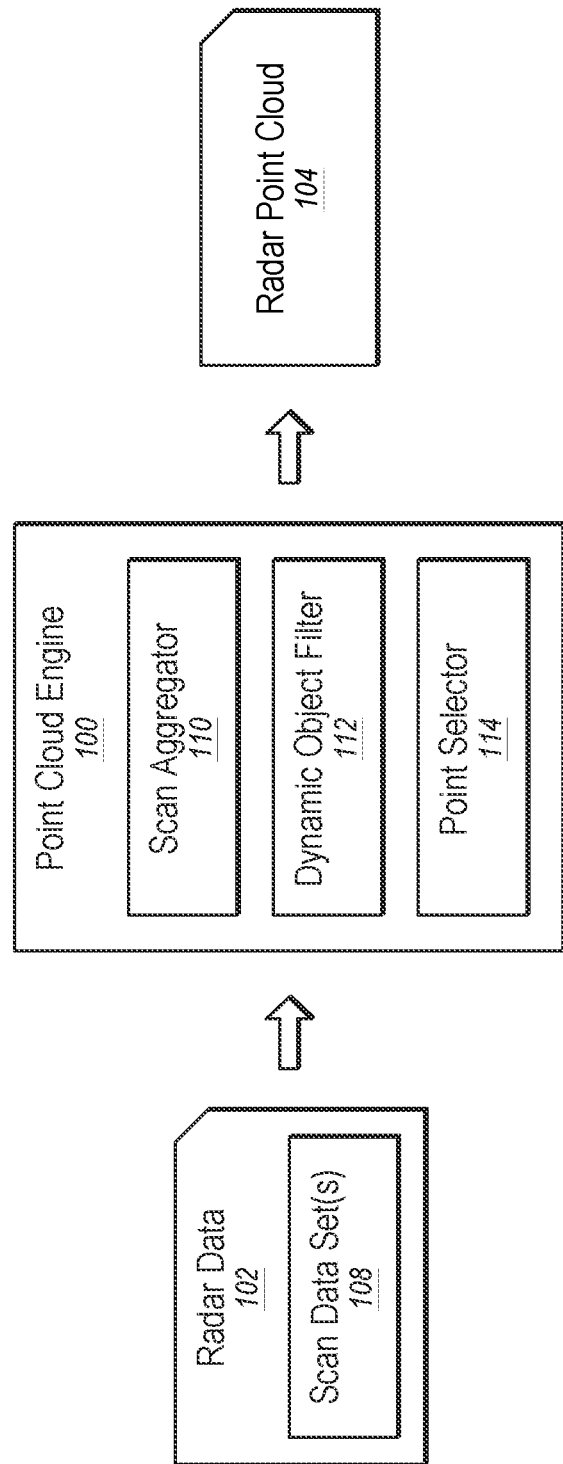
FIG. 1A illustrates an example point cloud engine configured to perform operations with respect to RADAR data to generate a RADAR point cloud, in accordance with one or more embodiments of the present disclosure.

According to one or more embodiments of the present disclosure, sensor data (e.g., RADAR (RAdio Detection And Range) data and/or LIDAR (LIght Detection And Range) data, etc.) acquired by sensors (e.g., RADAR sensors, LIDAR sensors, etc.) disposed on ego-machines may be used to generate map data (e.g., high definition (HD) map data with a precision level within 2-30 cm) of geographical regions. In the present disclosure, maps that may be generated using LIDAR data may be referred to as "LIDAR maps" and images that may be rendered using the LIDAR data may be referred to as "LIDAR images." Similarly, maps that may be generated using RADAR data may be referred to as "RADAR maps" and images that may be rendered using the RADAR data may be referred to as "RADAR images." Additionally or alternatively, localization may be performed based on the sensor data in which one or more pose parameters (e.g., the positions and/or orientations of vehicles in a geographical region) may be determined. In the present disclosure, reference to a "pose" of an ego-machine may refer to the positions and/or orientations of the ego-machine as indicated by the pose parameters.

As indicated above, in some embodiments, the sensor data may include RADAR data. According to one or more embodiments of the present disclosure, systems and/or operations may be configured to organize, process, and/or communicate RADAR data as part of map generation and/or localization operations. In these or other embodiments, the RADAR map data (e.g., RADAR data that is used to generate a RADAR map that indicates characteristics of an area as detected by RADAR signals) and/or the localization may be used by ego-machines to perform autonomous driving operations.

For example, in some embodiments and as detailed below, RADAR data obtained by ego-machines may be aggregated into RADAR point clouds. In these or other embodiments, the RADAR data (e.g., RADAR point clouds) may be compressed and communicated to a map generation system. The map generation system may be configured to generate a RADAR map of a geographical region based on the RADAR data. In these or other embodiments, currently or recently obtained RADAR data (e.g., in the form of RADAR point clouds) may be compared against RADAR map data to perform localization of ego-machines (e.g., determine one or more pose parameters of the ego-machines).

One or more embodiments of the present disclosure may be described in the context of RADAR data. However, many of the related concepts may also be applicable to other types of sensor data. As such, embodiments described with respect to RADAR data may not be limited to only RADAR data applicability.

Further, the present disclosure may be described with respect to an example autonomous vehicle, an example of which is described with respect to FIGS. 14A-14D, this is not intended to be limiting. For example, one or more of systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle, robot, or machine types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems. Further, reference in the present disclosure to an "autonomous vehicle" includes any vehicle that has the capability to perform some sort of maneuvering operation (e.g., turning, braking, accelerating, etc.) without direct control by an operator. As such, reference to "autonomous vehicles" is not limited to fully autonomous vehicles.

Further, many references included in the descriptions given are given in the context of vehicles. However, such a description is not meant to be limiting such that one or more concepts, systems, methods, operations, etc. described in the present disclosure with respect to a "vehicle" or "vehicles" may also apply to one or more different types of ego-machines where applicable.

Referring now to the figures, FIG. 1A illustrates an example point cloud engine 100 configured to perform operations with respect to RADAR data 102 to generate a RADAR point cloud 104, according to one or more embodiments of the present disclosure. The description given below is with respect to generation of a single RADAR point cloud 104 to help ease explanation. However, the point cloud engine 100 may be configured to generate RADAR point clouds on a regular basis as new RADAR data may be obtained.

The RADAR data 102 may include information about a geographical region that is generated by one or more RADAR scans performed by one or more RADAR sensors. In some embodiments, the RADAR sensors may be disposed on a vehicle, such as described below with respect to FIGS. 14A-14D. In these or other embodiments, the RADAR data 102 may be obtained while the vehicle having the one or more RADAR sensors disposed thereon is traversing through the geographical region.

In some embodiments, the RADAR data 102 may include one or more scan data sets 108 that may each correspond to a respective RADAR scan. During respective RADAR scans, a RADAR sensor may transmit a RADAR signal into an area (e.g., a geographical region). The transmitted RADAR signal may reflect off objects to create a RADAR return signal that may be detected by the RADAR sensor. The RADAR sensor may generate a corresponding scan data set 108 based on the detected RADAR return signal. The corresponding scan data set 108 may represent the portion of the area covered by the RADAR signal of the corresponding RADAR scan, as indicated by the RADAR return signal of the RADAR signal.

In some embodiments, the scan data sets 108 may respectively include a set of RADAR data points (also referred to as "RADAR points" or "points"). In these or other embodiments, the scan data sets 108 may include respective multi-dimensional arrays that may indicate one or more properties of the respective RADAR points.

For example, in some embodiments, the multi-dimensional array may include a two-dimensional RADAR image that includes the RADAR points disposed at particular positions within the RADAR image. For example, the RADAR points may respectively include (x, y) coordinates that correspond to their respective positions in the RADAR image. The respective positions of the RADAR points in the RADAR image may correspond to respective locations in the scanned area.

In these or other embodiments, the multi-dimensional array may include other information about the respective RADAR points. For example, each respective RADAR point of one or more of the RADAR points may include, as a signal strength value, a return power value associated therewith in the multi-dimensional array. The return power value may indicate the power of the RADAR return signal that may have reflected from the location in the scanned area that corresponds to the respective RADAR point. In some embodiments, the return power may be based on radar cross section (RCS) of the object and/or reflection properties of the objects with respect to RADAR signals. Return power values may also be referred to as "RCS" values. In these or other embodiments, the RADAR image may include respective indications of the respective return power values of the respective RADAR points at the corresponding positions in the RADAR image of the respective RADAR points. For example, a color and/or brightness at the corresponding positions may indicate the return power values.

In these or other embodiments, each respective RADAR point of one or more of the RADAR points may include, as another signal strength value, a signal to noise ratio ("SNR") value associated therewith in the multi-dimensional array. The SNR value may indicate the signal to noise ratio with respect to the RADAR return signal that may have reflected from the location in the scanned area that corresponds to the respective RADAR point (e.g., the SNR may indicate a ratio of the return power to the noise). In these or other embodiments, the RADAR image may include respective indications of the respective SNR values of the respective RADAR points at the corresponding positions in the RADAR image of the respective RADAR points. For example, a color and/or brightness at the corresponding positions may indicate the SNR values.

In these or other embodiments, the multi-dimensional array may include one or more other properties that may correspond to the respective RADAR points. For example, in some embodiments, the multi-dimensional array may include one or more of: a radial velocity, azimuth velocity, elevation angle, or radius associated with each respective RADAR point of one or more of the RADAR points. In these or other embodiments, the RADAR image may provide an indication of one or more of these other properties.

The point cloud engine 100 may include code and routines configured to enable a computing system to perform one or more operations. Additionally or alternatively, the point cloud engine 100 may be implemented using hardware including one or more processors, graphical processing units (GPUs), data processing units (DPUs), microprocessors (e.g., to perform or control performance of one or more operations), field-programmable gate arrays (FPGA), and/or application-specific integrated circuits (ASICs). In some other instances, the point cloud engine 100 may be implemented using a combination of hardware and software. In the present disclosure, operations described as being performed by the point cloud engine 100 may include operations that the point cloud engine 100 may direct a corresponding system to perform.

The point cloud engine 100 may be configured to perform operations on the RADAR data 102 to generate the RADAR point cloud 104. In some embodiments, the point cloud engine 100 may include one or more of: a scan aggregator 110 ("aggregator 110"), a dynamic object filter 112, or a point selector 114.

The aggregator 110 may be configured to aggregate multiple scan data sets 108 to generate aggregated RADAR data. In some embodiments, the aggregated RADAR data may be used as the RADAR point cloud 104. Additionally or alternatively, one or more other operations may be performed with respect to the aggregated RADAR data (e.g., filtering operations such as described below) before obtaining the RADAR point cloud 104.

In some embodiments, the scan data sets 108 that may be used to generate the aggregated RADAR data may correspond to different RADAR scans obtained from different RADAR sensors disposed at different locations around the vehicle. Such a selection may be used to increase an amount of coverage by the RADAR point cloud 104 around the vehicle or control a density of the RADAR point cloud 104. In these or other embodiments, the scan data sets 108 used to generate the aggregated RADAR data may be obtained from RADAR scans performed by all of the RADAR sensors of the vehicle. Additionally or alternatively, the scan data sets 108 used to generate the aggregated RADAR data may each correspond to a single scan performed by one of each of the RADAR sensors of the vehicle, which may maximize the coverage area of the RADAR point cloud 104 around the vehicle.

In these or other embodiments, the aggregator 110 may be configured to generate a new set of aggregated RADAR data for each round of RADAR scans that may be performed by the RADAR sensors of the vehicle. For example, in a round of RADAR scans, each of the RADAR sensors may perform a scan and the aggregator 110 may aggregate the scan data sets 108 that are generated in a particular round of scans into the RADAR point cloud 104.

Figure 1B:
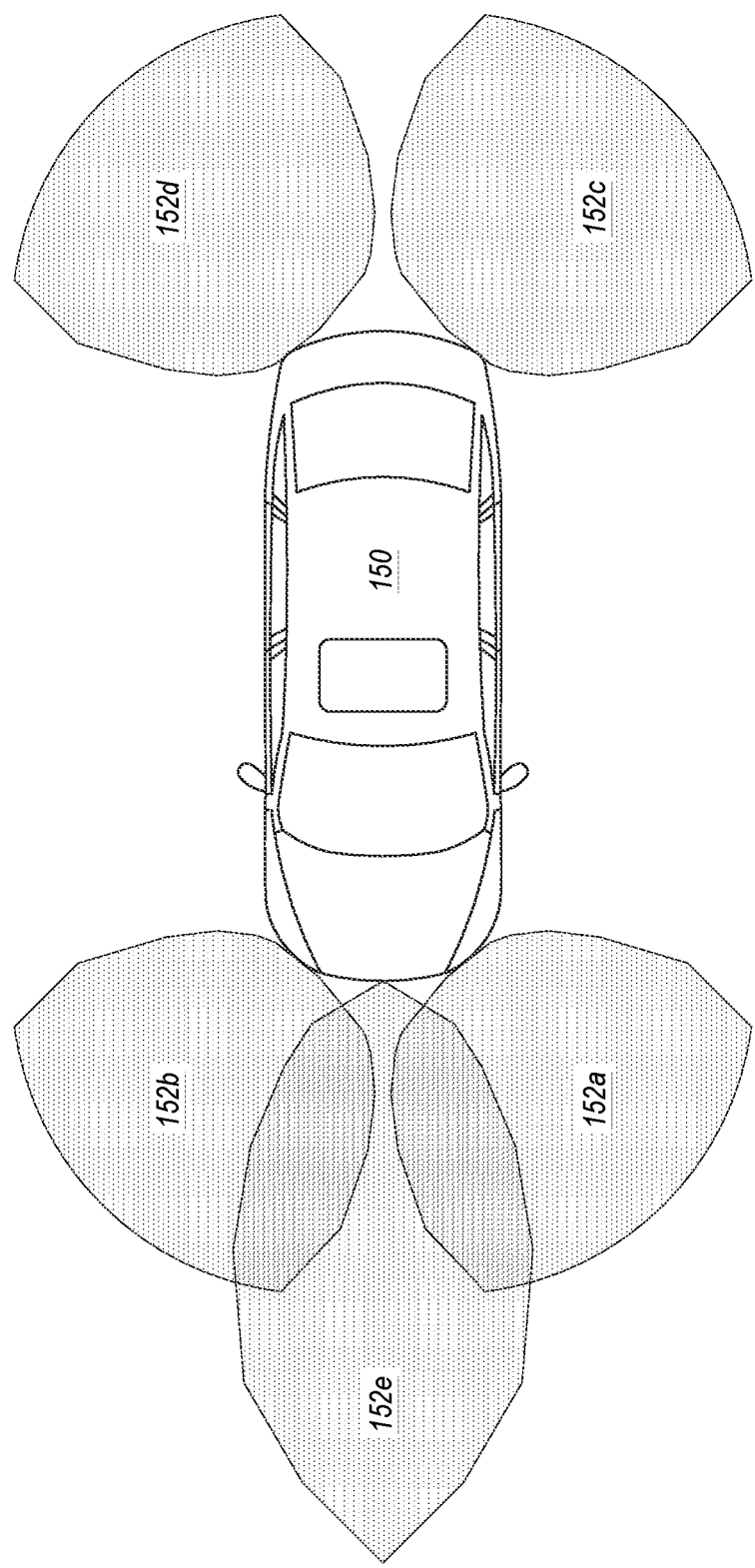
FIG. 1B illustrates example coverage areas of RADAR scans around an ego-machine, in accordance with one or more embodiments of the present disclosure.

By way of example, FIG. 1B illustrates example coverage areas of RADAR scans around a vehicle 150. The vehicle 150 may include a first RADAR sensor disposed on the front/left side area of the vehicle 150, a second RADAR sensor disposed on the front/right side area of the vehicle 150, a third RADAR sensor disposed on the rear/left side area of the vehicle 150, a fourth RADAR sensor disposed on the rear/right side area of the vehicle 150, and a fifth RADAR sensor disposed on a front/center portion of the vehicle 150. First RADAR scans performed by the first RADAR sensor may have a first coverage area 152a around a first portion of the vehicle 150, second RADAR scans performed by the second RADAR sensor may have a second coverage area 152b around a second portion of the vehicle 150, third RADAR scans performed by the third RADAR sensor may have a third coverage area 152c around a third portion of the vehicle 150, fourth RADAR scans performed by the fourth RADAR sensor may have a fourth coverage area 152d around a fourth portion of the vehicle 150, and fifth RADAR scans performed by the fifth RADAR sensor may have a fifth coverage area 152e around a fifth portion of the vehicle 150.

In reference to the vehicle 150, an example of the RADAR data 102 that may be aggregated may include: a first scan data set that is generated by a first RADAR scan performed by the first RADAR sensor, a second scan data set that is generated by a second RADAR scan performed by the second RADAR sensor, a third scan data set that is generated by a third RADAR scan performed by the third RADAR sensor, a fourth scan data set that is generated by a fourth RADAR scan performed by the fourth RADAR sensor, and a fifth scan data set that is generated by a fifth RADAR scan performed by the fifth RADAR sensor. The aggregation of the first scan data set, the second scan data set, the third scan data set, the fourth scan data set, and the fifth scan data set may accordingly be such that the coverage area around the vehicle 150 of the RADAR point cloud 104 that may be generated from the aggregated RADAR data includes all of the coverage areas 152.

FIG. 1B is merely given as an example of different coverage areas that may be covered by RADAR sensors disposed about a vehicle and is not meant to be limiting. The number, size, shape, etc. of coverage areas may vary depending on particular implementations.

Returning to FIG. 1A, in some embodiments, the aggregator 110 may be configured to perform a registration of the RADAR data 102 as part of the aggregation. For example, the positioning of the respective points of the respective scan data sets 108 of the RADAR data 102 may be based on the relative positions on the vehicle of the respective RADAR sensors that performed the corresponding RADAR scans. In some embodiments, the registration of the RADAR data 102 may include determining relative spatial transformations between the points of different scan data sets 108 based on the relative positions with respect to each of the other RADAR sensors used to generate the respective scan data sets 108. In these or other embodiments, the registration may include determining spatial transformations of the points of the scan data sets 108 with respect to a common coordinate system (e.g., a vehicle based coordinate system). Reference to a "coordinate system" in the present disclosure not only refers to a particular type of coordinate system used but also a vantage point from which the coordinate system is based.

For example, the aggregator 110 may determine spatial transformations for the points of the scan data sets 108 based the relative locations on the vehicle of the respective RADAR sensors with respect to each other and/or a location on the vehicle that corresponds to an origin of the common coordinate system. In these or other embodiments, the determined spatial transformations may be used to translate the respective points of the respective scan data sets 108 to each other and/or the common coordinate system.

Additionally, in some instances, two or more of the RADAR scans that generate the scan data sets 108 that may be aggregated into the aggregated RADAR data may not occur at the same time. Further, the vehicle may move between scans. In some embodiments, the registration performed by the aggregator 110 (e.g., the determined spatial transformations) may account for the movement of the vehicle between scans according to any suitable technique (e.g., based on ego-motion detection of the vehicle between scans).

In some embodiments, the RADAR point cloud 104 may be generated based on only one scan data set 108 such that the RADAR point cloud 104 may include data from a single scan. In these or other embodiments, aggregation may not be performed, however registration of the single scan data set 108 to the common coordinate system and/or a corresponding transformation may be performed.

The dynamic object filter 112 may be configured to identify and remove one or more portions of the RADAR data 102 that may correspond to dynamic objects. For example, the RADAR data 102 may include indications based on any suitable technique as to whether detected objects were moving at the time that a corresponding RADAR scan was performed. The dynamic object filter 112 may be configured to identify such objects as being dynamic objects and may be configured to remove points from the RADAR data 102 that correspond to the dynamic objects. Dynamic objects may include objects that may move and that may be transient in the area that is scanned.

In these or other embodiments, the dynamic object filter 112 may be configured to perform object tracking between multiple scan data sets 108 and may be configured to identify dynamic objects based on the object tracking. For example, in some instances a dynamic object may be temporarily stationary during a first scan but may move between the first scan and a second scan. The dynamic object filter 112 may be configured to identify objects in the scan data sets 108 and determine whether a same object in different scan data sets 108 has moved based on a comparison between locations of the same object in the two or more scan data sets 108. In some embodiments, the dynamic object filter 112 may be configured to use spatial transformations between scan data sets 108 to determine whether objects in multiple scan data sets 108 have moved between the scan data sets 108. The dynamic object filter 112 may be configured to remove points from the RADAR data that correspond to objects determined to have moved between scans.

In some embodiments, the dynamic object filtering may be performed before aggregation of scan data sets 108. Additionally or alternatively, the dynamic object filtering may be performed after aggregation of scan data sets 108.

The point selector 114 may be configured to select points from respective RADAR data sets to include in respective RADAR point clouds 104. In some embodiments, aggregated RADAR data that may be aggregated by the aggregator 110 may be an example RADAR data set. Additionally, a single scan data set 108 that is to form the entirety of the RADAR point cloud 104 may be another example RADAR data set.

The point selection may include filtering out points based on one or more criteria, such as described below and using the remaining points for the respective RADAR point clouds 104. Additionally or alternatively, the point selection may include selecting certain points based on the one or more criteria and including the selected points in the respective RADAR point clouds 104.

In some embodiments, the point selection may include removing or selecting respective points from the respective RADAR data sets based on the respective return values of the points. In these or other embodiments, the point selection may be dynamic in which one or more selection criteria may change for different RADAR data sets that may be used to generate different RADAR point clouds 104.

For example, in some embodiments, the RADAR point cloud 104 may have a target number of points to include therein. Further, the number of points in different RADAR data sets used to generate different RADAR point clouds 104 may vary depending on the detection of objects by the corresponding RADAR scans. As such, in some embodiments, the number of points that may be filtered out or selected to generate different RADAR point clouds 104 having a same target number of points may vary. By way of non-limiting example, in some embodiments, the points that may be selected by the point selector 114 for inclusion in the RADAR point cloud 104 may include those points that have a highest signal strength indicator (e.g., return power magnitude and/or SNR) associated therewith. For example, in instances in which the target number of points is one thousand (1,000), the 1,000 points having the highest return signal strength or magnitude may be included in the RADAR point cloud 104 and the other points may be removed by the point selector 114.

In these or other embodiments, the point selector 114 may be configured to select points that satisfy a signal strength threshold that may be associated with signal strength of RADAR return signals (e.g., a return power threshold or an SNR threshold) or remove points that do not satisfy the signal strength threshold. In some embodiments, the signal strength threshold may be dynamic with respect to different RADAR point clouds 104. Additionally or alternatively, the signal strength threshold may be determined based on the target number of points. For example, in instances in which the target number of points is 1,000, the signal strength threshold may be based on the $1,000^{th}$ highest return power value and/or the $1000^{th}$ highest SNR of the points in the aggregated RADAR data 102. In these or other embodiments, the signal strength threshold may vary depending on the relationship between the total number of points in a respective RADAR data set prior to the point selection and the target number of points. For example, the signal strength threshold may be lower in instances in which the total number of points prior to the selecting or filtering is closer to the target number of points than in instances in which the total number of points prior to the selecting or filtering is much more than the target number of points.

The target number of points may be based on one or more of: a target resolution of the radar point cloud, a target data size of the radar point cloud, RADAR map parameters (e.g., map resolution), RADAR localization parameters (e.g., target localization precision), a target spatial coverage of the radar point cloud, or a target angular coverage of the radar point cloud. In some embodiments, the target number of points may be determined using a heuristic analysis. By way of example, the target number of points may be between 500-2,000 in some embodiments.

Modifications, additions, or omissions may be made to FIGS. 1A and 1B without departing from the scope of the present disclosure. For example, in some embodiments, as indicated above, the number of scan data sets 108 that may be used to generate any one RADAR point cloud 104 may vary. Further, the rate at which RADAR point clouds 104 may be generated may also vary. Further, one or more of the operations described with respect to the aggregator 110, the dynamic object filter 112, and/or the point selector 114 may be performed in a different order than described, at the same time as one or more other operations, and/or may be omitted. Further, delineation of the point cloud engine 100 into the aggregator 110, the dynamic object filter 112, and the point selector 114 is for explanatory purposes and is not meant to be limiting.

Further, in some embodiments, the point cloud engine 100 may be implemented by one or more computing devices, such as that described below with respect to FIG. 15. In these or other embodiments, the point cloud engine 100 may be implemented by a computing system disposed on a vehicle, such as that described below with respect to FIGS. 14A-14D.

Figure 2:
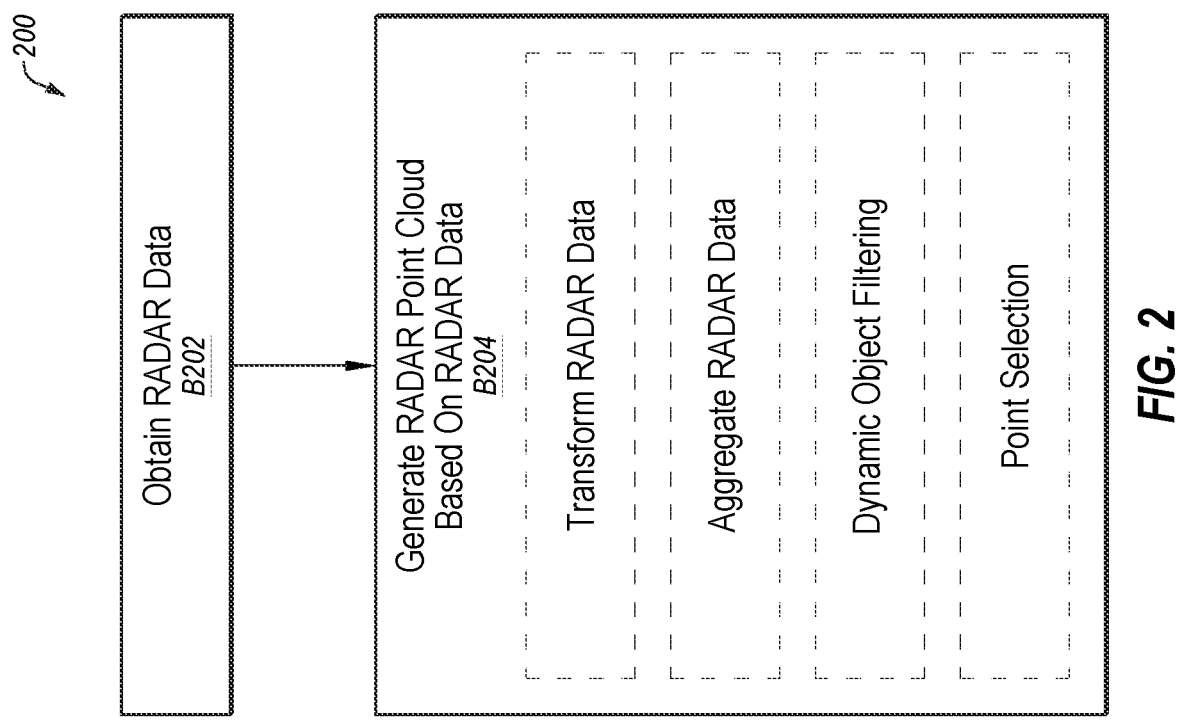
FIG. 2 illustrates an example flowchart of a method for generating a RADAR point cloud, in accordance with one or more embodiments of the present disclosure.

FIG. 2 illustrates an example method 200 for generating a RADAR point cloud, according to one or more embodiments of the present disclosure. The method 200 may be performed by any suitable system, apparatus, or device using any combination of hardware, firmware, and/or software. For instance, various operations may be carried out by one or more processors executing instructions stored in memory. The operations of the method 200 may also be embodied as computer-usable instructions stored on computer storage media. Additionally or alternatively, one or more of the operations of the method 200 may be provided by a standalone application, a service or hosted service (standalone or in combination with another hosted service), or a plug-in to another product, to name a few. By way of example, in some embodiments, one or more operations of the method 200 may be performed by the point cloud engine 100 described with respect to FIG. 1A. In these or other embodiments, one or more operations may be performed by one or more computing devices, such as that described in further detail below with respect to FIG. 15. In these or other embodiments, one or more operations of the method 200 may be performed by a computing system disposed on a vehicle, such as that described below with respect to FIGS. 14A-14D.

The method 200, at block B202, includes obtaining RADAR data that may be associated with one or more RADAR scans that may be performed by one or more RADAR sensors. The RADAR data 102 described with respect to FIG. 1A may be an example of the obtained RADAR data.

At block B204, a RADAR point cloud may be generated based on the RADAR data. In some embodiments, the generation of the RADAR point cloud may include transforming the RADAR data into a common coordinate system, aggregating the RADAR data, performing dynamic object filtering, and/or performing point selection, such as described above with respect to FIGS. 1A and 1B.

Modifications, additions, or omissions may be made to the method 200 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

Figure 3A:
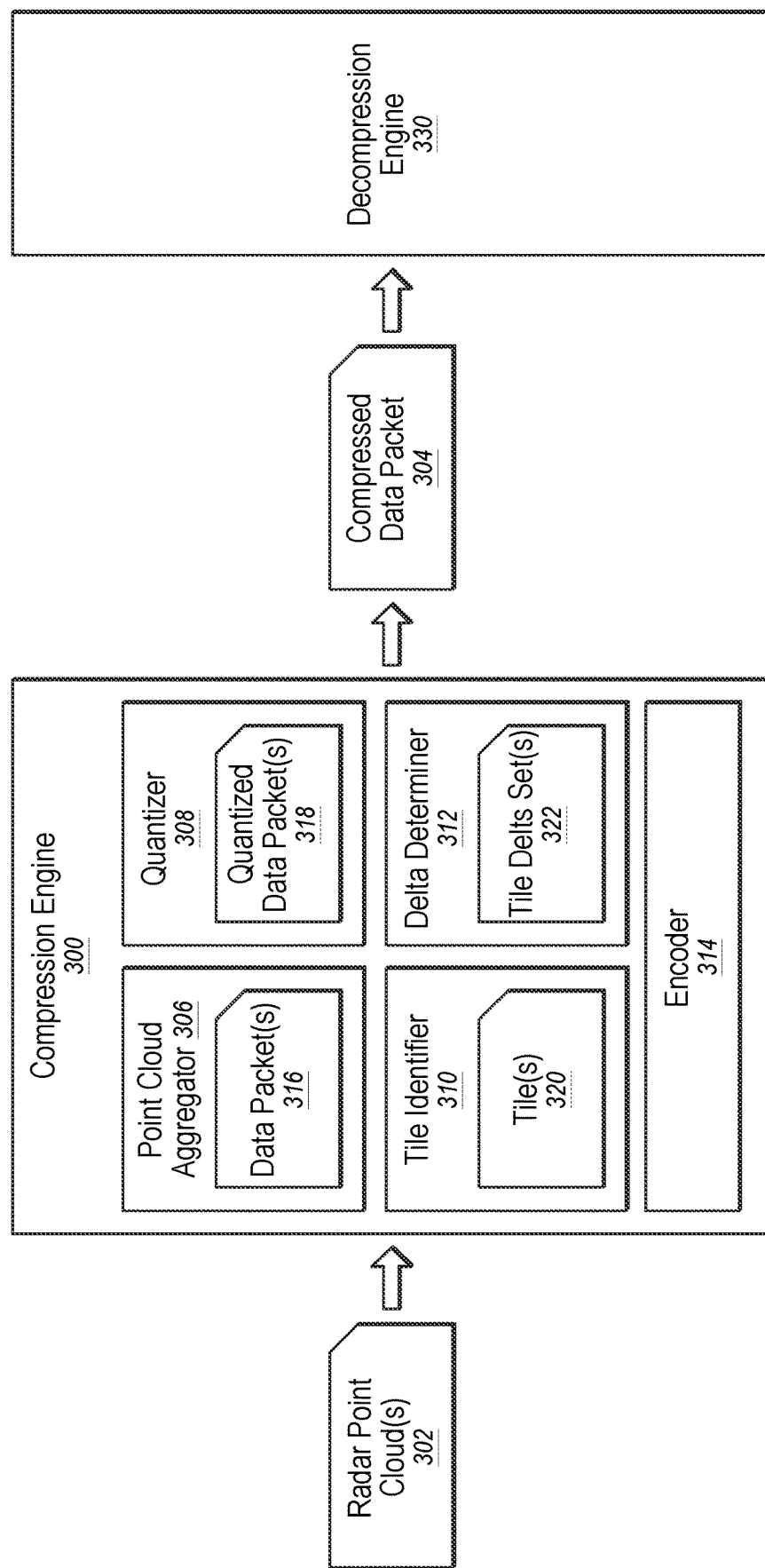
FIG. 3A illustrates an example compression engine configured to perform operations with respect to RADAR point clouds to generate a compressed RADAR data packet, according to one or more embodiments of the present disclosure.

FIG. 3A illustrates an example compression engine 300 configured to perform operations with respect to RADAR point clouds 302 ("point clouds 302") to generate a compressed RADAR data packet 304 ("compressed data packet 304"), according to one or more embodiments of the present disclosure. The point clouds 302 may be analogous to the RADAR point cloud 104 described above with respect to FIGS. 1A and 1B.

The compression engine 300 may include code and routines configured to enable a computing system to perform one or more operations. Additionally or alternatively, the compression engine 300 may be implemented using hardware including one or more processors, graphical processing units (GPUs), data processing units (DPUs), microprocessors (e.g., to perform or control performance of one or more operations), field-programmable gate arrays (FPGAs), and/or application-specific integrated circuits (ASICs). In some other instances, the compression engine 300 may be implemented using a combination of hardware and software. In the present disclosure, operations described as being performed by the compression engine 300 may include operations that the compression engine 300 may direct a corresponding system to perform.

The compression engine 300 may be configured to perform operations on the point clouds 302 to generate the compressed data packet 304. The compression of the point clouds 302 to form the compressed data packet 304 may help facilitate the communication of RADAR data from a vehicle to another system (e.g., a map generation system) by reducing the amount of data that may be communicated. In some embodiments, the compression engine 300 may include one or more of: a RADAR data aggregator 306 ("aggregator 306"), a point quantizer 308 ("quantizer 308"), a tile identifier 310 ("identifier 310"), a coordinate delta determiner 312 ("determiner 312"), or an encoder 314.

The aggregator 306 may be configured to aggregate multiple point clouds 302 into a RADAR data packet 316 ("data packet 316"). In these or other embodiments, the aggregation of the multiple point clouds 302 may include performing a registration of the multiple point clouds 302 with respect to a reference coordinate system.

For example, in some embodiments, respective point clouds of the point clouds 302 may be generated (also referred to as "published") on a regular basis. For instance, as described above, respective point clouds 302 may be published for each cycle of RADAR scans that may be performed by one or more RADAR sensors disposed on a vehicle. As also discussed above, the respective points of the respective point clouds 302 may be positioned according to respective common coordinate systems associated with the respective point clouds 302 (referred to as respective "local coordinate systems" of the respective point clouds 302. Further, as also discussed above, the point clouds 302 may be generated as a corresponding vehicle is moving. As such, the local coordinate systems of different point clouds 302 may differ from each other such that coordinates in different point clouds 302 that correspond to a same location in a geographical area may be positioned differently in their respective point clouds 302. In some embodiments, the point cloud registration may include spatially transforming the points of the multiple point clouds with respect to the reference coordinate system such that such that coordinates in different point clouds 302 that correspond to a same location in a geographical area may be at the same position in the resulting data packet 316.

In some embodiments, the transformation determination may be based on determined movement of the vehicle between the generation of the point clouds 302 used to form the data packet 316. For example, in some embodiments, each point cloud 302 may have a timestamp associated therewith that may indicate a time at which the corresponding point cloud 302 was published. In addition, the local coordinate systems of the respective point clouds 302 may be based on a current location of the vehicle at the publishing time of the respective point clouds. In these or other embodiments, the aggregator 306 may be configured to determine the relative transformations between respective point clouds 302 based on the amount of time between point cloud publications and based on detected ego-motion of the vehicle, according to any suitable technique. Additionally or alternatively, the aggregator 306 may be configured to obtain one or more vehicle pose parameters that may be determined as part of respective localization determinations made with respect to the different point clouds 302. In these or other embodiments, the aggregator 306 may be configured to determine the relative transformations between respective point clouds 302 based on the one or more pose parameters, according to any suitable technique. In some embodiments, the localization used to determine the one or more pose parameters may include one or more operations described below with respect to a localization engine of FIG. 5.

In some embodiments, the reference coordinate system may be one of the local coordinate systems of a particular one of the point clouds 302. In these or other embodiments, the relative transformations may be determined between the particular point cloud 302 and each of the other point clouds 302. Additionally or alternatively, the relative transformations may be daisy-chained back to the particular point cloud 302, which may help with accuracy of the registering to the reference coordinate system.

For example, a first point cloud, a second point cloud, and a third point cloud may be selected for inclusion in a same data packet 316. The first point cloud may have a first timestamp, the second point cloud may have a second timestamp, and the third point cloud may have a third timestamp. The first timestamp may be earlier than the second timestamp and the second timestamp may be earlier than the third timestamp. In some embodiments, a first relative transformation may be determined between the first point cloud and the second point cloud based on movement of the vehicle (e.g., as determined from ego-motion and/or localization) between the first timestamp and the second timestamp. Further, a second relative transformation may be determined between the second point cloud and the third point cloud based on movement of the vehicle (e.g., as determined from ego-motion and/or localization) between the second timestamp and the third timestamp. In the current example, the local coordinate system of the first point cloud may also be selected as the reference coordinate system such that the first point cloud may be selected as a reference point cloud. The registration of the second point cloud to the reference coordinate system may accordingly be according to the first relative transformation. In addition, the registration of the third point cloud to the reference coordinate system may be according to the first relative transformation and the second relative transformation. Such a registration of the third point cloud instead of based on a third relative transformation directly determined based on motion between the first timestamp and the third timestamp may be more accurate due to improved granularity in motion determinations made to determine the first relative transformation and the second relative transformation. Further it is noted that the first point cloud may already be registered to the reference coordinate system merely by the local coordinate system of the first point cloud being selected as the reference coordinate system.

In some embodiments, the point clouds 302 used to generate respective data packets 316 may be point clouds that are consecutively published. In these or other embodiments, the earliest published point cloud 302 (e.g., the point cloud 302 with the earliest timestamp) of the point clouds 302 that are being aggregated may be used as the reference point cloud.

The number of point clouds 302 that may be aggregated into a particular data packet 316 may vary. In some embodiments, the number of point clouds 302 may be based on a compression integrity threshold for the compression. For example, the amount of data being compressed may improve the degree of the compression and/or the integrity of the data being compressed. As such, data packets 316 that are generated using a higher number of point clouds 302 may allow for better compression than data packets 316 generated based off of fewer point clouds 302.

Additionally or alternatively, the number of point clouds 302 that may be aggregated may be based on a communication channel bandwidths. For example, as indicated above, the compressed data packet 304 may be communicated to another system via a communication channel that may have a certain amount of bandwidth for communicating the compressed data packet 304. As the number of point clouds 302 included in the compressed data packet 304 increases, the total amount of data included in the compressed data packet 304 may increase, which may occur even in instances in which the overall compression may be higher. As such, in some embodiments, the number of point clouds 302 that may be aggregated may be based on a balance between compression integrity (e.g., compression degree and/or compression related data loss), and available computing and communication resources (e.g., communication channel bandwidth). In some embodiments, such a determination may be made based on a heuristic analysis. By way of example, the number of point clouds 302 that may be used to generate a particular compressed data packet 304 may be between 1 and 15. However, this range may be increased further depending on available computing resources.

The quantizer 308 may be configured to quantize the points of the data packet 316 that may be generated by the aggregator 306 to generate a quantized data packet 318. For example, the data packet 316 may represent a two-dimensional array in which each point of the data packet 316 may be positioned at a respective location in the array. Further, the respective locations of the points may correspond to locations of corresponding objects in the area that was scanned to generate the points. In some embodiments, the array may include a grid in which the spacing between lines of the grid corresponds to a target resolution of the RADAR data of the data packet 316. For example, the target resolution may be 5 centimeters (cm) such that the spacing between lines of the grid in the array may correspond to 5 cm in the area scanned to generate the RADAR data of the grid. In these or other embodiments, the quantization of the points may correspond to approximating (e.g., assigning and/or moving) the coordinates of each point to a point on the grid that is closest to the point. For example, the respective values of the x and y coordinates of the points may be rounded to the closest respective x and y coordinates of the grid lines.

Figure 3B:
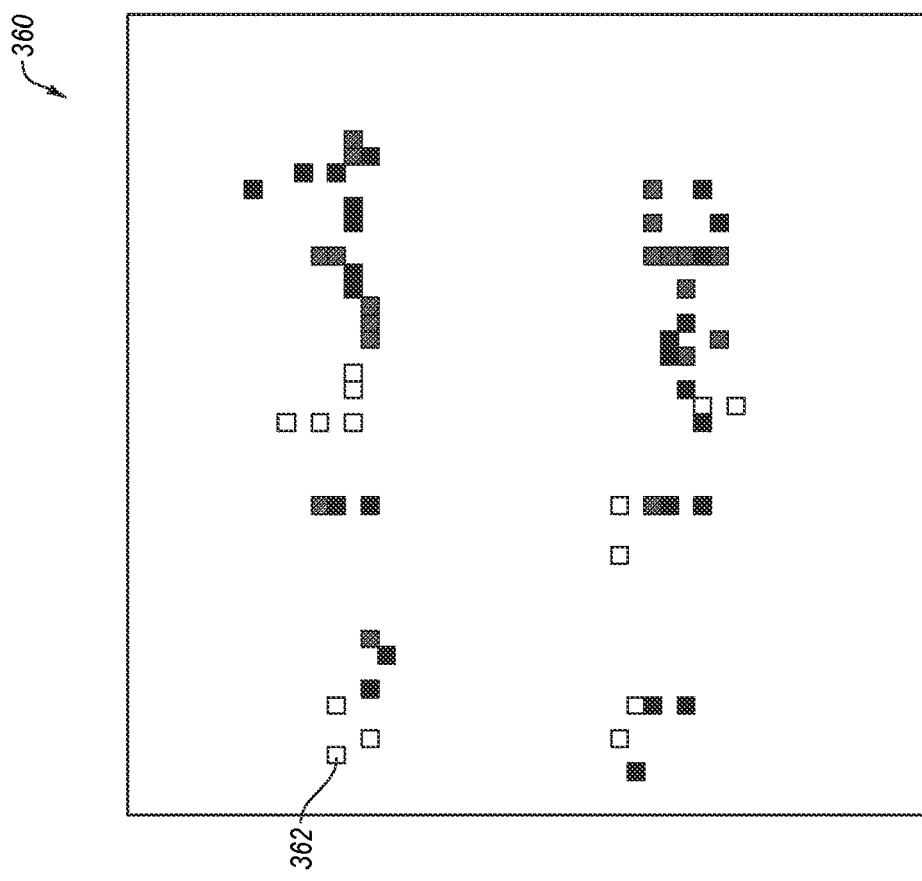
FIG. 3B illustrates an example of quantization of points of a portion of a data packet, according to one or more embodiments of the present disclosure.
Figure 3B:
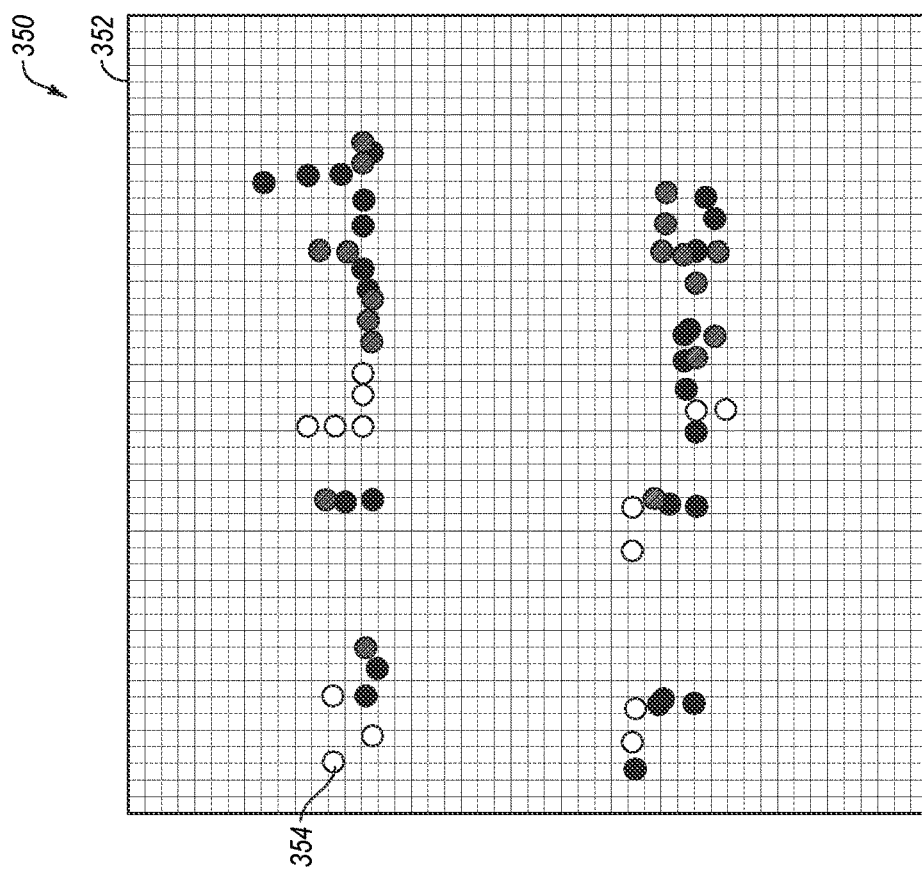

For example, FIG. 3B illustrates an example data packet portion 350 ("portion 350") that may be quantized. The portion 350 may include multiple points (e.g., a point 354). In the illustrated example, the points may have different shading and/or fill patterns to indicate that different points may be obtained from different point clouds. Further, the portion 350 may include a grid 352 that may include a grid of lines that are perpendicular to each other and that correspond to the quantization. The spacing between the lines may be according to the target resolution. The portion 350 includes the points 354 prior to quantization. FIG. 3B also illustrates an example quantized portion 360 in which the points of the portion 350 have been quantized into quantized point points (e.g., quantized point 362) according to the grid 352.

Returning to FIG. 3A, in some embodiments the target resolution may be based on a target map resolution of a RADAR map that may be generated using the data that is being compressed. In these or other embodiments, the target map resolution may be based on a localization tolerance of autonomous driving operations. For example, the RADAR map may be used for localization as described in further detail below. Further, the localization may be used by a vehicle to determine where the vehicle is located in a region in which the vehicle is travelling. Further, the determined location may be used by the vehicle in making autonomous driving decisions. The localization may have a target accuracy and/or precision to help ensure the vehicle is adequately aware of its surroundings in making the autonomous driving decisions. As such, target resolution of the RADAR map may be such that the localization may be performed within the target accuracy and/or precision tolerances of corresponding driving operations that may be decided thereupon.

Returning to FIG. 3A, the tile identifier 310 may be configured to divide the quantized data packet 318 according to one or more tiles 320. The tiles 320 may be formed by a grid that may divide up the array that corresponds to the quantized data packet 318 similar to the grid that may be used to generate the quantized data packet 318. However, the tile grid may be significantly larger in that the spacing between the lines to form the tiles 320 may be significantly larger. In some embodiments, the amount of points included in each tile may affect the compression that may be performed in the quantized data packet 318. As such, in some embodiments, the sizes of the tiles may be based on at least a threshold number of points being included in each tile. In these or other embodiments, the tile size may be determined based on a relationship between the threshold number and an average point distribution within the array (e.g., an average number of points/area). In some embodiments, the size may be determined based on a heuristic analysis. In these or other embodiments, the heuristic analysis may be determined with respect to a type of compression technique that may be used and/or the average point distribution within the array. Additionally or alternatively, the size of the tiles may be based on a data analysis to obtain a target size of tile codes associated with the tiles (as explained in further detail below) and/or a number of tiles that may be empty to help improve compression. By way of example, FIG. 3C illustrates the quantized portion 360 of FIG. 3B divided up according to tiles 370a-370i.

The determiner 312 may be configured to determine a tile delta set 322 for each of one or more of the tiles 320. The tile delta sets 322 may indicate the relative differences (also referred to as "deltas") between the locations of points included in the corresponding tiles. For example, deltas between the x coordinates and the y coordinates of two different points in a tile 320 may be determined. In some embodiments, the deltas may be determined with respect to points that are closest to each other. Additionally or alternatively, the deltas may be determined by starting at a reference point positioned at a particular location of a tile (e.g., a particular corner portion) and consecutively determining the deltas between points that are consecutively encountered from the reference point according to a particular path through the corresponding tile 320.

Figure 3D:
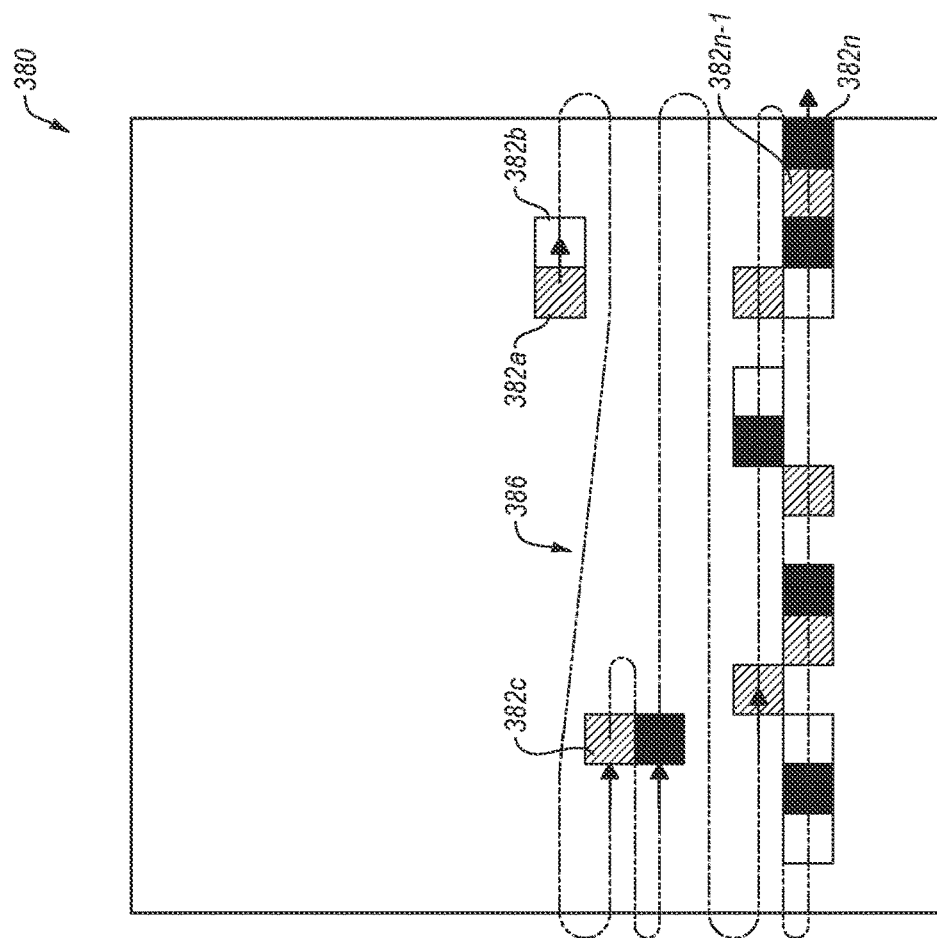
FIG. 3D illustrates an example of determining a tile delta set, according to one or more embodiments of the present disclosure.
Figure 3C:
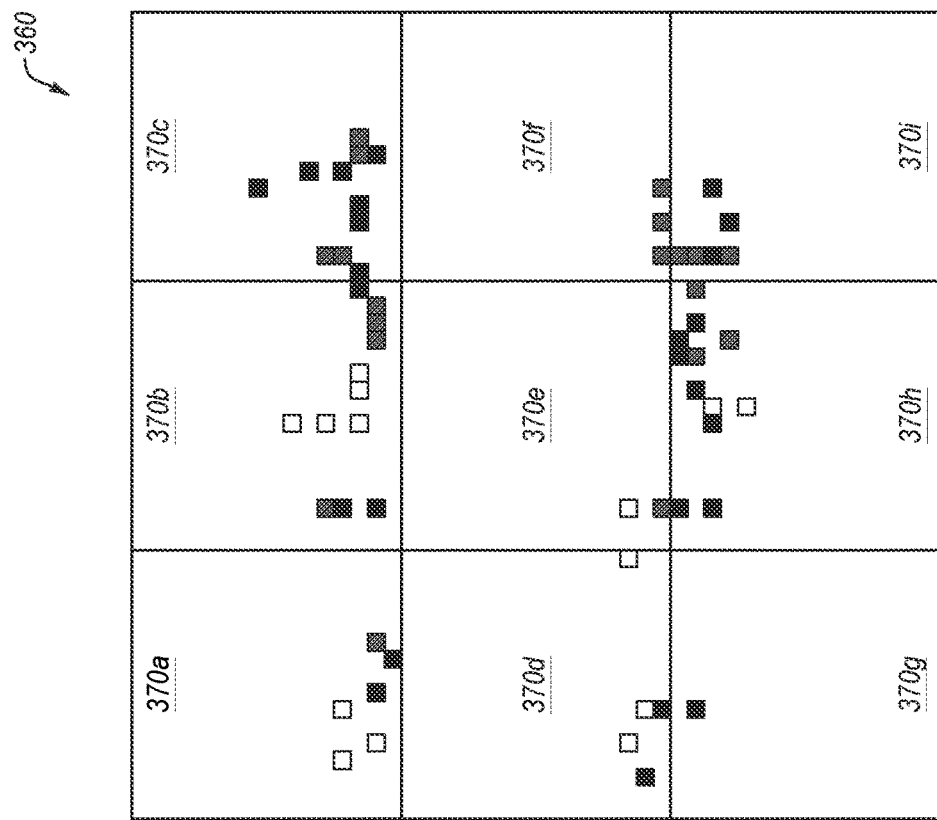
FIG. 3C illustrates an example of dividing a data packet into tiles, according to one or more embodiments of the present disclosure.

For example, FIG. 3D illustrates an example tile 380 that may include points 382. In the illustrated example, a tile delta set may be determined for the tile 380 based on a path 386 through the tile 380 that may begin at a point 382a (which may be the reference point) and that may end at a point 382n. For example, a first delta may be determined between point 382a and 382b in which the first delta may indicate respective x-values and y-values to indicate differences between the x and y coordinates of points 382a and 382b. For instance, the first delta of the tile delta set of the tile 380 ("tile 380 delta set") may be expressed as (1,0) to indicate that the point 382b is one unit of distance (e.g., quantization resolution amount) away from the point 382a along the x-axis and that the point is no units of distance away from the point 382a along the y-axis. Following the path 386, a second delta of the tile 380 delta set may be determined between the point 382b and the point 382c in a similar manner. Also, based on the first delta and the second delta, the relative position of the point 382c with respect to the point 382a may be determined. Further, by knowing a position of the point 382a, the position of the point 382b may be determined based on the first delta and the position of point 382c may be determined based on the first delta and the second delta. The tile 380 delta set may be further determined by determining deltas between consecutively encountered points along the path 386 in a similar manner until a final delta is determined between points 382n and 382n-1. In these or other embodiments, the tile 380 delta set may be divided into a set of x-delta values and a set of y-delta values.

Returning to FIG. 3A, the encoder 314 may be configured to perform one or more encoding operations on the quantized packet 318 to generate the compressed data packet 304. In some embodiments, the encoder 314 may be configured to perform the encoding based on the tile delta sets 322 according to any suitable technique.

For example, the values of the deltas included in the respective tile delta sets 322 may be used to generate respective tile codes for the corresponding tiles 320. The tile codes may indicate the number and/or location of the quantized points included in the respective tiles and may be smaller in data size than the data that is represented. In these or other embodiments, the compressed data packet 304 may include the tile codes determined for the corresponding tiles 320.

In these or other embodiments, the compressed data packet 304 may include an indication as to which tile code corresponds to which tile 320 to help facilitate decoding and decompression. For example, in some embodiments, the tile codes may be ordered in the compressed data packet 304 according to a particular tile order.

For instance, referring to FIG. 3C, the respective tile codes for the tiles 370 may be as follows: code1 for tile 370a, code2 for tile 370b, code3 for tile 370c, code4 for tile 370d, code5 for tile 370e, code6 for tile 370f, code7 for tile 370g, code8 for tile 370h, and code9 for tile 370i. Based on the following tile order: 370a, 370b, 370c, 370d, 370e, 370f, 370g, 370h, and 370i, the codes may be ordered as follows: code1, code2, code3, code4, code5, code6, code7, code8, and code9. In these or other embodiments, the codes may be separated by a particular value, such as a new tile code (e.g., a "0"). For example, again referring to FIG. 3C, the corresponding compressed data packet with respect to the tiles 370 may include a data sequence as follows: new-tile-code, code1, new-tile-code, code2, new-tile-code, code3, new-tile-code, code4, new-tile-code, code5, new-tile-code, code6, new-tile-code, code7, new-tile-code, code8, new-tile-code, code9. The number of encountered new-tile-codes may accordingly be indexed to a particular tile. For example, one encountered new-tile-code may indicate that the subsequent tile code may correspond to tile 370a, two encountered new-tile-codes may indicate that the subsequent tile code may correspond to the tile 370b, three encountered new-tile-codes may indicate that the subsequent tile code may correspond to the tile 370bc, and so forth.

In some embodiments, the encoding may include applying one or more encoding trees to the tile delta sets 322, according to any suitable technique. The encoding trees may be configured to determine a corresponding tile code value based on the delta values of the tile delta sets 322. For example, in some embodiments, the encoding trees may include probabilities of one or more delta values in the tile delta sets 322 and may be used to determine the corresponding tile code value based on the probabilities and/or number of instances of the one or more delta values in the tile delta sets 322. In these or other embodiments, an x-encoding tree may be applied to the x-delta values and a y-encoding tree may be applied to the y-delta values. By way of example, in some embodiments, the encoding may include Huffman encoding and the use of Huffman encoding trees. Other example encoding techniques may include JPEG (Joint Photographic Experts Group) encoding, PNG (Portable Network Graphics) encoding, etc.

In some embodiments, the encoding trees may be pre-computed and provided to the encoder 314. The pre-computing may allow for the compressed data packet 304 to be communicated without having the encoding trees included thereon for decoding the tile codes included therein, which reduces the size of the compressed data packet 304. Further, the pre-computing of the encoding trees may allow for faster generation of the tile codes and corresponding compressed data packet 304, which may allow for a faster communication rate of compressed data packets 304 and/or may reduce computing requirements. The pre-computing of the encoding trees may be based on RADAR data of multiple other RADAR scans. The other data packets may be previously generated data packets based on real-world scans and/or may be based on simulated RADAR scans.

In some embodiments, the encoder 314 may be configured to perform further compression with respect to the compressed data packet 304. For example, in some embodiments, the encoder 314 may perform one or more compression operations on the tile code data (e.g., of the tile codes and/or tile code sequences) included in the compressed data packet 304 to provide further compression. For example, the encoder 314 may be configured to perform one or more of: LZ4 (Lempel-Ziv 4) compression, LZMA (Lempel-Ziv Markov chain) compression, DEFLATE compression, etc. with respect to the tile code data.

In some embodiments, the compressed data packet 304 may be communicated (e.g., via a communication over any suitable network) to a system that may include a decompression engine 330 (e.g., a map generation system such as described in further detail below). The decompression engine 330 may include code and routines configured to enable a computing system to perform one or more operations. Additionally or alternatively, the decompression engine 330 may be implemented using hardware including one or more processors, graphical processing units (GPUs), data processing units (DPUs), microprocessors (e.g., to perform or control performance of one or more operations), field-programmable gate arrays (FPGAs), and/or application-specific integrated circuits (ASICs). In some other instances, the decompression engine 330 may be implemented using a combination of hardware and software. In the present disclosure, operations described as being performed by the decompression engine 330 may include operations that decompression engine 330 may direct a corresponding system to perform.

The decompression engine 330 may be configured to decompress the compressed data packet 304 to recreate the uncompressed data represented by the compressed data packet 304. For example, the decompression engine 330 may be configured to perform the reverse of the additional compression (e.g., LZ4 compression) that have been performed. Additionally or alternatively, the decompression engine 330 may be provided with the same pre-computed encoding trees used to generate the tile codes. Using the encoding trees, the decompression engine 330 may be configured to obtain the tile delta sets 322 that correspond to the tile codes. Further, using the delta values of the tile delta sets 322 and the order of determination of the delta values, the decompression engine 330 may be configured to determine the point locations of the respective points of the respective tiles 320. As indicated above, the use of the pre-computed encoding trees may allow for the compressed data packet 304 to be communicated to the decompression engine 330 while omitting transmission of the encoding trees.

Modifications, additions, or omissions may be made to FIGS. 3A-3D without departing from the scope of the present disclosure. For example, in some embodiments, as indicated above, the number of point clouds 302 that may be used to generate any one compressed data packet 304 may vary. Further, the number of tiles, resolution used to perform the quantization, etc., may vary. In addition, the rate at which compressed data packets 304 may be generated may also vary. Further, one or more of the operations described with respect to the aggregator 306, the quantizer 308, the tile identifier 310, the delta determiner 312, and/or the encoder 314 may be performed in a different order than described, at the same time as one or more other operations, and/or omitted. Further, delineation of the aggregator 306, the quantizer 308, the tile identifier 310, the delta determiner 312, and the encoder 314 is for explanatory purposes and is not meant to be limiting. In addition, the example depictions in FIGS. 3B-3D are meant to provide illustrations of the concepts described therewith. As such, the number, shapes, sizes, distributions, etc. of the points in those depictions may not necessarily reflect real-world situations or examples.

Figure 4:
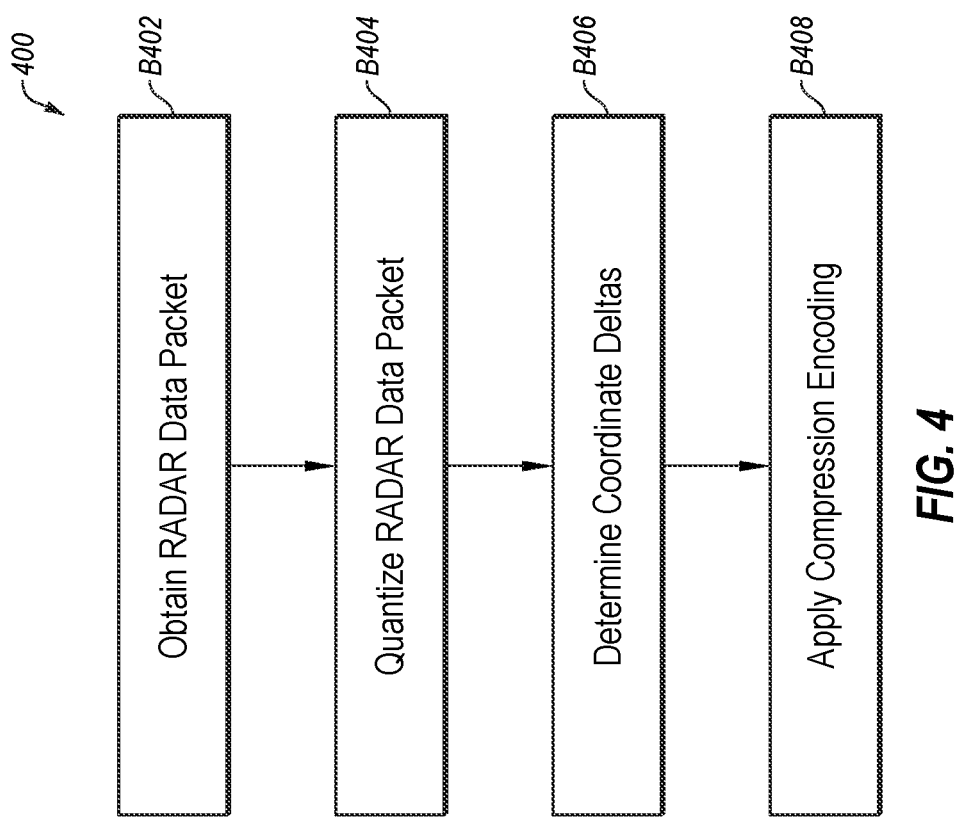
FIG. 4 illustrates an example method for generating a compressed RADAR data packet, according to one or more embodiments of the present disclosure.

FIG. 4 illustrates an example method 400 for generating a compressed RADAR data packet, according to one or more embodiments of the present disclosure. The method 400 may be performed by any suitable system, apparatus, or device using any combination of hardware, firmware, and/or software. For instance, various operations may be carried out by one or more processors executing instructions stored in memory. The operations of the method 400 may also be embodied as computer-usable instructions stored on computer storage media. Additionally or alternatively, one or more of the operations of the method 400 may be provided by a standalone application, a service or hosted service (standalone or in combination with another hosted service), or a plug-in to another product, to name a few. By way of example, in some embodiments, one or more operations of the method 400 may be performed by the compression engine 300 described with respect to FIG. 3A. In these or other embodiments, one or more operations may be performed by one or more computing devices, such as that described in further detail below with respect to FIG. 15. In these or other embodiments, one or more operations of the method 400 may be performed by a computing system disposed on an ego-machine, such as a vehicle as described below with respect to FIGS. 14A-14D.

In some embodiments, the method 400, at block B402, may include obtaining a RADAR data packet, such as the data packet 316 described above with respect to FIG. 3A. In some embodiments, the RADAR data packet may be provided as input. In these or other embodiment, the RADAR data packet may be generated such as described above with respect to FIG. 3A.

At block B404, the RADAR data packet may be quantized. For example, the points of the RADAR data packet may be quantized, such as described above with respect to FIGS. 3A and 3B.

At block B406, coordinate deltas between quantized points included in one or more respective tiles of the radar data packet may be determined. In these or other embodiments, the coordinate deltas may be included in respective tile delta sets that may each correspond to respective tile. The coordinate deltas and tile delta sets may be determined such as described above with respect to FIGS. 3A, 3C, and 3D.

At block B408, compression encoding may be applied to the quantized RADAR data packet. In some embodiments, the compression encoding may be based on the tile delta sets. In some embodiments, the compression encoding may include one or more operations described above with respect to the encoder 314 of FIG. 3A.

Modifications, additions, or omissions may be made to the method 400 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

Figure 5:
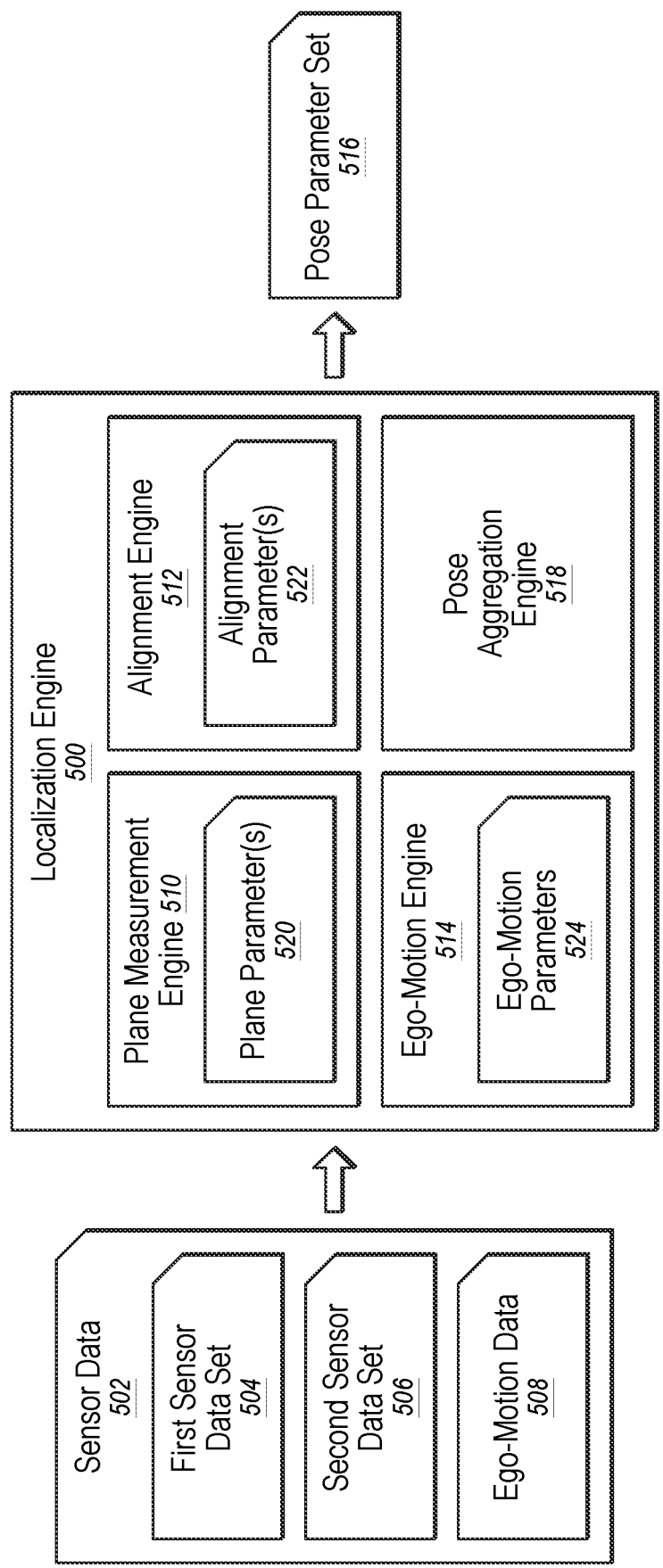
FIG. 5 illustrates an example localization engine configured to perform localization operations with respect to an ego-machine, according to one or more embodiments of the present disclosure.

FIG. 5 illustrates an example localization engine 500 configured to perform localization operations with respect to a vehicle, according to one or more embodiments of the present disclosure. In these or other embodiments, the localization engine 500 may be implemented on the vehicle and may be configured to perform the localization operations with respect to the vehicle on which the localization engine 500 is disposed. A vehicle performing localization operations for itself (e.g., via the localization engine 500 disposed thereon) may be referred to as "an ego-vehicle" to differentiate such vehicle from other vehicles that may be described herein. However, general reference to "vehicles" may include vehicles that may also operate as "ego-vehicles". In some embodiments, the localization engine 500 may be configured to perform the localization operations with respect to sensor data 502 to obtain a set of one or more pose parameters 516 ("parameter set 516").

The parameter set 516 may include one or more different types of pose parameters that may provide an indication of a location and/or orientation within a particular area (e.g., a geographical area). For example, with respect to orientation, the pose parameters may include one or more of a pitch, a roll, or a yaw of a vehicle. Additionally, with respect to location, the pose parameters may include a forward position, a lateral position, or a height position. In some embodiments, the pose parameters may be indicated with respect to a relative position within a particular area and/or a global position. For example, the pose parameters may be expressed in relation to a relative coordinate system associated with a map (e.g., x, y, and z coordinates that may indicate position and/or orientation with respect to the map coordinate system). In these or other embodiments, the pose parameters may be expressed in relation to geographic longitude, latitude, elevation, and/or an ENU (East, North, Up) orientation at the corresponding longitude, latitude, and elevation.

The sensor data 502 may include any suitable data obtained from any suitable sensor that may be used to determine one or more of the pose parameters of the parameter set 516. For example, the sensor data 502 may include a first sensor data set 504 ("first data 504") and a second sensor data set 506 ("second data 506"). The first data 504 and the second data 506 may include LIDAR data (e.g., LIDAR point clouds, LIDAR images, and/or a LIDAR map of an area, etc.) and/or RADAR data (e.g., RADAR point clouds, RADAR images and/or a RADAR map of an area, etc.). In the present disclosure reference to a particular type of sensor data map (e.g., a RADAR map, a LIDAR map, an image map) may refer to a representation of characteristics of an area that may be indicated by the corresponding data type.

In some embodiments, the first data 504 may be associated with a first vehicle (e.g., may be obtained by one or more sensors disposed on the first vehicle) and the second data 506 may be associated with a second vehicle (e.g., may be obtained by one or more sensors disposed on the second vehicle). In these or other embodiments, the first data 504 and/or the second data 506 may be associated with the same vehicle.

Additionally or alternatively, the first data 504 and/or the second data 506 may be associated with multiple vehicles. In these or other embodiments, the first data 504 and/or the second data 506 may include map data associated with a particular type of sensor data (e.g., LIDAR map data, RADAR map data, image map data, etc.) that may be obtained by corresponding sensors of one or more vehicles. In some embodiments, the first data 504 and/or the second data 506 may be associated with the vehicle for which localization may be performed (e.g., may be associated with the ego-vehicle).

Additionally or alternatively, the sensor data 502 may include ego-motion data 508. The ego-motion data 508 may include any suitable data that may be obtained from one or more corresponding sensors that may detect motion and/or a location of a corresponding vehicle. For example, the ego-motion data 508 may include data obtained from any suitable inertial measurement unit (IMU) sensors, a compass, a speedometer, global navigation satellite system sensors, etc. In some embodiments, the ego-motion data 508 may be associated with the ego-vehicle.

The localization engine 500 may include code and routines configured to enable a computing system to perform one or more operations related to localization. Additionally or alternatively, the localization engine 500 may be implemented using hardware including one or more processors, graphical processing units (GPUs), data processing units (DPUs), microprocessors (e.g., to perform or control performance of one or more operations), field-programmable gate arrays (FPGAs), and/or application-specific integrated circuits (ASICs). In some other instances, the localization engine 500 may be implemented using a combination of hardware and software. In the present disclosure, operations described as being performed by the localization engine 500 may include operations that the localization engine 500 may direct a corresponding system to perform.

In some embodiments, the localization engine 500 may include one or more of: a plane measurement engine 510, an alignment engine 512, or an ego-motion engine 514. Each of one or more of the plane measurement engine 510, the alignment engine 512, or the ego-motion engine 514 may be configured to determine one or more pose parameters. Additionally, the localization engine 500 may include a pose aggregation engine 518 that may be configured to determine the pose parameters of the pose parameter set 516 based on the pose parameters determined by one or more of the plane measurement engine 510, the alignment engine 512, or the ego-motion engine 514.

The ego-motion engine 514 may be configured to determine one or more ego-motion parameters 524 based on the ego-motion data 508. The ego-motion parameters 524 may include one or more pose parameters that may be determined based on the ego-motion data 508.

For example, in some embodiments, the ego-motion engine 514 may be configured to determine one or more of the ego-motion parameters 524 based on corresponding pose parameters of a previously determined parameter set 516 and ego-motion data 508 from a time associated with the previous pose parameters to a time of determining the ego-motion parameters. For instance, the ego-motion engine 514 may be configured to determine a relative transform of one or more previous pose parameters associated with a timestamp t−1 to predict corresponding current pose parameters associated with a timestamp t in which the relative transform is determined based on relative ego-motion data between time t and time t−1.

In some embodiments, the ego-motion parameters 524 may include relative ego-motion parameters and/or absolute ego-motion parameters. In these or other embodiments, the relative ego-motion parameters may be referenced based on relative movement of the corresponding vehicle (e.g., as indicated based on IMU data, speed data, acceleration data, steering data, GPS data, etc.) with respect to two or more different poses over a particular time period. For example, in some embodiments, the relative ego-motion parameters may include an x position delta, a y position delta, a z position delta, a yaw delta, a roll delta, and/or a pitch delta between the two time periods.

In these or other embodiments, the absolute ego-motion parameters may include global coordinates and/or ENU orientation (e.g., based on the WGS84 (World Geodetic System 1984) coordinate system) and their respective covariances at the different time periods. In these or other embodiments, the absolute ego-motion parameters may be determined based on GPS data and any other applicable data.

The plane measurement engine 510 may be configured to determine one or more plane parameters 520 based on a plane that may be identified from the sensor data 502. The plane parameters 520 may include information about the identified plane. For example, the plane parameters 520 may include a normal of the identified plane and/or origin coordinates of the identified plane. Additionally or alternatively, the plane parameters 520 may include one or more pose parameters that may be determined based on the plane. In some embodiments, the plane may be a ground plane associated with a particular pose (e.g., a current pose) of the vehicle. In some embodiments, the plane measurement engine 510 may be configured to determine the plane parameters 520 as described in further detail below with respect to FIG. 6.

The alignment engine 512 may be configured to determine one or more alignment parameters 522 based on a comparison between the first data 504 and the second data 506. The alignment parameters 522 may include one or more pose parameters that may be determined based on the comparison. Additionally or alternatively, the alignment parameters 522 may include a transform between the first data 504 and the second data 506 that may be based on the one or more pose parameters of the alignment parameters 522. The transform may be determined to align the first data 504 and the second data 506 to each other. In some embodiments, the alignment engine 512 may be configured to determine the alignment parameters 522 as described in further detail below with respect to FIGS. 7A and 7B.

The pose aggregation engine 518 may be configured to determine the parameter set 516 based on one or more of the plane parameters 520, the alignment parameters 522, or the ego-motion parameters 524. For example, in some embodiments, the plane parameters 520, the alignment parameters 522, and/or the ego-motion parameters 524 may not include for every type of pose parameter, such that in order for the parameter set 516 to include a full set of pose parameters, different pose parameters may be obtained from the plane parameters 520, the alignment parameters 522, and/or the ego-motion parameters 524. For instance, as discussed in further detail below, the plane parameters 520 may include roll, pitch and elevation parameters but may not include forward, lateral, or yaw parameters. Conversely, as also discussed in further detail below, the alignment parameters may include forward, lateral, or yaw parameters, but may not include roll, pitch, or elevation parameters. Therefore, in order for the parameter set 516 to include roll, pitch, yaw, forward, lateral, and elevation parameters, the pose aggregation engine 518 may be configured to obtain the plane parameters 520 and the alignment parameters 522 to obtain a full set of the different types of pose parameters to include in the parameter set 516.

In these or other embodiments, the pose aggregation engine 518 may be configured to determine one or more of the pose parameters of the parameter set 516 based on currently determined pose parameters and one or more previously determined pose parameters. For example, in some embodiments, the pose aggregation engine 518 may be configured as a Kalman filter that may be configured to use previously determined values of one or more of the plane parameters 520, the alignment parameters 522, and/or the ego-motion parameters 524 as states that may be used to modify currently determined values of one or more of: the plane parameters 520, the alignment parameters 522, and/or the ego-motion parameters 524, according to any suitable technique. In these or other embodiments, one or more of the currently determined values and/or of the modified values of the plane parameters 520, the alignment parameters 522, and/or the ego motion parameters 524 may be used as states of the Kalman filter in the determination of respective values for the respective pose parameters of the parameter set 516.

For instance, in some embodiments, the aggregation engine 518 may be configured to obtain the relative ego-motion parameters of the ego-motion parameters 524 based on previously determined pose parameters, such as described in above as part of a Kalman filter prediction step. In these or other embodiments, as part of a Kalman filter update step, the aggregation engine 518 may be configured to modify the relative ego-motion parameters based on one or more of the alignment parameters 522, the plane parameters 520, or the absolute ego-motion parameters to obtain the pose parameters of the parameter set 516. Such a modification of the relative ego-motion parameters based on additional measurement data may help improve the accuracy of the pose parameters.

Modifications, additions, or omissions may be made to FIG. 5 without departing from the scope of the present disclosure. For example, in some embodiments, the localization engine 500 may be configured to determine new pose parameter sets 516 according to a regular time interval. For example, the localization engine 500 may be configured to determine new pose parameter sets 516 at a same rate as new sensor data 502 may be obtained.

Further, one or more of the operations described with respect to the plane measurement engine 510, the alignment engine 512, the ego-motion engine 514 and/or the pose aggregation engine 518 may be performed in a different order than described, at the same time as one or more other operations, and/or may be omitted. Further, delineation of the localization engine 500 into the plane measurement engine 510, the alignment engine 512, the ego-motion engine 514 and the pose aggregation engine 518 is for explanatory purposes and is not meant to be limiting. In addition, one or more of the plane measurement engine 510, the alignment engine 512, the ego-motion engine 514 or the pose aggregation engine 518 may be omitted from one or more embodiments of the localization engine 500. For example, in some embodiments, the localization engine 500 may obtain one or more of: the plane parameters 520, the alignment parameters 522, or the ego-motion parameters 524 as input rather than making such determinations using a corresponding engine.

Moreover, one or more pose parameters included in the plane parameters 520, the alignment parameters 522, and/or the ego-motion parameters 514 may be in common. Additionally or alternatively, one or more of the pose parameters included in the plane parameters 520, the alignment parameters 522, and/or the ego-motion parameters 514 may be unique and may not be included in the other parameters determined by the other engines.

Figure 6:
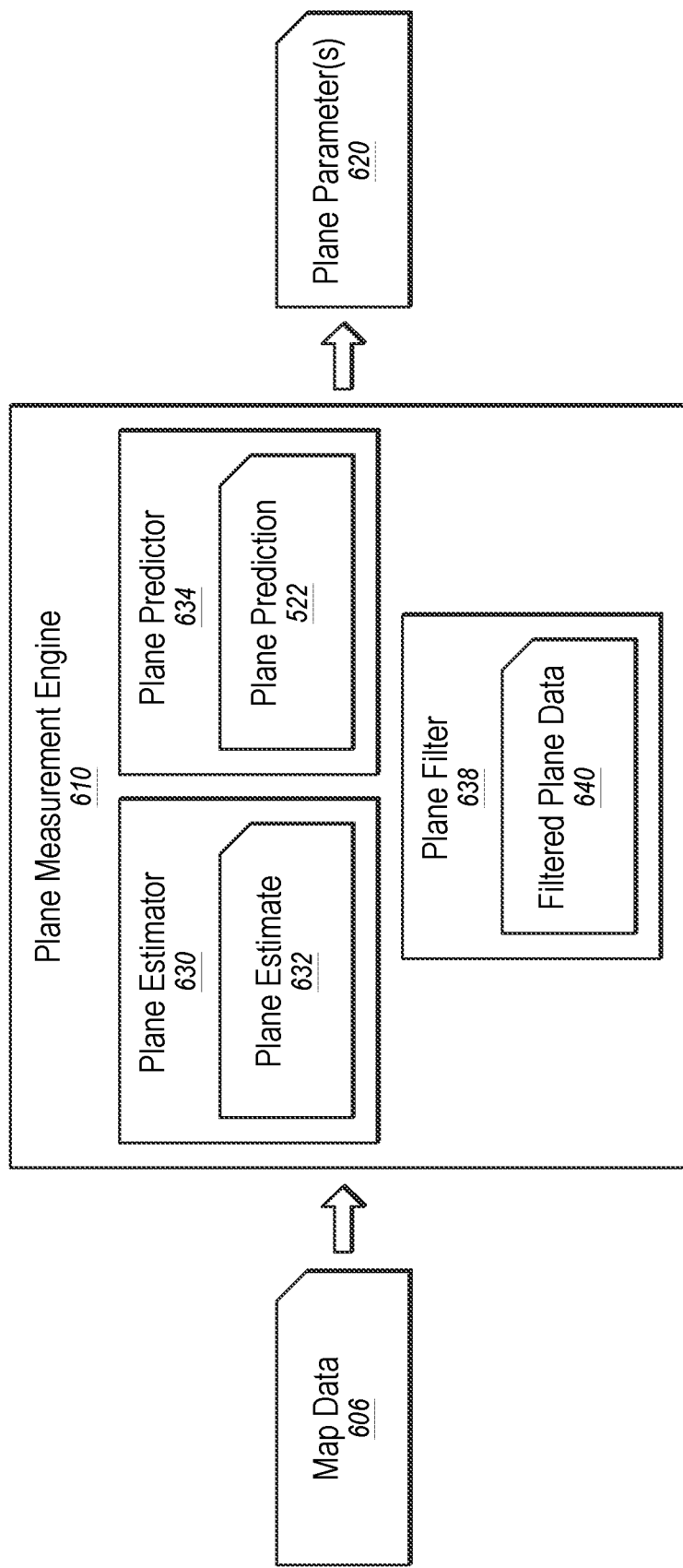
FIG. 6 illustrates an example plane measurement engine configured to determine one or more pose parameters, according to one or more embodiments of the present disclosure.

FIG. 6 illustrates an example plane measurement engine 610 ("plane engine 610") configured to determine one or more plane parameters 620, according to one or more embodiments of the present disclosure. The plane engine 610 may be an example of the plane measurement engine 510 of FIG. 5. Further, the plane parameters 620 may be analogous to the plane parameters 520 of FIG. 5.

The plane engine 610 may include code and routines configured to enable a computing system to perform one or more operations. Additionally or alternatively, the plane engine 610 may be implemented using hardware including one or more processors, graphical processing units (GPUs), data processing units (DPUs), microprocessors (e.g., to perform or control performance of one or more operations), field-programmable gate arrays (FPGAs), and/or application-specific integrated circuits (ASICs). In some other instances, the plane engine 610 may be implemented using a combination of hardware and software. In the present disclosure, operations described as being performed by the plane engine 610 may include operations that the plane engine 610 may direct a corresponding system to perform.

In general, as indicated above, the plane engine 610 may be configured to determine the plane parameters 620 based on a plane that may be associated with a pose of the corresponding vehicle. Additionally or alternatively, the plane engine 610 may be configured to determine the pose parameters 620 based on a pose prediction and/or map data 606.

In some embodiments, the pose prediction may include one or more pose parameters of the vehicle that may be predicted based on one or more corresponding previous pose parameters of the vehicle and relative ego-motion data. For example, in some embodiments, the pose prediction may include one or more of the ego-motion parameters 524 described above with respect to FIG. 5. Additionally or alternatively, the plane engine 610 may be configured to determine the pose prediction in a manner similar that that described above with respect to determining the ego-motion parameters 524

The map data 606 may include a map representation of an area at which the vehicle may be disposed. In some embodiments, the map data 606 may include LIDAR map data, RADAR map data, and/or semantic information related to elements represented by the map of the map data 606. The map data 606 may be included in and/or an example of the first data 504 and/or the second data 506 of FIG. 5.

In some embodiments, the plane engine 610 may include a plane estimator 630. The plane estimator 630 may be configured to estimate a plane based on the pose prediction and the map data 606 in some embodiments. For example, in some embodiments, the plane engine 610 may be configured to collect map data points included in the map data 606 that are around a portion of the corresponding map that corresponds to a predicted vehicle position that may be indicated by the pose prediction. For instance, in some embodiments, the plane engine 610 may be configured to collect one, some, or all of the map data points that are within a bounding volume having a particular size and centered at the predicted position.

In these or other embodiments, the plane estimator 630 may be configured to determine a plane estimate 632 based on the collected map data points according to any suitable technique. For example, in some embodiments, the plane estimator 630 may be configured to estimate a plane that corresponds to the ground plane using data associated with the map data points. For example, in some embodiments, the ground plane may be estimated based on semantic information included in the map data 606 that indicates roads, lanes, road markers (e.g., lines) etc. In these or other embodiments, the ground plane may be estimated based on the positions of LIDAR data points that may be included in the map data 606. In these or other embodiments, the plane estimator 630 may be configured to estimate the ground plane based on sensor data that may be collected by the corresponding vehicle. For example, the sensor data may include LIDAR data that may have an accuracy that allows for estimating the ground plane with respect to an ego-coordinate system of the vehicle according to any suitable technique.

For example, the plane estimate 632 may include plane parameters (e.g., a normal, an origin, points within the plane, etc.) of an estimated plane that corresponds to a ground plane that is determined from the collected map data points. The estimated plane origin may correspond to a point at a center of the estimated plane and may also correspond to the predicted position used to collect the map data points. The orientation of the estimated ground plane (e.g., as indicated by the corresponding estimated normal) may provide an estimate of the height, pitch, and/or roll of the vehicle at the predicted position. In these or other embodiments, the plane estimator 630 may accordingly be configured to estimate, as pose parameters of the vehicle at the predicted position, one or more of the height, pitch, and/or roll of the vehicle based on the estimated ground plane. In these or other embodiments, the plane estimate 632 may include one or more of the estimated pose parameters. In some embodiments, the one or more estimated pose parameters included in the plane estimate 632 may be included in the plane parameters 620. In these or other embodiments, the plane estimation may include determining an estimated plane covariance with respect to the estimated pose parameters and/or plane parameters of the plane estimate 632, which may be included with the plane estimate 632.

Additionally or alternatively, in some embodiments the plane engine 610 may include a plane predictor 634. The plane predictor 634 may be configured to determine a plane prediction 636 based on one or more previously determined plane estimates and corresponding relative transforms between the previously determined plane estimates and the currently determined plane estimate 632. In some embodiments, the relative transforms may be determined based on previously determined pose parameters that correspond to the previously determined plane estimates and one or more corresponding pose parameters included in the pose prediction. In these or other embodiments, the plane prediction 634 may include one or more predicted plane parameters and/or pose parameters that may be determined based on an orientation of the predicted plane. Additionally or alternatively, the one or more predicted pose parameters included in the plane prediction 636 may be included in the plane parameters 620. In these or other embodiments, the plane estimation may include determining an estimated plane covariance with respect to the estimated pose parameters and/or plane parameters of the plane estimate 632, which may be included with the plane estimate 632.

In some embodiments, the plane engine 610 may include a plane tuner 638. The plane tuner 638 may be configured to tune the estimated plane of the plane estimate 632, the predicted plane of the plane prediction 636, the estimated pose parameters of the plane estimate 632, and/or the predicted pose parameters of the plane prediction 636 to obtain tuned plane data 640. For example, the plane tuner 638 may be configured to determine the tuned plane data 640 based on a combination of the data of the plane estimate 632 and the plane prediction 636 (e.g., an average). In these or other embodiments, the plane tuner 638 may be configured to determine the tuned plane data 640 based on the plane estimate 632 and/or the plane prediction 636 by determining a new plane based on points that are within a particular threshold of the plane estimate 632 and/or the plane prediction 636.

The tuned plane data 640 may accordingly indicate a plane that is determined using the estimated plane and the predicted plane, which may be more accurate than the estimated plane and/or the predicted plane alone. Additionally or alternatively, the tuned plane data 640 may include one or more pose parameters that are determined using the estimated pose parameters and the predicted pose parameters and/or using the plane that is determined using the estimated plane and the predicted plane, which may be more accurate than the estimated pose parameters and/or the predicted pose parameters alone. In these or other embodiments, one or more of the one or more pose parameters determined by the plane tuner 638 may be included in the plane parameters 620. In some embodiments, the plane tuner 638 may be configured as a Kalman filter and may be configured to use the data of the plane estimate 632 and/or the plane prediction 636 (e.g., the estimated plane, the predicted plane, the estimated pose parameters, the predicted pose parameters, and/or one or more corresponding covariances) as states that may be used in making the corresponding determinations.

Modifications, additions, or omissions may be made to FIG. 6 without departing from the scope of the present disclosure. For example, one or more of the operations described with respect to the plane estimator 630, the plane predictor 634, and/or the plane filter 638 may be performed in a different order than described, at the same time as one or more other operations, and/or may be omitted. Further, delineation of the plane engine 610 into the plane estimator 630, the plane predictor 634, and the plane filter 638 is for explanatory purposes and is not meant to be limiting. In addition, one or more of the plane estimator 630, the plane predictor 634, or the plane filter 638 may be omitted from one or more embodiments of the plane engine 610. In addition, one or more other elements may be included in the plane engine 610. For instance, the plane engine 610 may include the ego-motion engine 514 of FIG. 5 (or something similar) to determine the pose prediction described above.

FIG. 7 illustrates an example alignment engine 712 configured to determine one or more alignment parameters 722, according to one or more embodiments of the present disclosure. The alignment engine 712 may be an example of the alignment engine 512 of FIG. 5. Further, the alignment parameters 722 may be analogous to the alignment parameters 522 of FIG. 5.

The alignment engine 712 may include code and routines configured to enable a computing system to perform one or more operations. Additionally or alternatively, the alignment engine 712 may be implemented using hardware including one or more processors, graphical processing units (GPUs), data processing units (DPUs), microprocessors (e.g., to perform or control performance of one or more operations), field-programmable gate arrays (FPGAs), and/or application-specific integrated circuits (ASICs). In some other instances, the alignment engine 712 may be implemented using a combination of hardware and software. In the present disclosure, operations described as being performed by the alignment engine 712 may include operations that the alignment engine 712 may direct a corresponding system to perform.

The alignment engine 712 may be configured to determine the alignment parameters 722 based on a first sensor data set 704 ("first data 704") and a second sensor data set 706 ("second data 706"). The first data 704 may be analogous to the first data 504 of FIG. 5 and the second data 706 may be analogous to the second data 506 of FIG. 5. As detailed below, in general, the alignment engine 712 may be configured to determine the alignment parameters 722 by positioning and orienting the first data 704 according to hypothetical pose parameters and determining respective degrees of alignment between the first data 704 and the second data 706 with respect to the different respective positions and orientations. Reference to positioning and orienting data according to pose parameters may include orienting and positioning the data as if the data was captured by one or more corresponding sensors of a vehicle while the vehicle is posed according to the pose parameters.

In some embodiments, the alignment engine 712 may include a pose space generator 730 configured to generate a pose space 732. The pose space 732 may include multiple pose parameter sets in which each respective pose parameter set includes one or more hypothetical pose parameters that may be applied to the first data 704. For example, in some embodiments, each pose parameter set may include a hypothetical position in space (e.g., a hypothetical forward position and/or a hypothetical lateral position) and/or a hypothetical orientation (e.g., a hypothetical yaw orientation).

In some embodiments, the pose parameter sets may be based on translation values that may be used to move the first data 704 in relation to an initial orientation of the first data 704 with respect to the second data 706. For example, translation values associated with respective pose parameter set may indicate one or more of a lateral movement amount from the initial orientation, a forward movement amount from the initial orientation, and/or a yaw movement amount from the initial orientation.

In some embodiments, the first data 704 may be initially oriented with respect to the second data 706 according to a reference point of the second data 706. For instance, the first data 704 and the second data 706 may each include point clouds (e.g., RADAR and/or LIDAR) and/or one or more images of an area. In these or other embodiments, the first data 704 may be initially superimposed with respect to a center position of the area represented by the second data 706 such that the center of the first data 704 may be aligned with the center of the second data 706.

Additionally or alternatively, an estimated geographic position and/or orientation of the vehicle with respect to when the first data 704 was captured may be obtained. In these or other embodiments, the center of the first data 704 may be initially aligned with a portion of the second data 706 that corresponds to the estimated geographic position and may be initially oriented based on the estimated orientation. In some embodiments, the estimated position and/or orientation may be obtained from ego-motion data and one or more previous pose parameters of the vehicle. For example, in some embodiments, the estimated position and/or orientation may be obtained from one or more of the ego-motion parameters 524 described above with respect to FIG. 5. Additionally or alternatively, the alignment engine 712 may be configured to determine the estimated position and/or orientation in a manner similar to that that described above with respect to determining the ego-motion parameters 524.

In these or other embodiments, the pose space 732 may be initially aligned based on one or more plane parameters, such as the plane parameters 620 and 520 described above. For example, a normal of the plane associated with the plane parameters may be used as the normal of the pose space 732. In these or other embodiments, an origin of the plane associated with the plane parameters may be used as the origin of the pose space 732.

Figure 7A:
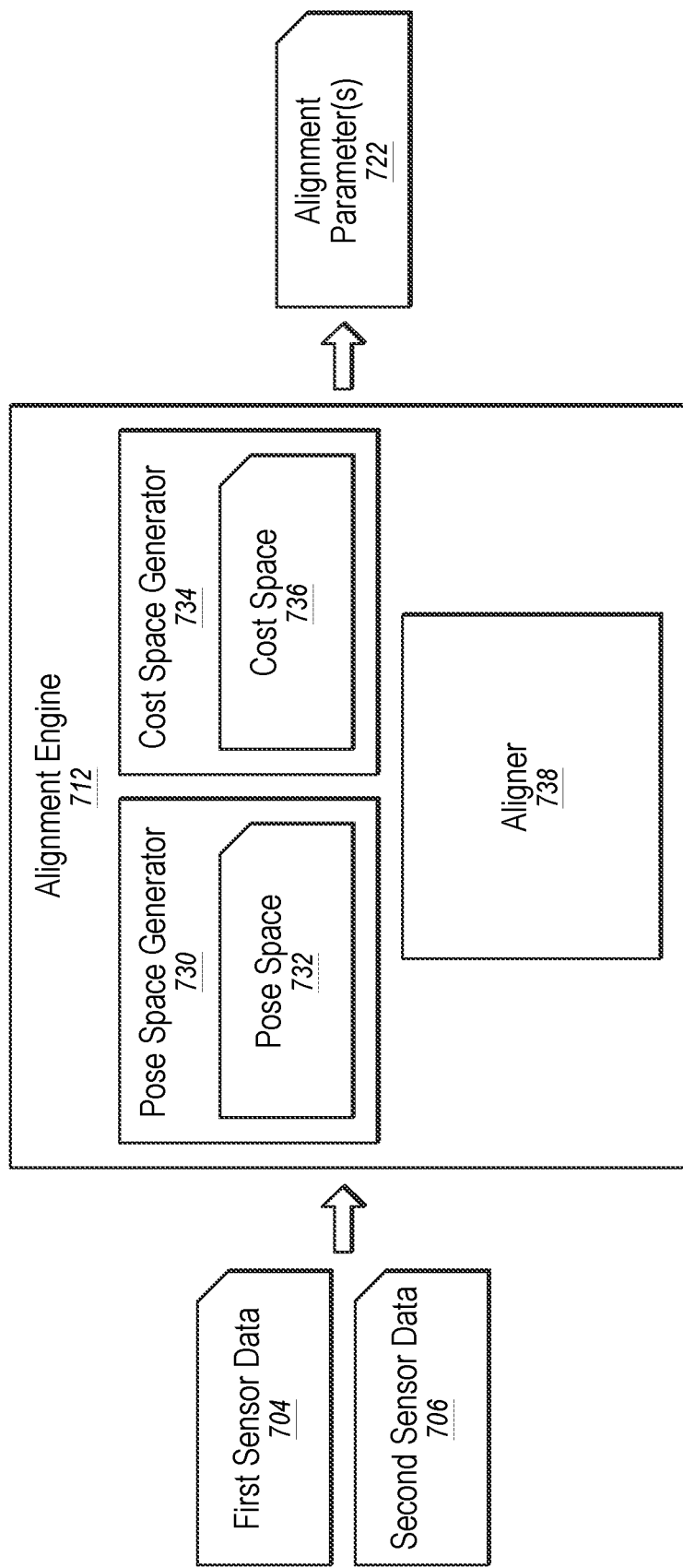
FIG. 7A illustrates an example alignment engine configured to determine one or more pose parameters, according to one or more embodiments of the present disclosure.
Figure 7B:
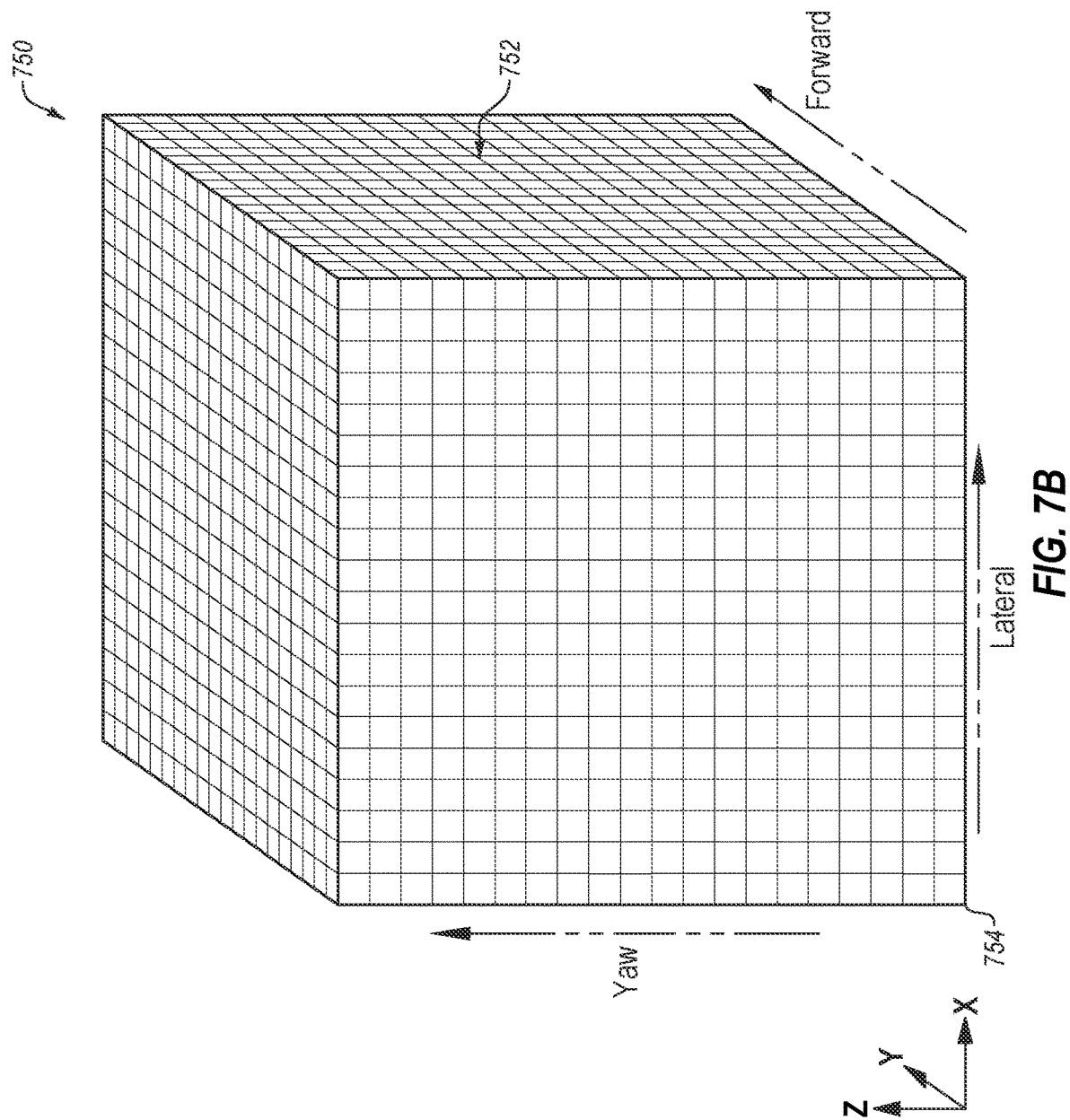
FIG. 7B illustrates an example visual representation of a pose space, according to one or more embodiments of the present disclosure.

FIG. 7B illustrates an example visual representation 750 of the pose space 732, according to one or more embodiments of the present disclosure. In the representation 750, the pose space 732 is illustrated as a 3-dimensional grid 752 in which an origin 754 of the grid 752 represents an initial position and orientation of the first data 704. An x-axis of the grid 752 may represent lateral movement away from the initial position, a y-axis of the grid 752 may represent forward movement away from the initial position, and a z-axis of the grid 752 may represent yaw movement from the initial position. As such, movement along the corresponding axes may represent different hypothetical values of the corresponding pose parameters.

Further, the spacing between the lines of the grid 752 may represent incremental interval sizes between the hypothetical values. In some embodiments, the incremental interval sizes (i.e., the resolution of the pose space 732) may be based on positional accuracy tolerances. For example, in instances in which the target accuracy and/or precision is 5 cm, the incremental interval sizes with respect to forward and lateral movement may correspond to 5 cm increments in the area at which the vehicle may be located. Further, the incremental interval sizes with respect to yaw movement may be a certain number of rotational degrees that have arc lengths that correspond to the target accuracy. The pose parameter sets may be represented by x, y, and z values that correspond to the cells of the grid 752.

Returning to FIG. 7A, the number of pose parameter sets to include in the pose space 732 may vary. Further, the number of pose parameter sets may be based on a determined amount of unexpected drift (e.g., a determined maximum amount of drift) with respect to predicted pose parameters (e.g., relative ego-motion parameters). Additionally, the overall size of the pose space 732 may vary depending on target resolution of the pose space 732 and the determined amount of unexpected drift. By way of example, the overall forward and/or lateral movement range of the pose space 732 may be between 3 and 10 meters and the overall yaw rotation range may be between 1.5 and 5 degrees. However, such numbers are merely examples and are not meant to be limiting.

In some embodiments, the alignment engine 712 may include a cost space generator 734 configured to generate a cost space 736. The cost space 736 may include a cost that may be determined for each pose parameter set of the pose space 732. The cost may indicate a degree of alignment between the first data 704 and the second data 706 with respect to the first data 704 being oriented according to the corresponding values of the corresponding pose parameter set. The degree of alignment may indicate a degree to which points of the first data 704 and of the second data 706 that correspond to a same object in an area (e.g., a same object in a geographic area) are aligned with each other.

For example, a particular cost for a particular pose parameter set may be determined by moving the first data 704 from its initial orientation to a particular orientation based on the values of the hypothetical pose parameters in the particular pose parameter set. The cost space generator 734 may then be configured to compare the second data 706 against the first data 704, as oriented according to the particular orientation to determine a degree of alignment between the first data 704 and the second data 706. The particular cost may be determined based on the degree of alignment and accordingly may indicate the degree of alignment.

In some embodiments, the costs may be determined based on a cost function. By way of example, in some embodiments, the cost function may include determining respective distances between respective points of the first data 704 and respective points of the second data 706 that are nearest to the respective points of the first data 704. "Points" of the first data 704 and the second data 706 may include LIDAR point cloud points, RADAR point cloud points, and/or image characteristics (e.g., objects or portions of objects depicted in images).

In these or other embodiments, the cost function evaluation may employ the use of a distance transform image. The distance transform image may include a grayscale image in which respective pixel values of the image may represent the respective distances between points of the first data 704 and the nearest points of the second data 706. In some embodiments, the first data 704 and the second data 706 may be represented as binary images to help allow for use of the distance transform image.

In these or other embodiments, the cost function evaluation may also include comparing values of points of the first data 704 and the second data 706 that are determined to be closest to each other. For example, for LIDAR points, reflectance values may be compared; for RADAR points RCS values may be compared; and for image points, pixel characteristics (e.g., colors, intensity, etc.) may be compared. In these or other embodiments, the respective costs associated with respective parameter sets may include an aggregation of the point value differences determined with respect to the respective pose parameter sets. The aggregation may include a statistical measure of the value differences. By way of example, the aggregation may include a media, a summation, an average, or a likelihood of the differences. For example, the particular cost of the particular pose parameter set may include a sum of the value differences determined with respect to the particular orientation of the first data 704 as compared against the second data 706.

In some embodiments, the respective costs of the respective pose parameter sets may include a combination of the determined distances and the value differences. In these or other embodiments, the combination may be based on any applicable statistical measure. For example, in some embodiments, the respective combined costs may include a sum or an average of the determined distances and value differences. In these or other embodiments, the sum or average may be a weighted sum or average. In these or other embodiments, the distance may be weighted higher than the difference values or vice versa.

In some embodiments, the cost determinations may vary depending on the type of data being compared. For example, LIDAR data may be 3-dimensional and may accordingly include information about point height and/or elevation. In some embodiments, the cost determination with respect to LIDAR data may include comparing 2-dimensional cross slices of the LIDAR data in which the cross slices relate to a particular height or elevation (e.g., z value). In these or other embodiments, the cost determination may include comparing points in point clouds that correspond to a volume that correspond to a particular range of height values. For example, the volume may include a certain number of meters (e.g., 1-3 meters) above or below a ground plane. Another example of a volume may include a certain number of meters above or below a plane that is a certain number of meters above the ground plane (e.g., 1-3 meters above the ground plane) By contrast, the RADAR data may not include height data or may include height data that may be ignored with respect to a corresponding cost determination.

In these or other embodiments, the cost determinations may include determining covariances with respect to each cost. The covariance determinations may be based on the cost values of pose parameter sets that may be within a particular range of the respective pose parameter sets for which the covariance may be determined. The particular range of pose parameter sets may include other pose parameter sets having hypothetical pose parameters with values that are within a particular range of the hypothetical pose parameters of a pose parameter set for which the covariance may be determined. For example, in some embodiments, the covariances for costs of respective pose parameter sets may be determined with respect to other pose parameter sets that are within half the overall size range of the pose space 732 around the respective pose parameter sets (e.g., those that correspond to a 1.5-5 meter forward and/or lateral range and/or that are within 1.5 rotational degrees of the respective pose parameter set). In other embodiments, the respective covariances may be determined based on smaller or larger ranges. Additionally or alternatively, the respective covariances may be based on all of the other costs included in the cost space 736.

By way example, the particular pose parameter set may correspond to a particular cell of the grid 752 of FIG. 7B. The covariance of the particular cost of the particular pose parameter set may be determined based on the costs of pose parameter sets that correspond to cells that are adjacent to the particular cell in the grid 752. In these or other embodiments, the particular covariance of the particular pose parameter set may be determined based on the costs of pose parameter sets that correspond to cells that are within "n" number of cells to the particular cell in the grid 752.

In some embodiments, the cost determination may be based on previously determined costs. For example, the first data 704, the pose space 732, and the cost space 736 may correspond to a current point in time and accordingly may include "current" pose parameter sets that include "current" hypothetical pose parameters. In some embodiments, the current hypothetical pose parameter values may be transformed based on ego-motion data that respectively corresponds to a time period between the current point in time and each of one or more previous points in time that correspond to one or more previous first sensor data sets, one or more previous pose spaces, and one or more previous cost spaces. In these or other embodiments, respective previous pose parameter sets of the previous pose spaces that have hypothetical values closest to the transformed hypothetical values may be mapped to respective current pose parameter sets. The respective costs associated with the previous pose parameter sets may be used to determine the respective costs of the current pose parameter sets to which the respective previous pose parameter sets are mapped.

In some embodiments, the costs of the current pose parameter sets may be determined based on a combination of the respective current costs of the current pose parameter sets and the respective previous costs of the previous pose parameter sets mapped to the respective current pose parameter sets. In some embodiments, the combination may include an average of the costs. In these or other embodiments, the combination may include a weighted average. Additionally or alternatively, the weighting may be based on a recency of the previous costs and/or covariances associated with the previous costs.

For example, the cost of a particular current pose parameter set may include an average of the current cost determined for the particular current pose parameter set and of the respective costs of the one or more previous pose parameter sets that are mapped to the particular current pose parameter set. In these or other embodiments, a weighted average may be determined in which costs that are associated with previous pose parameter sets that are closer in time to the current pose parameter set may be weighted higher than costs that are associated with previous pose parameter sets that are further in time from the current pose parameter set.

In some embodiments, the cost space 736 may include respective final costs for the respective pose parameter sets. In these or other embodiments, each final cost for each respective pose parameter set may be based on one or more of: the respective distance costs, the respective value costs, the respective mapped previous costs, or any combination thereof.

In some embodiments, the alignment engine 712 may include an aligner 738 configured to determine the alignment parameters 722. In some embodiments, the aligner 738 may be configured to determine the alignment parameters 722 based on the cost space 734. For example, in some embodiments, the alignment parameters 722 may include one or more pose parameters that may be determined based on the pose parameter set of the cost space 734 that has a cost that corresponds to a greatest degree of alignment between the first data 704 and the second data 706. For instance, in instances in which lower cost values correspond to higher degrees of alignment, the pose parameters of the alignment parameters 722 may be based on a selected pose parameter set that is selected in response to having the lowest determined cost. In these or other embodiments, one or more of the hypothetical pose parameters of the selected pose parameter set may be used as the pose parameters included in the alignment parameters 722.

In these or other embodiments, the alignment parameters 722 may include one or more relative transformations between the first data 704 and the second data 706 to align the first data 704 and the second data 706. For example, the relative transformations may be determined based on the initial alignment of the first data 704 and the second data 706 and the translation between the pose parameters of the selected pose parameter set and the pose parameters that correspond to the initial orientation of the first data 704.

In some embodiments, the alignment parameters 722 may indicate a position and/or orientation of the vehicle in a map and/or a particular area represented by the map. For example, in some embodiments, the first data 704 may be sensor data obtained by the vehicle while in the particular area and the second data 706 may be map data of the particular area. The pose parameters of the alignment parameters 722 and the relative transformations determined to align the first data 704 and the second data 706 may indicate a corresponding location and/or orientation in the map of the second data 706, which may accordingly provide for localization of the vehicle in the map. In these or other embodiments, the location and/or orientation in the map may be used to determine the location and/or orientation in the particular area represented by the map.

In these or other embodiments, the alignment parameters 722 may be used to generate map data by aligning the first data 704 and the second data 706. For example, the first data 704 may correspond to a first vehicle that traverses a particular area and the second data 706 may correspond to a second vehicle that traverses the area. In these or other embodiments, the first data 704 and the second data 706 may correspond to the same vehicle while the vehicle is traversing the area, but may include sensor data obtained at different points in time. Based on the alignment parameters 722, the first data 704 and the second data 706 may be aligned and combined by applying the relative transformations. The aligned and combined first data 704 and second data 706 may be used as map data.

Modifications, additions, or omissions may be made to FIGS. 7A and 7B without departing from the scope of the present disclosure. For example, one or more of the operations described with respect to the different elements of the alignment engine 722 may be performed in a different order than described, at the same time as one or more other operations, and/or may be omitted. Further, delineation of the alignment engine 722 into the pose space generator 730, the cost space generator 734, and the aligner 738 is for explanatory purposes and is not meant to be limiting. In addition, one or more of the pose space generator 730, the cost space generator 734, or the aligner 738 may be omitted from one or more embodiments of the alignment engine 722. In addition, one or more other elements may be included in the alignment engine 722. For instance, the alignment engine 722 may include the ego-motion engine 514 of FIG. 5 (or something similar) to determine the location estimation described above.

Figure 8:
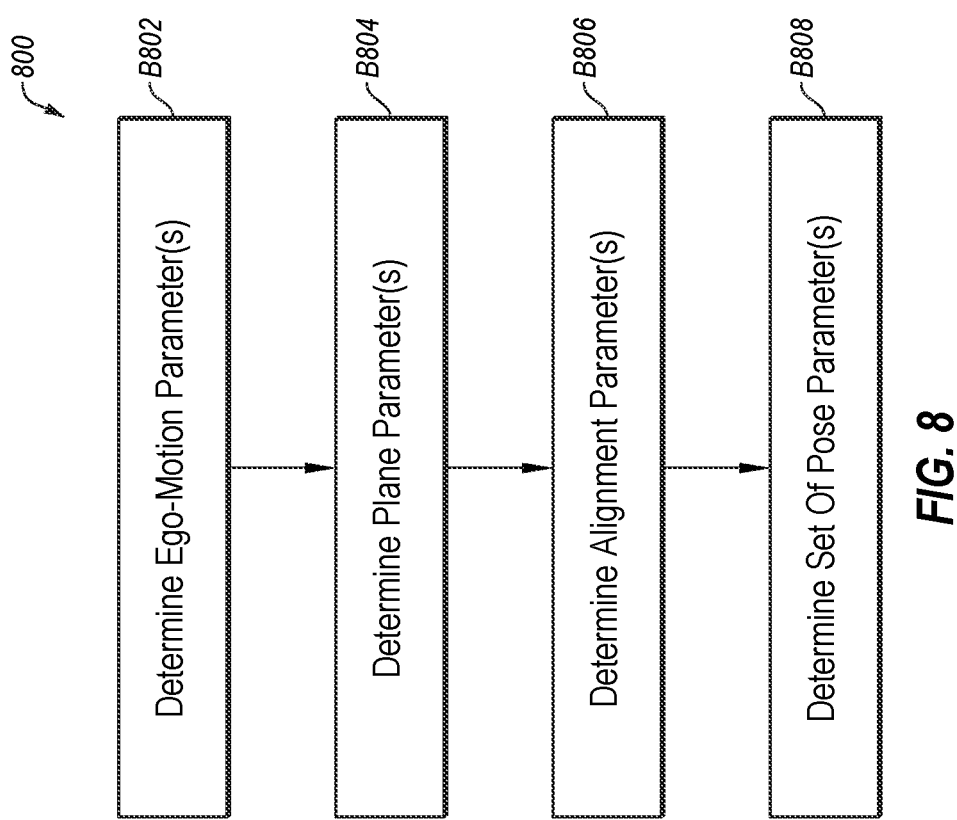
FIG. 8 illustrates an example method for performing localization of an ego-machine, according to one or more embodiments of the present disclosure.

FIG. 8 illustrates an example method 800 for performing localization of a vehicle, according to one or more embodiments of the present disclosure. The method 800 may be performed by any suitable system, apparatus, or device using any combination of hardware, firmware, and/or software. For instance, various operations may be carried out by one or more processors executing instructions stored in memory. The operations of the method 800 may also be embodied as computer-usable instructions stored on computer storage media. Additionally or alternatively, one or more of the operations of the method 800 may be provided by a standalone application, a service or hosted service (standalone or in combination with another hosted service), or a plug-in to another product, to name a few. By way of example, in some embodiments, one or more operations of the method 800 may be performed by the localization engine 500 described with respect to FIG. 5, the plane engine 610 of FIG. 6, and/or the alignment engine 712 of FIG. 7A. In these or other embodiments, one or more operations may be performed by one or more computing devices, such as that described in further detail below with respect to FIG. 15. In these or other embodiments, one or more operations of the method 800 may be performed by a computing system disposed at a data center, such as that described below with respect to FIG. 16.

In some embodiments, the method 800, at block B802, may include determining one or more ego-motion parameters based on ego-motion data associated with movement of a vehicle. The one or more ego-motion parameters may include one or more first pose parameters of the vehicle. The first pose parameters may include one or more of roll, pitch, yaw, or position (lateral, forward, height) of the vehicle. In these or other embodiments, the one or more ego-motion parameters may be relative with respect to a map and its corresponding local coordinate system and/or absolute with respect to a particular reference system (e.g., a geographical system that includes longitude, latitude, elevation). In some embodiments, the one or more ego-motion parameters may be determined as discussed above with respect to FIG. 5.

At block B804, one or more plane parameters may be determined. The one or more plane parameters may include one or more second pose parameters of the vehicle. The second pose parameters may include at least one same pose parameter type as the first pose parameters. In these or other embodiments, the second pose parameters may include all the same pose parameter types as the first pose parameters. Additionally or alternatively, the second pose parameters may include at least one different pose parameter type as the first pose parameters. In these or other embodiments, the pose parameter types of the second pose parameters may each be different from the pose parameter types of the first pose parameters.

In some embodiments, the plane parameters may be determined based on a ground plane associated with a pose of the vehicle, the one or more plane parameters including one or more second pose parameters of the vehicle. In some embodiments, the one or more plane parameters may be determined as discussed above with respect to FIGS. 5 and 6.

At block B806, one or more alignment parameters may be determined. The one or more alignment parameters may include one or more third pose parameters of the vehicle. The third pose parameters may include at least one same pose parameter type as the first pose parameters and/or the second pose parameters. In these or other embodiments, the third pose parameters may include all the same pose parameter types as the first pose parameters and/or the second pose parameters. Additionally or alternatively, the third pose parameters may include at least one different pose parameter type as the first pose parameters and/or the second pose parameters. In these or other embodiments, the pose parameter types of the third pose parameters may each be different from the pose parameter types of the first pose parameters and/or the second pose parameters.

In some embodiments, the alignment parameters may be determined based on a comparison between sensor data associated with the vehicle and map data associated with a geographical area. In some embodiments, the one or more alignment parameters may be determined as discussed above with respect to FIGS. 5, 7A, and 7B.

At block B808, a set of pose parameters may be determined based on the one or more ego-motion parameters, the one or more plane parameters, and the one or more alignment parameters. The set of pose parameters may be used for localization of the vehicle by indicating the vehicle position with respect to the map of the map data and/or with respect to a reference system such as a geographical reference system. In some embodiments, the set of pose parameters may be determined as discussed above with respect to FIG. 5.

Modifications, additions, or omissions may be made to the method 800 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

Figure 9:
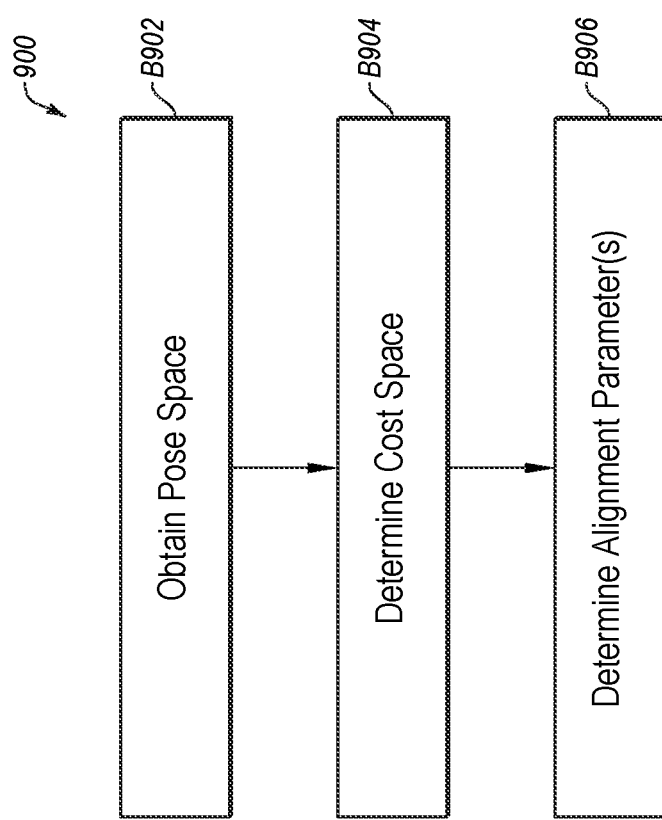
FIG. 9 illustrates an example method for performing alignment operations with respect to sets of sensor data, according to one or more embodiments of the present disclosure.

FIG. 9 illustrates an example method 900 for performing alignment operations with respect to sets of sensor data, according to one or more embodiments of the present disclosure. The method 900 may be performed by any suitable system, apparatus, or device using any combination of hardware, firmware, and/or software. For instance, various operations may be carried out by one or more processors executing instructions stored in memory. The operations of the method 900 may also be embodied as computer-usable instructions stored on computer storage media. Additionally or alternatively, one or more of the operations of the method 900 may be provided by a standalone application, a service or hosted service (standalone or in combination with another hosted service), or a plug-in to another product, to name a few. By way of example, in some embodiments, one or more operations of the method 900 may be performed by the localization engine 500 described with respect to FIG. 5 and/or the alignment engine 712 of FIG. 7A. In these or other embodiments, one or more operations may be performed by one or more computing devices, such as that described in further detail below with respect to FIG. 15. In these or other embodiments, one or more operations of the method 900 may be performed by a computing system disposed on an ego-machine, such as a vehicle as described below with respect to FIGS. 14A-14D.

In some embodiments, the method 900, at block B902, may include obtaining a pose space that includes multiple pose parameter sets. Each respective pose parameter set may include one or more hypothetical pose parameters with respect to first sensor data captured by one or more sensors. In some embodiments, the pose space may be obtained as discussed above with respect to FIGS. 7A and 7B.

At block B904, a cost space may be determined for the pose space. The determining of the cost space may include performing a cost determination for each respective pose parameter set of the pose space. The cost determination may be based on a comparison between second sensor data and the first sensor data in which the first sensor data is oriented based on the respective pose parameter set. In some embodiments, the cost space may be determined as discussed above with respect to FIGS. 7A and 7B.

At block B906, the first sensor data and the second sensor data may be aligned based on the cost space. In some embodiments, the aligning may include determining one or more alignment parameters based on the cost space. Additionally or alternatively, the aligning may include determining relative poses between the first sensor data and the second sensor data. The determining of the relative poses may include determining relative transformations between pose parameters of the first sensor data and of the second sensor data such that points of the first sensor data and of the second sensor data that correspond to a same object or area may be aligned. In some embodiments, the alignment parameters and/or the aligning may be determined or performed as discussed above with respect to FIGS. 7A and 7B.

Modifications, additions, or omissions may be made to the method 900 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

Figure 10:
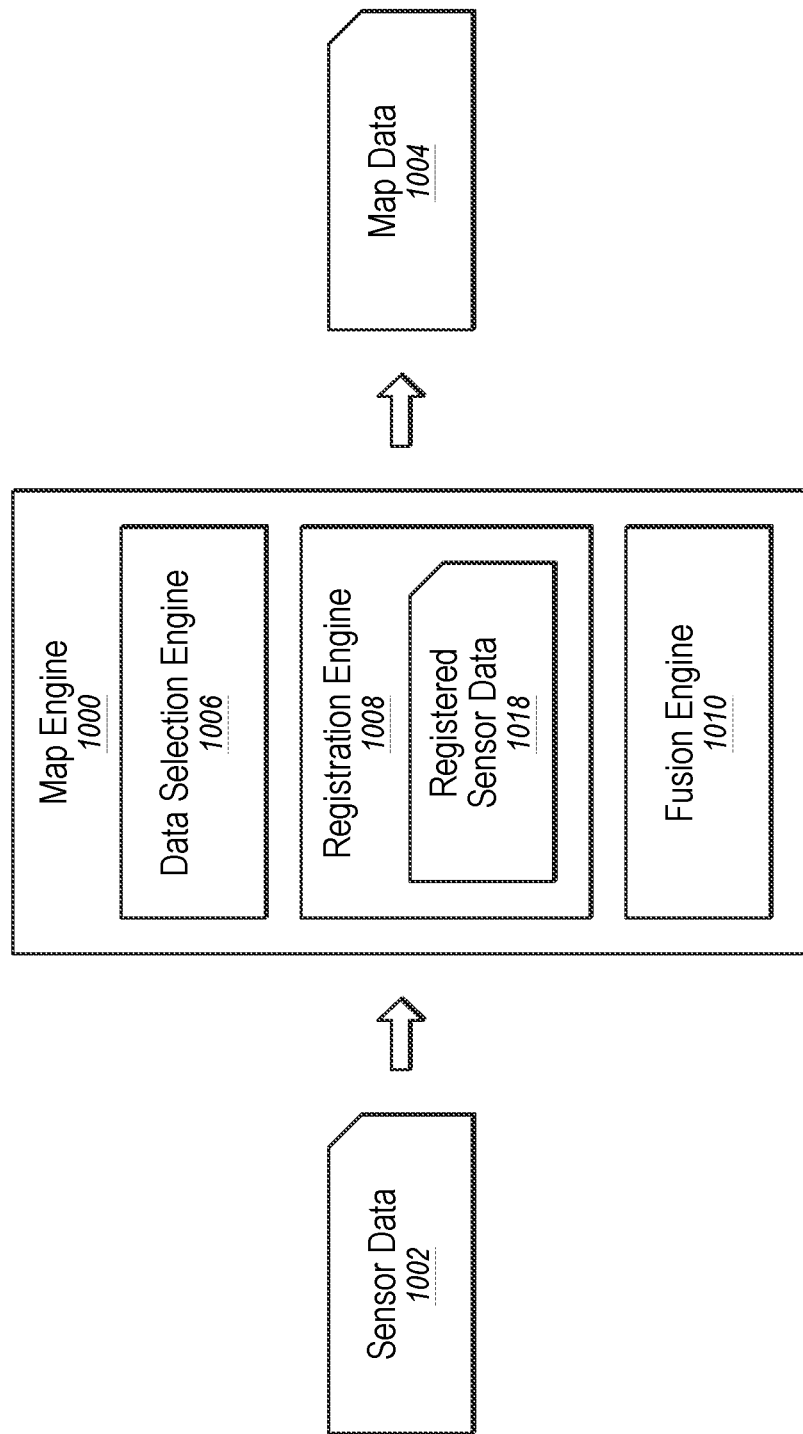
FIG. 10 illustrates an example map engine configured to generate map data based on sensor data, according to one or more embodiments of the present disclosure.

FIG. 10 illustrates an example map engine 1000 configured to generate map data 1004 based on sensor data 1002, according to one or more embodiments of the present disclosure. In some embodiments, the map engine 1000 may be implemented by a map generation system (e.g., such as described below with respect to FIG. 12).

The sensor data 1002 may include any suitable data obtained from any suitable sensor that may be used to represent a physical space (e.g., a geographical area). For example, the sensor data 1002 may include LIDAR data and/or RADAR data. In some embodiments, the sensor data 1002 may be associated with one or more vehicles. For example, the sensor data 1002 may include multiple sensor data sets in which each respective sensor data set may be obtained by one or more sensors disposed on a corresponding vehicle during traversal through the space by the corresponding vehicle. In some embodiments, a sensor data set may correspond to sensor data that may be grouped together with respect to a time. For example, a LIDAR point cloud associated with a single LIDAR scan may be a sensor data set. As another example, a RADAR point cloud such as the RADAR point cloud 104 of FIG. 1A may be a sensor data set. In addition, a set of one or more images that may be stitched together may be another example of a sensor data set.

In these or other embodiments, two or more of the sensor data sets may correspond to a same track traversed by a same vehicle through the space. For example, as a particular vehicle is traversing through the space, the sensors of the particular vehicle may capture a sensor data set every n time periods and the sensor data 1002 may include multiple of the sensor data sets that are captured during the traversal. Additionally or alternatively, two or more of the sensor data sets may correspond to different tracks traversed by a same vehicle or different vehicles through the space. In the present disclosure reference to a "track" may refer to a path that may be traversed by a corresponding vehicle through a space.

The map data 1004 may include sensor data 1002 that may be aggregated to depict a map that represents a particular space (e.g., a particular geographical area). For example, the map data 1004 may include aggregated LIDAR data and/or RADAR data that corresponds to the particular space and that provides a representation of various aspects of the particular space as indicated by the different data types. In some embodiments, the map data 1004 may accordingly include LIDAR map data associated with a LIDAR map of the particular space (e.g., including LIDAR images of the particular space), RADAR map data associated with a RADAR map of the particular space (e.g., including LIDAR images of the particular space), or any applicable combination thereof. In some instances, the sensor data sets of the map data 1004 may be referred to as "frames" with respect to the corresponding map.

The map engine 1000 may include code and routines configured to enable a computing system to perform one or more operations related to generating the map data 1004 based on the sensor data 1002. Additionally or alternatively, the map engine 1000 may be implemented using hardware including one or more processors, graphical processing units (GPUs), data processing units (DPUs), microprocessors (e.g., to perform or control performance of one or more operations), field-programmable gate arrays (FPGAs), and/or application-specific integrated circuits (ASICs). In some other instances, the map engine 1000 may be implemented using a combination of hardware and software. In the present disclosure, operations described as being performed by the map engine 1000 may include operations that the map engine 1000 may direct a corresponding system to perform.

In some embodiments, the map engine 1000 may include a sensor data selection engine 1006 ("selection engine 1006"). The selection engine 1006 may be configured to select sensor data 1002 that corresponds to a particular space for which the map data 1004 may be generated. For example, the map data 1004 may be generated for a particular geographical area that has a particular size. The selection engine 1006 may accordingly be configured to select sensor data sets of the map data 1004 that have at least a portion of corresponding data that represents at least a portion of the particular geographical area. In these or other embodiments, the selection engine 1006 may be configured to select multiple sensor data sets that correspond to the particular space. In these or other embodiments, the selection engine 1006 may be configured to select sensor data sets that correspond to multiple tracks that traverse through the particular space. Additionally or alternatively, the selection engine 1006 may be configured to select all sensor data sets that correspond to the particular space.

The selection engine 1006 may be configured to determine which sensor data sets correspond to the particular space according to any suitable technique. For example, in some embodiments, the sensor data sets may include location information (e.g., GPS coordinates) associated therewith that indicate respective locations that correspond to the respective sensor data sets.

In some embodiments, the map engine 1000 may include a registration engine 1008. The registration engine 1008 may be configured to register the selected sensor data sets to each other such that the selected sensor data sets may be aligned with respect to each other. The registration may include determining relative poses between the selected sensor data sets. In these or other embodiments, the registration may include determining pose transformations with respect to a common coordinate system. The registration may be performed according to any suitable technique. By way of example, in some embodiments, the registration may include determining one or more alignment parameters between the sensor data sets. For instance, in some embodiments, one or more operations described above with respect to the alignment engine 712 of FIG. 7A may be performed between two or more of the sensor data sets to determine relative transformations between the sensor data sets as part of performing the registration. In these or other embodiments, the registration engine 1008 may be configured to perform one or more pose optimization operations according to any suitable technique as part of the registration.

In some embodiments, the registration engine 1008 may output registered sensor data 1018 ("registered data 1018") after performing the registration. The registered data 1018 may include the selected sensor data being aligned according to the registration. In these or other embodiments, the registered data 1018 may include indications as to which sensor data included therein corresponds to which sensor data set. Further, some embodiments, the sensor data sets of the registered data 1018 may each correspond to a respective track. In these or other embodiments, the registered data

1018 may include indications as to which sensor data included therein and/or which of the indicated sensor data sets corresponds to which track.

In some embodiments, the registered data 1018 may provide a 2-dimensional or 3-dimensional representation of the particular space, in which positions in the representation may correspond to physical locations in the particular space. For instance, the 2-dimensional representations may be images (e.g., RADAR images) that may be divided into multiple 2-dimensional cells (e.g., pixels). The positions of the pixels in the images may correspond to locations in the particular space represented by the images. As another example, the 3-dimensional representation may be a 3-dimensional point cloud (e.g., a LIDAR point cloud) that may be divided into multiple 3-dimensional cells (e.g., voxels). The positions of the voxels in the point cloud may correspond to locations in the particular space represented by the point cloud.

In some embodiments, the registered data 1018 may be used as the map data 1004. Additionally or alternatively, the registered data 1018 may be a preliminary version of the map data that may undergo further processing before being output as the map data 1004.

For example, in some embodiments, the map engine 1000 may include a fusion engine 1010. The fusion engine 1010 may be configured to filter dynamic objects from the registered data 1018. In some embodiments, the fusion engine 1010 may be configured to differentiate between dynamic objects and static objects based on an analysis of the sensor data sets. The analysis may also be such that dynamic objects that may have been stationary during one or more sensor sampling times (e.g., RADAR scans, LIDAR scans, etc.) may still be identified as dynamic objects instead of static objects, which may improve the accuracy of the filtering. As indicated above, dynamic objects may include objects that may move and that may be transient in the particular space. Examples of dynamic objects may include people, animals, other vehicles etc. Further, examples of dynamic objects that may be captured as stationary objects may include parked vehicles, vehicles waiting at a stop sign or stop light, pedestrians waiting to cross a street, etc.

For example, in some embodiments, the fusion engine 1010 may be configured to identify static objects based on how many sensor data sets of the registered data 1018 indicate an object at a corresponding same location. In these or other embodiments, the fusion engine 1010 may be configured to make such determinations based on comparisons between sensor data sets that correspond to a same track and/or comparisons between sensor data sets that correspond to different tracks.

For example, in some embodiments, the fusion engine 1010 may be configured to count the number of sensor data sets that correspond to a same track that indicate the presence of an object at a particular location in the particular space that may be represented by the registered data 1018. For example, in some embodiments, the fusion engine 1010 may select a particular cell of the registered data 1018 (e.g., a pixel or a voxel) and may select a particular track. The fusion engine 1010 may be configured to determine how many (if any) sensor data sets that correspond to the particular track provide object data with respect to the particular cell, in which the object data indicates presence of an object at a particular location in the particular space that corresponds to the particular cell.

In these or other embodiments, in response to the number of sensor data sets of the particular track indicating presence of the object with respect to the particular cell satisfying a single track threshold, a determination may be made that the object is a static object. Conversely, in response to the number of sensor data sets of the particular track indicating presence of the object with respect to the particular cell not satisfying the single track threshold, a determination may be made that the object is a dynamic object.

The single track threshold may be based on an error tolerance with respect to false identifications of static or dynamic objects. The error tolerance may be based on safety considerations in some embodiments. For example, a false identification of an object as being dynamic when the object is in fact a static object may create a safety hazard in the map data 1004. As such, the error tolerance may be such to err on the side of falsely identifying dynamic objects as being static. For example, based on such an error tolerance, in some embodiments, the single track threshold may be two or more.

In some embodiments, the fusion engine 1010 may be configured to perform the single track analysis described above with respect to each of multiple tracks. In these or other embodiments, the single track analysis may be performed with respect to every track of the registered data 1018. Additionally or alternatively, each of one or more of the single track analyses may be made with respect to multiple cells (e.g., multiple pixels or voxels) of the registered data 1018. In these or other embodiments, each of one or more of the single track analyses may be made with respect to the entire representation of the registered data 1018 as divided up according to the cells (e.g., with respect to all pixels or voxels).

In some embodiments, the fusion engine 1010 may be configured to count the number of sensor data sets that correspond to more than one track that also indicate the presence of an object at a particular location in the particular space that may be represented by the registered data 1018. For example, in some embodiments, the fusion engine 1010 may be configured to determine how many (if any) sensor data sets of different tracks provide object data with respect to the particular cell. In these or other embodiments, in response to the number of sensor data sets of the multiple tracks indicating presence of the object with respect to the particular cell satisfying a multiple track threshold, a determination may be made that the object is a static object. Conversely, in response to the number of sensor data sets of the multiple tracks indicating presence of the object with respect to the particular cell not satisfying the multiple track threshold, a determination may be made that the object is a dynamic object.

The multiple track threshold may be determined based on an error tolerance similar to the single track threshold in some embodiments. Additionally or alternatively, the multiple track threshold may be based on a majority of the total number of tracks that correspond to the registered data 1018. In these or other embodiments, the multiple track threshold may be determined based on the number of tracks that pass near respective cells. For example, the more tracks that are near the cell, the larger the multiple track threshold in some embodiments. Therefore, each cell may have different multiple track thresholds, depending on the number of nearby tracks. In some embodiments, the multiple track threshold may be used as a finer filtering mechanism than the single track threshold such that it may be greater than or equal to the single track threshold in some embodiments.

In some embodiments, the fusion engine 1010 may be configured to perform the multiple track analysis described above with respect to one, some, or all of the tracks. Additionally or alternatively, the multiple track analysis may be made with respect to multiple cells (e.g., multiple pixels or voxels) of the registered data 1018. In these or other embodiments, a multiple track analysis may be made with respect to the entire representation of the registered data 1018 as divided up according to the cells (e.g., with respect to all pixels or voxels).

In some embodiments, the fusion engine 1010 may be configured to determine whether an object is a static object based on a determination as to whether the object is disposed along one or more of the tracks. For example, an object that is identified by one or more data sets at a location at which one or more later tracks pass through may be a dynamic object. Therefore, in some embodiments, the fusion engine 1010 may be configured to at least weight a determination as to whether an object is static based on whether the detected object is disposed along one or more tracks.

For example, in some embodiments, the fusion engine 1010 may be configured to subtract from the single track and/or multiple track object count of data sets that correspond to a particular cell of the registered data 1018 a track count of how many tracks pass through a particular location in the particular space that corresponds to the particular cell. The subtracting based on the track count may thus change whether the corresponding object count satisfies the corresponding threshold for determining whether the corresponding object is static or dynamic. In these or other embodiments, a weighting factor (e.g., a factor between 1 and 0) may be applied to the track count prior to subtracting the track count from the corresponding object count. In some embodiments, the weighting factor may be determined based on the error tolerance. By way of example, the weighting factor may be 0.5.

The fusion engine 1010 may be configured to perform one or more filtering operations based on the static object determinations. For example, the fusion engine 1010 may be configured to remove sensor data that corresponds to objects determined as being dynamic (e.g., not static). In these or other embodiments, the fusion engine 1010 may be configured to perform the filtering based on the single track analyses, the multiple track analyses, or a combination of single track and multiple track analyses.

For example, in some embodiments, the fusion engine 1010 may be configured to perform a first determination as to whether one or more objects are static based on corresponding single track analyses. In these or other embodiments, the fusion engine 1010 may be configured to perform a second determination as to whether the one or more objects are static based on corresponding multiple track analyses.

In some embodiments, based on a combination of the first determination and the second determination, the fusion engine 1010 may make a final determination with respect to whether the objects are static. For example, the fusion engine 1010 may be configured to only determine that objects are static in response to both the first determination and the second determination indicating that the corresponding objects are static. In some embodiments, the single track analysis or the multiple track analysis may be weighted higher for the final determination. For example, the multiple track analysis may have a higher weighing than the single track analysis because the corresponding data may be more robust.

In some embodiments, the single track analysis and filtering may operate as a preliminary filtering. In these or other embodiments, the multiple track analysis and filtering may be performed after the preliminary filtering (e.g., with respect to objects identified as being static by the single track analysis).

In some embodiments, the fusion engine 1010 may be configured to output the filtered registered data 1018 as the map data 1004. As such, the map engine 1000 may be configured to generate maps (e.g., as represented by the map data 1004) based on the sensor data 1002 in a manner that may improve the accuracy of the maps by filtering out dynamic objects including some dynamic objects that may otherwise have been included because of being stationary during the capture of at least some of the sensor data 1002.

Modifications, additions, or omissions may be made to FIG. 10 without departing from the scope of the present disclosure. For example, one or more of the operations described with respect to the different elements of the map engine 1000 may be performed in a different order than described, at the same time as one or more other operations, and/or may be omitted. Further, delineation of the map engine 1000 into the data selection engine 1006, the registration engine 1008, and the fusion engine 1010 is for explanatory purposes and is not meant to be limiting. In addition, one or more of the data selection engine 1006, the registration engine 1008, or the fusion engine 1010 may be omitted from one or more embodiments of the map engine 1000. In addition, one or more other elements may be included in the map engine 1000.

Figure 11:
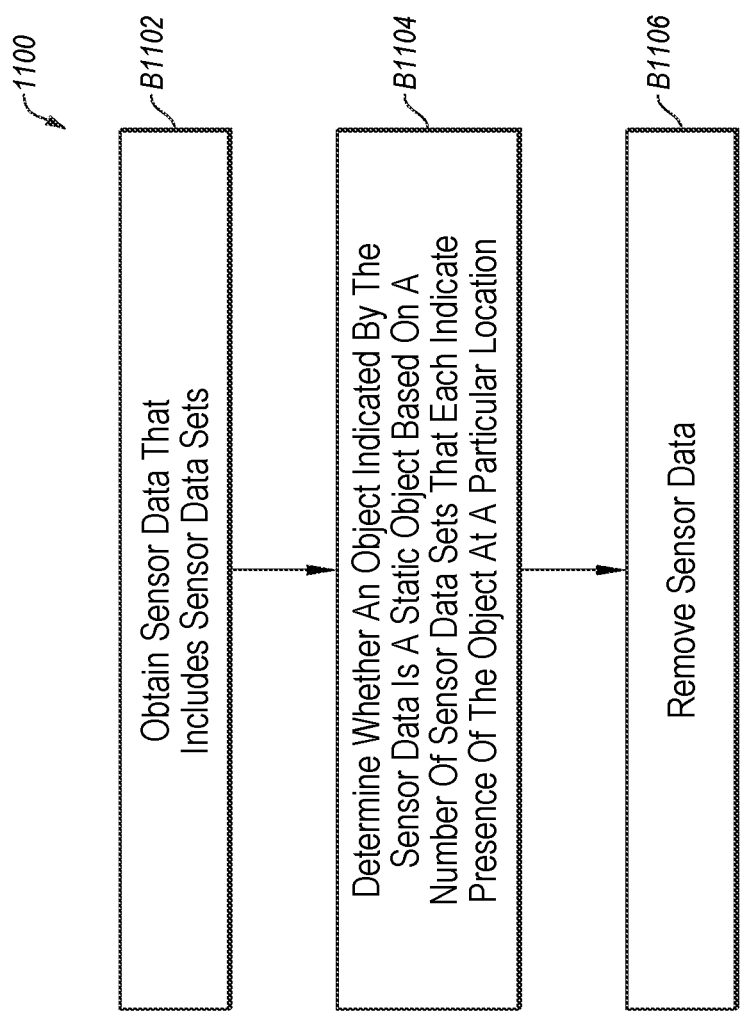
FIG. 11 illustrates an example method for performing filtering of dynamic objects, according to one or more embodiments of the present disclosure.

FIG. 11 illustrates an example method 1100 for performing filtering of dynamic objects, according to one or more embodiments of the present disclosure. The method 1100 may be performed by any suitable system, apparatus, or device using any combination of hardware, firmware, and/or software. For instance, various operations may be carried out by one or more processors executing instructions stored in memory. The operations of the method 1100 may also be embodied as computer-usable instructions stored on computer storage media. Additionally or alternatively, one or more of the operations of the method 1100 may be provided by a standalone application, a service or hosted service (standalone or in combination with another hosted service), or a plug-in to another product, to name a few. By way of example, in some embodiments, one or more operations of the method 1100 may be performed by the map engine 1000 described with respect to FIG. 10. In these or other embodiments, one or more operations may be performed by one or more computing devices, such as that described in further detail below with respect to FIG. 15. In these or other embodiments, one or more operations of the method 1100 may be performed by a computing system disposed on an ego-machine, such as a vehicle as described below with respect to FIGS. 14A-14D.

In some embodiments, the method 1100, at block B1102, may include obtaining sensor data that represents a space (e.g., a geographical area). The sensor data may include multiple sensor data sets, in which each respective sensor data set may be obtained by one or more sensors disposed on a corresponding ego-machine during traversal through the space by the corresponding ego-machine. For example, the sensor data 1002 of FIG. 10 is an example of the sensor data that may be obtained.

At block B1104, it may be determined whether an object indicated by the sensor data is a static object based on a number of sensor data sets that each indicate presence of the object at a particular location in the space (e.g., a geographical area). For example, the determination may be made based on a single track analysis and/or a multiple track analysis such as described above with respect to FIG. 10.

At block 1106, sensor data that corresponds to the object may be removed in response to determining that the object is not a static object. In some embodiments, the removal of the data may be performed such as described above with respect to FIG. 10.

Modifications, additions, or omissions may be made to the method 1100 without departing from the scope of the present disclosure. For example, the order of one or more of the operations described may vary than the order in which they were described or are illustrated. Further, each operation may include more or fewer operations than those described. In addition, the delineation of the operations and elements is meant for explanatory purposes and is not meant to be limiting with respect to actual implementations.

Figure 12:
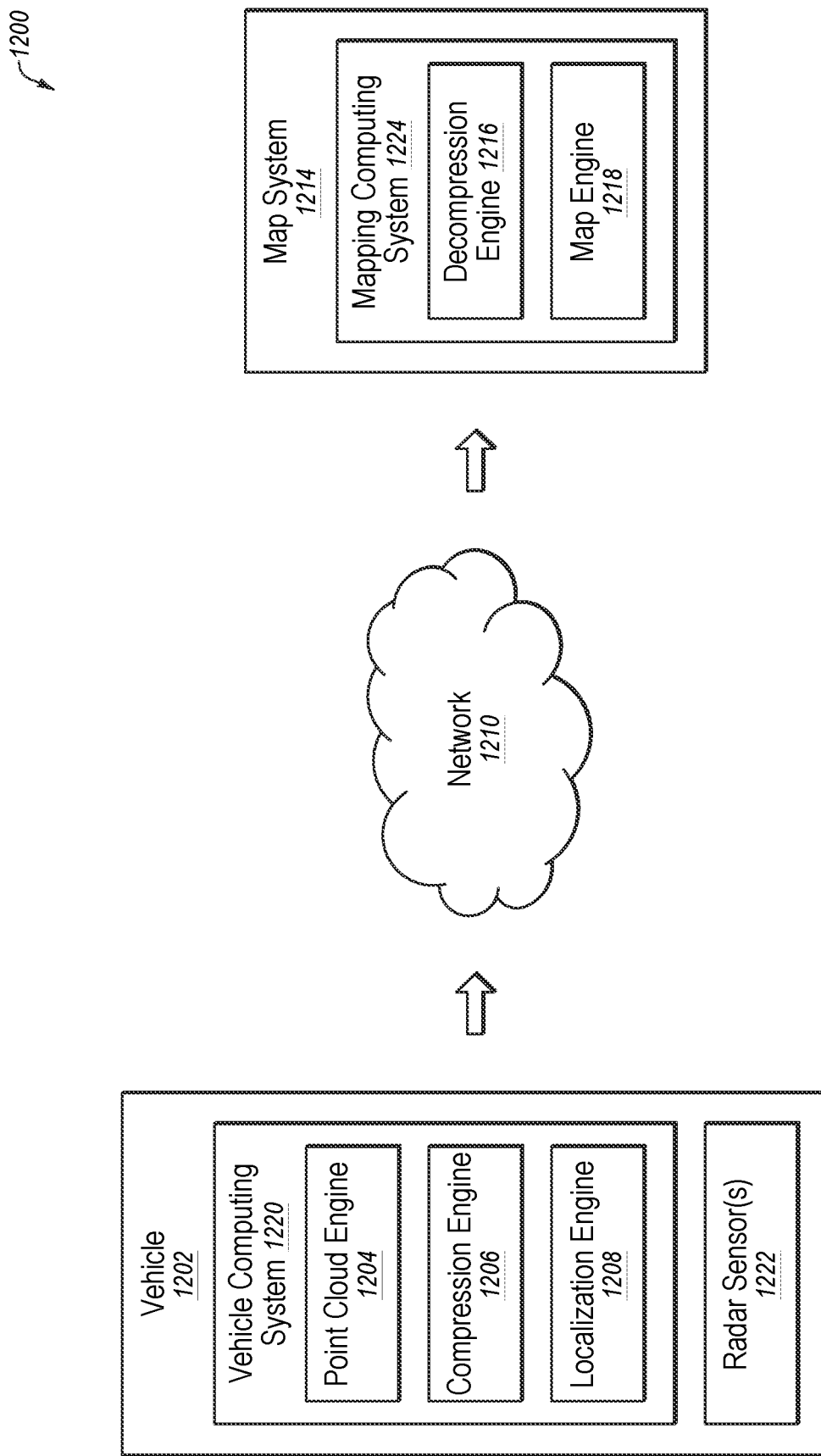
FIG. 12 illustrates an example system configured to perform end-to-end mapping and/or localization operations with respect to RADAR data, according to one or more embodiments of the present disclosure.

FIG. 12 illustrates an example system 1200 configured to perform end-to-end mapping and/or localization operations with respect to RADAR data, according to one or more embodiments of the present disclosure. In general, the system 1200 may include an ego-machine (e.g., vehicle 1202) and a map system 1214 configured to communicate with each other over a network 1210.

The vehicle 1202 may include one or more RADAR sensors 1222 configured to obtain RADAR data such as the RADAR data 102 described above with respect to FIG. 1A. In these or other embodiments, the vehicle 1202 may include a vehicle computing system 1220 configured to perform one or more operations with respect to the RADAR data that may be obtained by the RADAR sensors 1222. By way of example, the vehicle computing system 1220 may one or more computing devices, such as that of FIG. 15. Further, the vehicle 1400 of FIGS. 14A-14D may be an example of the vehicle 1202 in some embodiments.

The vehicle computing system 1220 may include a point cloud engine 1204 in some embodiments. The point cloud engine 1204 may be configured to generate one or more RADAR point clouds based on the RADAR data. In some embodiments, the point cloud engine 100 of FIG. 1A may be an example of the point cloud engine 1204.

In these or other embodiments, the vehicle computing system 1220 may include a localization engine 1208. The localization engine 1208 may be configured to perform localization of the vehicle 1202. In some embodiments, the localization engine 1208 may be configured to perform the localization based on the RADAR point clouds. In some embodiments, the localization engine 500 of FIG. 5 may be an example of the localization engine 1208.

In these or other embodiments, the vehicle computing system 1220 may be configured to communicate RADAR data packets to the map system 1214 via a network 1210. In some embodiments, the RADAR data packets may each include one or more RADAR point clouds. The data packets 316 of FIG. 3A may be examples of the RADAR data packets. Additionally or alternatively, the vehicle computing system 1220 may include a compression engine 1206. The compression engine 1206 may be configured to generate compressed RADAR data packets for communication to the map system 1214. In some embodiments, the compressed data packet 304 of FIG. 3A may be an example of the compressed RADAR data packets. In some embodiments, the compression engine 300 of FIG. 3A may be an example of the compression engine 1206.

The network 1210 may include any communication network configured for communication of signals between the vehicle 1202 and the map system 1214. The network 1210 may include wired or wireless elements. The network 1210 may have numerous configurations including a star configuration, a token ring configuration, or another suitable configuration. Furthermore, the network 1210 may include a local area network (LAN), a wide area network (WAN) (e.g., the Internet), and/or other interconnected data paths across which multiple devices may communicate. In some embodiments, the network 1210 may include a peer-to-peer network. The network 1210 may also be coupled to or include portions of a telecommunications network that may enable communication of data in a variety of different communication protocols.

In some embodiments, the network 1210 includes or is configured to include a BLUETOOTH® communication network, a Z-Wave® communication network, an Insteon® communication network, an EnOcean® communication network, a wireless fidelity (Wi-Fi) communication network, a ZigBee communication network, a HomePlug communication network, a Power-line Communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 1210 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other suitable protocol. In some embodiments, the network 1210 may be included in or implemented with respect to a network environment, such as the network environment of FIG. 16.

The map system 1214 may include any suitable system, apparatus, or device that may be configured to generate map data based on RADAR data. For example, the map system 1214 may be included in or include a server system configured to generate map data. In these or other embodiments, the map system 1214 may include a distributed map system in which one or more components may be distributed across different devices and/or locations. In some embodiments, the map data 1004 of FIG. 10 may be an example of the map data that may be generated by the map system 1214.

In some embodiments, the map system 1214 may include a mapping computing system 1224 configured to perform one or more operations with respect to generating the map data. By way of example, the mapping computing system 1224 may include one or more computing devices, such as that of FIG. 15.

In some embodiments, the mapping computing system 1224 may be configured to receive (e.g., via the network 1210) RADAR data packets that may be communicated by the vehicle computing system 1220. In these or other embodiments, the RADAR data packets may be compressed. As such, in some embodiments, the mapping computing system 1224 may include a decompression engine 1216. The decompression engine 1216 may be configured to decompress compressed RADAR data packets. In some embodiments, the decompression engine 330 of FIG. 3A may be an example of the decompression engine 1216.

In these or other embodiments, the mapping computing system 1224 may include a map engine 1218. The map engine 1218 may be configured to generate map data based on the received RADAR data packets. In some embodiments, the map engine 1000 of FIG. 10 may be an example of the map engine 1218.

The system 1200 may accordingly be configured to generate RADAR point clouds and perform localization based on the RADAR point clouds in some embodiments. Additionally or alternatively, the system 1200 may be configured to generate RADAR map data based on obtained RADAR data (e.g., based on the RADAR point clouds). In these or other embodiments, the system 1200 may be configured to compress and decompress the RADAR data as part of communicating the RADAR data for corresponding map data generation.

Modifications, additions, or omissions may be made to FIG. 12 without departing from the scope of the present disclosure. For example, one or more of the operations described with respect to the different elements of the system 1200 may be performed in a different order than described, at the same time as one or more other operations, and/or may be omitted. Further, delineation of system 1200 into the various components is for explanatory purposes and is not meant to be limiting. In addition, one or more of the described components may be omitted. Further, one or more other elements may be included in the system 1200.

Moreover, the system 1200 may be configured to perform additional operations without departing from the scope of the present disclosure. For example, although the system 1200 is described in the context of RADAR and RADAR data, the system 1200 may be configured to additionally or alternatively perform one or more operations with respect to: obtaining LIDAR data, generating LIDAR point clouds, performing localization based on LIDAR data, compressing LIDAR data, decompressing LIDAR data, communicating LIDAR data, generating map data based on the LIDAR data, or any combination thereof.

Figure 13:
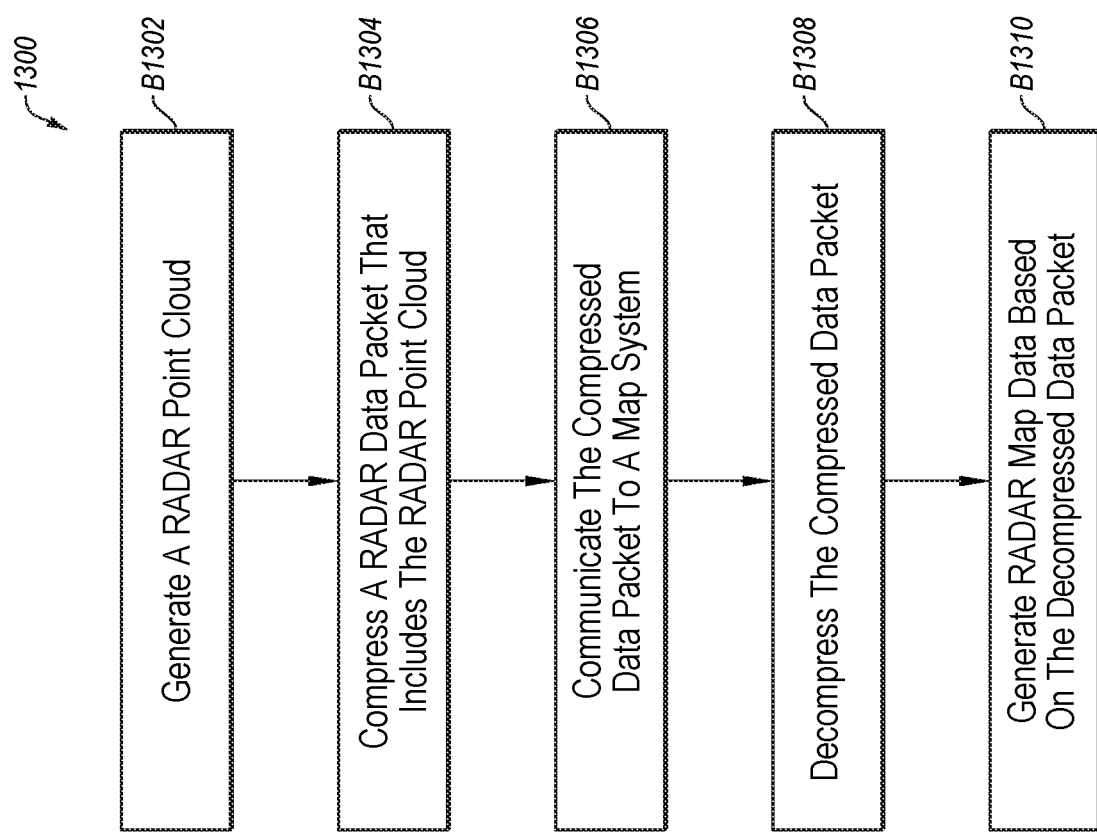
FIG. 13 illustrates an example method for performing end-to-end operations with respect to RADAR data, according to one or more embodiments of the present disclosure.

FIG. 13 illustrates an example method 1300 for performing end-to-end operations with respect to RADAR data, according to one or more embodiments of the present disclosure. The method 1300 may be performed by any suitable system, apparatus, or device using any combination of hardware, firmware, and/or software. For instance, various operations may be carried out by one or more processors executing instructions stored in memory. The operations of the method 1300 may also be embodied as computer-usable instructions stored on computer storage media. Additionally or alternatively, one or more of the operations of the method 1300 may be provided by a standalone application, a service or hosted service (standalone or in combination with another hosted service), or a plug-in to another product, to name a few. By way of example, in some embodiments, one or more operations of the method 1300 may be performed by one or more of the components of the system 1200 of FIG. 12.

In some embodiments, the method 1300, at block B1302, may include generating a RADAR point cloud based on RADAR data associated with one or more RADAR scans respectively performed by a respective RADAR sensor of one or more RADAR sensors. The RADAR point cloud may be generated according to any applicable description described in the present disclosure.

At block B1304, a RADAR data packet that includes the RADAR point cloud may be compressed. The compression may be performed according to any applicable description described in the present disclosure.

At block B1306, the compressed RADAR data packet may be communicated. For example, the compressed RADAR data packet may be communicated from a vehicle to a map system, such as described above with respect to FIG. 12.

At block B1308, the RADAR data packet may be decompressed. The decompression may be performed according to any applicable description described in the present disclosure.

At block B1310, RADAR map data may be generated based on the decompressed RADAR data packet and one or more other RADAR data packets. The RADAR map data generation may be performed according to any applicable description described in the present disclosure.

Modifications, additions, or omissions may be made to the method 1300 without departing from the scope of the present disclosure. For example, the order of one or more of the operations described may vary than the order in which they were described or are illustrated. Further, each operation may include more or fewer operations than those described. For example, in some embodiments the method 1300 may include one or more localization operations. In addition, the delineation of the operations and elements is meant for explanatory purposes and is not meant to be limiting with respect to actual implementations.

Example Autonomous Vehicle

Figure 14A:
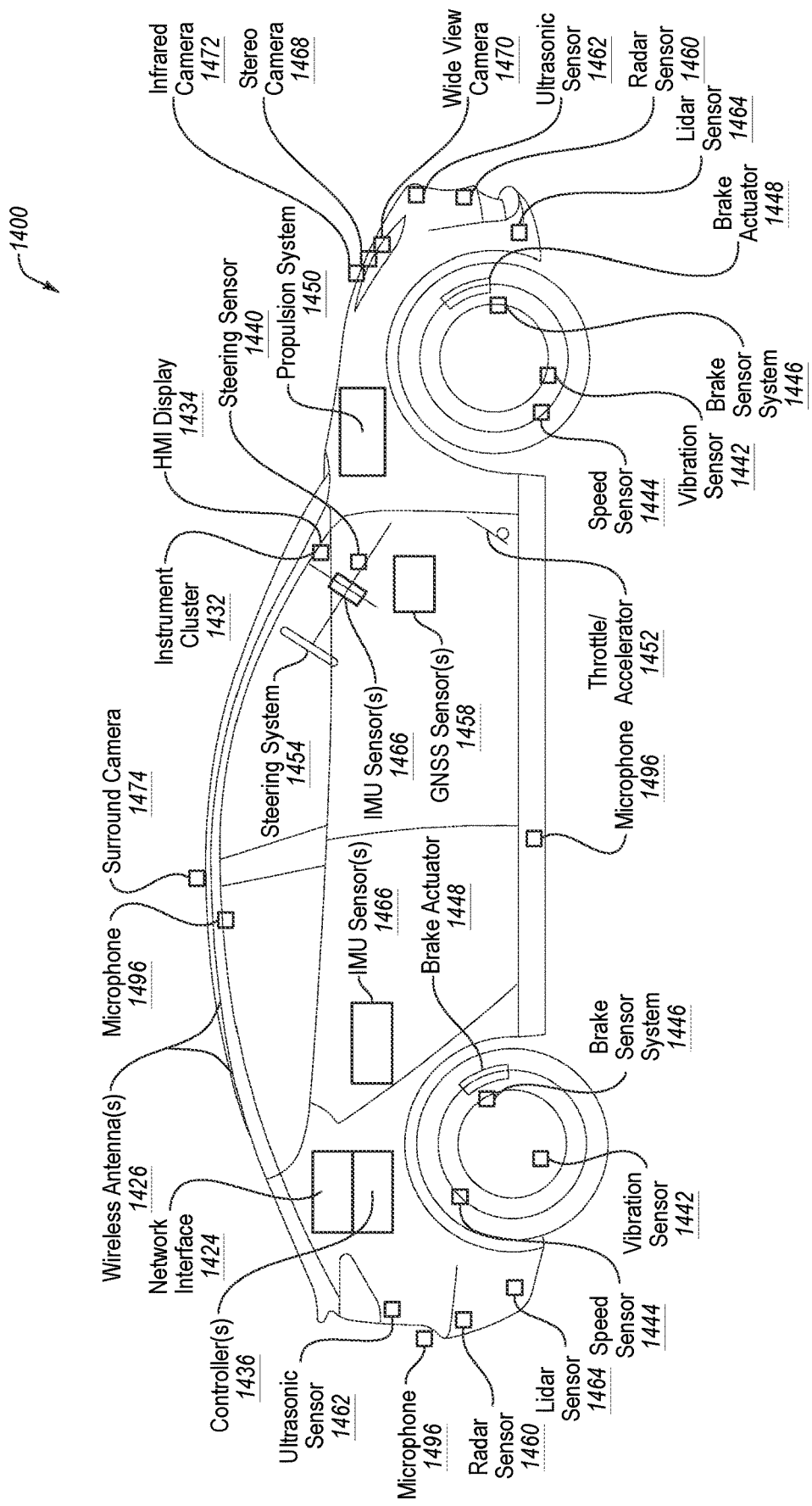
FIG. 14A is an illustration of an example autonomous vehicle, in accordance with some embodiments of the present disclosure.

FIG. 14A is an illustration of an example autonomous vehicle 1400, in accordance with some embodiments of the present disclosure. The autonomous vehicle 1400 (alternatively referred to herein as the "vehicle 1400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation. and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1400 may be capable of functionality in accordance with one or more of Level 3-Level 5 of the autonomous driving levels. For example, the vehicle 1400 may be capable of conditional automation (Level 3), high automation (Level 4), and/or full automation (Level 5), depending on the embodiment.

The vehicle 1400 may include components such as a chassis, a vehicle body, wheels (e.g., 2, 4, 6, 8, 18, etc.), tires, axles, and other components of a vehicle. The vehicle 1400 may include a propulsion system 1450, such as an internal combustion engine, hybrid electric power plant, an all-electric engine, and/or another propulsion system type. The propulsion system 1450 may be connected to a drive train of the vehicle 1400, which may include a transmission, to enable the propulsion of the vehicle 1400. The propulsion system 1450 may be controlled in response to receiving signals from the throttle/accelerator 1452.

A steering system 1454, which may include a steering wheel, may be used to steer the vehicle 1400 (e.g., along a desired path or route) when the propulsion system 1450 is operating (e.g., when the vehicle is in motion). The steering system 1454 may receive signals from a steering actuator 1456. The steering wheel may be optional for full automation (Level 5) functionality.

The brake sensor system 1446 may be used to operate the vehicle brakes in response to receiving signals from the brake actuators 1448 and/or brake sensors.

Controller(s) 1436, which may include one or more CPU(s), system on chips (SoCs) 1404 (FIG. 14C) and/or GPU(s), may provide signals (e.g., representative of commands) to one or more components and/or systems of the vehicle 1400. For example, the controller(s) may send signals to operate the vehicle brakes via one or more brake actuators 1448, to operate the steering system 1454 via one or more steering actuators 1456, and/or to operate the propulsion system 1450 via one or more throttle/accelerators 1452. The controller(s) 1436 may include one or more onboard (e.g., integrated) computing devices (e.g., supercomputers) that process sensor signals, and output operation commands (e.g., signals representing commands) to enable autonomous driving and/or to assist a human driver in driving the vehicle 1400. The controller(s) 1436 may include a first controller 1436 for autonomous driving functions, a second controller 1436 for functional safety functions, a third controller 1436 for artificial intelligence functionality (e.g., computer vision), a fourth controller 1436 for infotainment functionality, a fifth controller 1436 for redundancy in emergency conditions, and/or other controllers. In some examples, a single controller 1436 may handle two or more of the above functionalities, two or more controllers 1436 may handle a single functionality, and/or any combination thereof.

The controller(s) 1436 may provide the signals for controlling one or more components and/or systems of the vehicle 1400 in response to sensor data received from one or more sensors (e.g., sensor inputs). The sensor data may be received from, for example and without limitation, global navigation satellite systems sensor(s) 1458 (e.g., Global Positioning System sensor(s)), RADAR sensor(s) 1460, ultrasonic sensor(s) 1462, LIDAR sensor(s) 1464, inertial measurement unit (IMU) sensor(s) 1466 (e.g., accelerometer(s), gyroscope(s), magnetic compass(es), magnetometer(s), etc.), microphone(s) 1496, stereo camera(s) 1468, wide-view camera(s) 1470 (e.g., fisheye cameras), infrared camera(s) 1472, surround camera(s) 1474 (e.g., 360 degree cameras), long-range and/or mid-range camera(s) 1498, speed sensor(s) 1444 (e.g., for measuring the speed of the vehicle 1400), vibration sensor(s) 1442, steering sensor(s) 1440, brake sensor(s) 1446 (e.g., as part of the brake sensor system 1446), and/or other sensor types.

One or more of the controller(s) 1436 may receive inputs (e.g., represented by input data) from an instrument cluster 1432 of the vehicle 1400 and provide outputs (e.g., represented by output data, display data, etc.) via a human-machine interface (HMI) display 1434, an audible annunciator, a loudspeaker, and/or via other components of the vehicle 1400. The outputs may include information such as vehicle velocity, speed, time, map data (e.g., the HD map 1422 of FIG. 14C), location data (e.g., the location of the vehicle 1400, such as on a map), direction, location of other vehicles (e.g., an occupancy grid), information about objects and status of objects as perceived by the controller(s) 1436, etc. For example, the HMI display 1434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1400 further includes a network interface 1424, which may use one or more wireless antenna(s) 1426 and/or modem(s) to communicate over one or more networks. For example, the network interface 1424 may be capable of communication over LTE, WCDMA, UMTS, GSM, CDMA2000, etc. The wireless antenna(s) 1426 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LP-WANs), such as LoRaWAN, SigFox, etc.

Figure 14B:
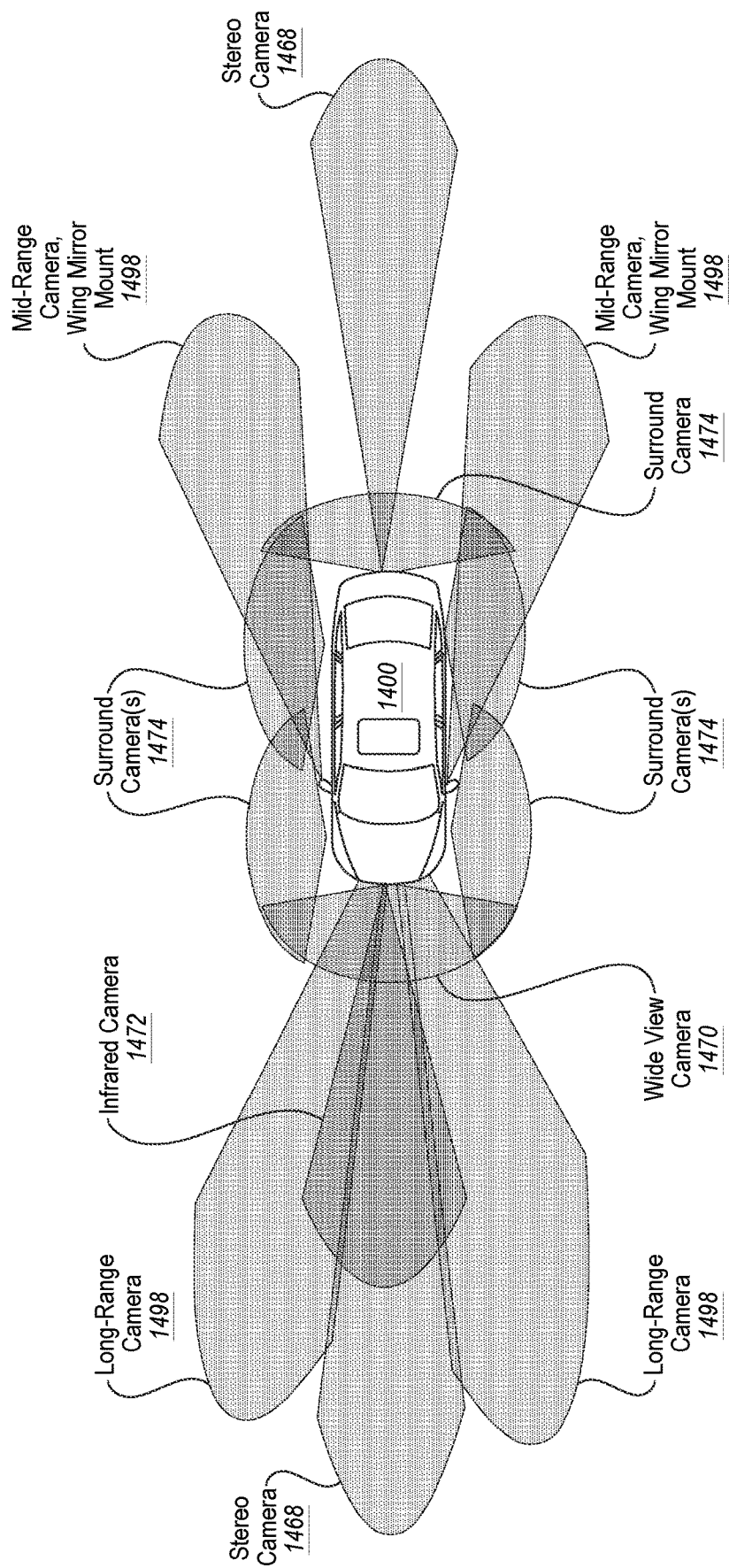
FIG. 14B is an example of camera locations and fields of view for the example autonomous vehicle of FIG. 14A, in accordance with some embodiments of the present disclosure.

FIG. 14B is an example of camera locations and fields of view for the example autonomous vehicle 1400 of FIG. 14A, in accordance with some embodiments of the present disclosure. The cameras and respective fields of view are one example embodiment and are not intended to be limiting. For example, additional and/or alternative cameras may be included and/or the cameras may be located at different locations on the vehicle 1400.

The camera types for the cameras may include, but are not limited to, digital cameras that may be adapted for use with the components and/or systems of the vehicle 1400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 1400 (e.g., front-facing cameras) may be used for surround view, to help identify forward-facing paths and obstacles, as well aid in, with the help of one or more controllers 1436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1470 that may be used to perceive objects coming into view from the periphery (e.g., pedestrians, crossing traffic or bicycles). Although only one wide-view camera is illustrated in FIG. 14B, there may be any number of wide-view cameras 1470 on the vehicle 1400. In addition, long-range camera(s) 1498 (e.g., a long-view stereo camera pair) may be used for depth-based object detection, especially for objects for which a neural network has not yet been trained. The long-range camera(s) 1498 may also be used for object detection and classification, as well as basic object tracking.

One or more stereo cameras 1468 may also be included in a front-facing configuration. The stereo camera(s) 1468 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1468 may be used in addition to, or alternatively from, those described herein.

Cameras with a field of view that includes portions of the environment to the side of the vehicle 1400 (e.g., side-view cameras) may be used for surround view, providing information used to create and update the occupancy grid, as well as to generate side impact collision warnings. For example, surround camera(s) 1474 (e.g., four surround cameras 1474 as illustrated in FIG. 14B) may be positioned around the vehicle 1400. The surround camera(s) 1474 may include wide-view camera(s) 1470, fisheye camera(s), 360-degree camera(s), and/or the like. For example, four fisheye cameras may be positioned on the vehicle's front, rear, and sides. In an alternative arrangement, the vehicle may use three surround camera(s) 1474 (e.g., left, right, and rear), and may leverage one or more other camera(s) (e.g., a forward-facing camera) as a fourth surround-view camera.

Cameras with a field of view that include portions of the environment to the rear of the vehicle 1400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1498, stereo camera(s) 1468), infrared camera(s) 1472, etc.), as described herein.

Figure 14C:
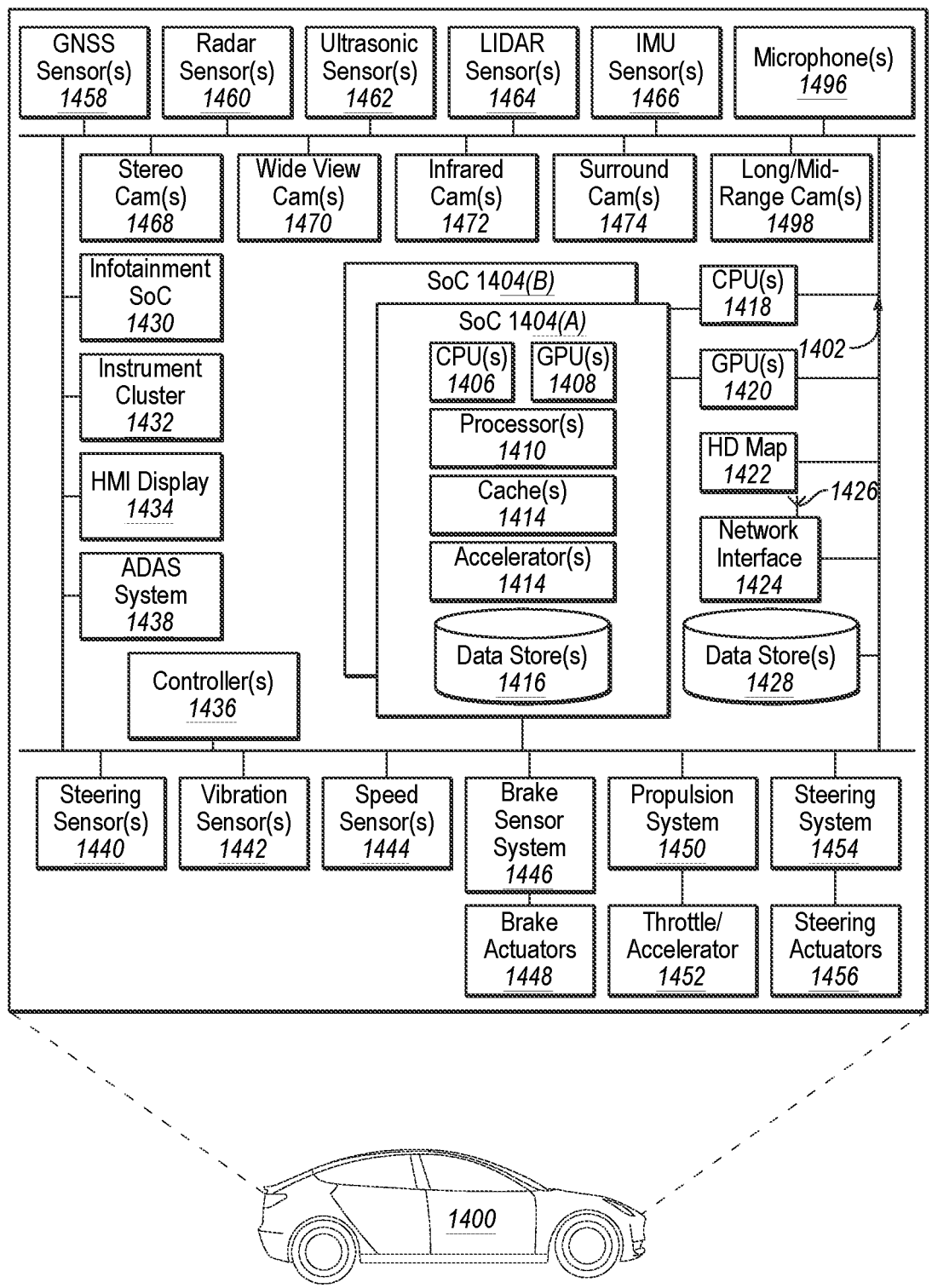
FIG. 14C is a block diagram of an example system architecture for the example autonomous vehicle of FIG. 14A, in accordance with some embodiments of the present disclosure.

FIG. 14C is a block diagram of an example system architecture for the example autonomous vehicle 1400 of FIG. 14A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1400 in FIG. 14C is illustrated as being connected via bus 1402. The bus 1402 may include a Controller Area Network (CAN) data interface (alternatively referred to herein as a "CAN bus"). A CAN may be a network inside the vehicle 1400 used to aid in control of various features and functionality of the vehicle 1400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1402 is described herein as being a CAN bus, this is not intended to be limiting. For example, in addition to, or alternatively from, the CAN bus, FlexRay and/or Ethernet may be used. Additionally, although a single line is used to represent the bus 1402, this is not intended to be limiting. For example, there may be any number of busses 1402, which may include one or more CAN busses, one or more FlexRay busses, one or more Ethernet busses, and/or one or more other types of busses using a different protocol. In some examples, two or more busses 1402 may be used to perform different functions, and/or may be used for redundancy. For example, a first bus 1402 may be used for collision avoidance functionality and a second bus 1402 may be used for actuation control. In any example, each bus 1402 may communicate with any of the components of the vehicle 1400, and two or more busses 1402 may communicate with the same components. In some examples, each SoC 1404, each controller 1436, and/or each computer within the vehicle may have access to the same input data (e.g., inputs from sensors of the vehicle 1400), and may be connected to a common bus, such the CAN bus.

The vehicle 1400 may include one or more controller(s) 1436, such as those described herein with respect to FIG. 14A. The controller(s) 1436 may be used for a variety of functions. The controller(s) 1436 may be coupled to any of the various other components and systems of the vehicle 1400 and may be used for control of the vehicle 1400, artificial intelligence of the vehicle 1400, infotainment for the vehicle 1400, and/or the like.

The vehicle 1400 may include a system(s) on a chip (SoC) 1404. The SoC 1404 may include CPU(s) 1406, GPU(s) 1408, processor(s) 1410, cache(s) 1412, accelerator(s) 1414, data store(s) 1416, and/or other components and features not illustrated. The SoC(s) 1404 may be used to control the vehicle 1400 in a variety of platforms and systems. For example, the SoC(s) 1404 may be combined in a system (e.g., the system of the vehicle 1400) with an HD map 1422 which may obtain map refreshes and/or updates via a network interface 1424 from one or more servers (e.g., server(s) 1478 of FIG. 14D).

The CPU(s) 1406 may include a CPU cluster or CPU complex (alternatively referred to herein as a "CCPLEX"). The CPU(s) 1406 may include multiple cores and/or L2 caches. For example, in some embodiments, the CPU(s) 1406 may include eight cores in a coherent multi-processor configuration. In some embodiments, the CPU(s) 1406 may include four dual-core clusters where each cluster has a dedicated L2 cache (e.g., a 2 MB L2 cache). The CPU(s) 1406 (e.g., the CCPLEX) may be configured to support simultaneous cluster operation enabling any combination of the clusters of the CPU(s) 1406 to be active at any given time.

The CPU(s) 1406 may implement power management capabilities that include one or more of the following features: individual hardware blocks may be clock-gated automatically when idle to save dynamic power; each core clock may be gated when the core is not actively executing instructions due to execution of WFI/WFE instructions: each core may be independently power-gated; each core cluster may be independently clock-gated when all cores are clock-gated or power-gated; and/or each core cluster may be independently power-gated when all cores are power-gated. The CPU(s) 1406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1408 may include an integrated GPU (alternatively referred to herein as an "iGPU"). The GPU(s) 1408 may be programmable and may be efficient for parallel workloads. The GPU(s) 1408, in some examples, may use an enhanced tensor instruction set. The GPU(s) 1408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1408 may include at least eight streaming microprocessors. The GPU(s) 1408 may use computer-based application programming interface(s) (API(s)). In addition, the GPU(s) 1408 may use one or more parallel computing platforms and/or programming models (e.g., NVIDIA's CUDA).

The GPU(s) 1408 may be power-optimized for best performance in automotive and embedded use cases. For example, the GPU(s) 1408 may be fabricated on a Fin field-effect transistor (FinFET). However, this is not intended to be limiting, and the GPU(s) 1408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 1408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1408 to access the CPU(s) 1406 page tables directly. In such examples, when the GPU(s) 1408 memory management unit (MMU) experiences a miss, an address translation request may be transmitted to the CPU(s) 1406. In response, the CPU(s) 1406 may look in its page tables for the virtual-to-physical mapping for the address and transmits the translation back to the GPU(s) 1408. As such, unified memory technology may allow a single unified virtual address space for memory of both the CPU(s) 1406 and the GPU(s) 1408, thereby simplifying the GPU(s) 1408 programming and porting of applications to the GPU(s) 1408.

In addition, the GPU(s) 1408 may include an access counter that may keep track of the frequency of access of the GPU(s) 1408 to memory of other processors. The access counter may help ensure that memory pages are moved to the physical memory of the processor that is accessing the pages most frequently.

The SoC(s) 1404 may include any number of cache(s) 1412, including those described herein. For example, the cache(s) 1412 may include an L3 cache that is available to both the CPU(s) 1406 and the GPU(s) 1408 (e.g., that is connected to both the CPU(s) 1406 and the GPU(s) 1408). The cache(s) 1412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1404 may include an arithmetic logic unit(s) (ALU(s)) which may be leveraged in performing processing with respect to any of the variety of tasks or operations of the vehicle 1400—such as processing DNNs. In addition, the SoC(s) 1404 may include a floating point unit(s) (FPU(s))—or other math coprocessor or numeric coprocessor types—for performing mathematical operations within the system. For example, the SoC(s) 1404 may include one or more FPUs integrated as execution units within a CPU(s) 1406 and/or GPU(s) 1408.

The SoC(s) 1404 may include one or more accelerators 1414 (e.g., hardware accelerators, software accelerators, or a combination thereof). For example, the SoC(s) 1404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1408 and to off-load some of the tasks of the GPU(s) 1408 (e.g., to free up more cycles of the GPU(s) 1408 for performing other tasks). As an example, the accelerator(s) 1414 may be used for targeted workloads (e.g., perception, convolutional neural networks (CNNs), etc.) that are stable enough to be amenable to acceleration. The term "CNN." as used herein, may include all types of CNNs, including region-based or regional convolutional neural networks (RCNNs) and Fast RCNNs (e.g., as used for object detection).

The accelerator(s) 1414 (e.g., the hardware acceleration cluster) may include a deep learning accelerator(s) (DLA).

The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors: a CNN for distance estimation using data from camera sensors: a CNN for emergency vehicle detection and identification and detection using data from microphones: a CNN for facial recognition and vehicle owner identification using data from camera sensors; and/or a CNN for security and/or safety related events.

The DLA(s) may perform any function of the GPU(s) 1408, and by using an inference accelerator, for example, a designer may target either the DLA(s) or the GPU(s) 1408 for any function. For example, the designer may focus processing of CNNs and floating point operations on the DLA(s) and leave other functions to the GPU(s) 1408 and/or other accelerator(s) 1414.

The accelerator(s) 1414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1414 (e.g., the hardware acceleration cluster) may include a computer vision network on-chip and SRAM, for providing a high-bandwidth, low latency SRAM for the accelerator(s) 1414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1466 output that correlates with the vehicle 1400 orientation, distance, 3D location estimates of the object obtained from the neural network and/or other sensors (e.g., LIDAR sensor(s) 1464 or RADAR sensor(s) 1460), among others.

The SoC(s) 1404 may include data store(s) 1416 (e.g., memory). The data store(s) 1416 may be on-chip memory of the SoC(s) 1404, which may store neural networks to be executed on the GPU and/or the DLA. In some examples, the data store(s) 1416 may be large enough in capacity to store multiple instances of neural networks for redundancy and safety. The data store(s) 1416 may comprise L2 or L3 cache(s) 1412. Reference to the data store(s) 1416 may include reference to the memory associated with the PVA, DLA, and/or other accelerator(s) 1414, as described herein.

The SoC(s) 1404 may include one or more processor(s) 1410 (e.g., embedded processors). The processor(s) 1410 may include a boot and power management processor that may be a dedicated processor and subsystem to handle boot power and management functions and related security enforcement. The boot and power management processor may be a part of the SoC(s) 1404 boot sequence and may provide runtime power management services. The boot power and management processor may provide clock and voltage programming, assistance in system low power state transitions, management of SoC(s) 1404 thermals and temperature sensors, and/or management of the SoC(s) 1404 power states. Each temperature sensor may be implemented as a ring-oscillator whose output frequency is proportional to temperature, and the SoC(s) 1404 may use the ring-oscillators to detect temperatures of the CPU(s) 1406, GPU(s) 1408, and/or accelerator(s) 1414. If temperatures are determined to exceed a threshold, the boot and power management processor may enter a temperature fault routine and put the SoC(s) 1404 into a lower power state and/or put the vehicle 1400 into a chauffeur to safe-stop mode (e.g., bring the vehicle 1400 to a safe stop).

The processor(s) 1410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1410 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 1410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1410 may further include a real-time camera engine that may include a dedicated processor subsystem for handling real-time camera management.

The processor(s) 1410 may further include a high dynamic range signal processor that may include an image signal processor that is a hardware engine that is part of the camera processing pipeline.

The processor(s) 1410 may include a video image compositor that may be a processing block (e.g., implemented on a microprocessor) that implements video post-processing functions needed by a video playback application to produce the final image for the player window. The video image compositor may perform lens distortion correction on wide-view camera(s) 1470, surround camera(s) 1474, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1408 is not required to continuously render new surfaces. Even when the GPU(s) 1408 is powered on and actively performing 3D rendering, the video image compositor may be used to offload the GPU(s) 1408 to improve performance and responsiveness.

The SoC(s) 1404 may further include a mobile industry processor interface (MIPI) camera serial interface for receiving video and input from cameras, a high-speed interface, and/or a video input block that may be used for camera and related pixel input functions. The SoC(s) 1404 may further include an input/output controller(s) that may be controlled by software and may be used for receiving I/O signals that are uncommitted to a specific role.

The SoC(s) 1404 may further include a broad range of peripheral interfaces to enable communication with peripherals, audio codecs, power management, and/or other devices. The SoC(s) 1404 may be used to process data from cameras (e.g., connected over Gigabit Multimedia Serial Link and Ethernet), sensors (e.g., LIDAR sensor(s) 1464, RADAR sensor(s) 1460, etc. that may be connected over Ethernet), data from bus 1402 (e.g., speed of vehicle 1400, steering wheel position, etc.), data from GNSS sensor(s) 1458 (e.g., connected over Ethernet or CAN bus). The SoC(s) 1404 may further include dedicated high-performance mass storage controllers that may include their own DMA engines, and that may be used to free the CPU(s) 1406 from routine data management tasks.

The SoC(s) 1404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1404 may be faster, more reliable, and even more energy-efficient and space-efficient than conventional systems. For example, the accelerator(s) 1414, when combined with the CPU(s) 1406, the GPU(s) 1408, and the data store(s) 1416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1420) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1408.

In some examples, a CNN for facial recognition and vehicle owner identification may use data from camera sensors to identify the presence of an authorized driver and/or owner of the vehicle 1400. The always-on sensor processing engine may be used to unlock the vehicle when the owner approaches the driver door and turn on the lights, and, in security mode, to disable the vehicle when the owner leaves the vehicle. In this way, the SoC(s) 1404 provide for security against theft and/or carjacking.

In another example, a CNN for emergency vehicle detection and identification may use data from microphones 1496 to detect and identify emergency vehicle sirens. In contrast to conventional systems, which use general classifiers to detect sirens and manually extract features, the SoC(s) 1404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1462, until the emergency vehicle(s) passes.

The vehicle may include a CPU(s) 1418 (e.g., discrete CPU(s), or dCPU(s)), that may be coupled to the SoC(s) 1404 via a high-speed interconnect (e.g., PCIe). The CPU(s) 1418 may include an X86 processor, for example. The CPU(s) 1418 may be used to perform any of a variety of functions, including arbitrating potentially inconsistent results between ADAS sensors and the SoC(s) 1404, and/or monitoring the status and health of the controller(s) 1436 and/or infotainment SoC 1430, for example.

The vehicle 1400 may include a GPU(s) 1420 (e.g., discrete GPU(s), or dGPU(s)), that may be coupled to the SoC(s) 1404 via a high-speed interconnect (e.g., NVIDIA's NVLINK). The GPU(s) 1420 may provide additional artificial intelligence functionality, such as by executing redundant and/or different neural networks, and may be used to train and/or update neural networks based on input (e.g., sensor data) from sensors of the vehicle 1400.

The vehicle 1400 may further include the network interface 1424 which may include one or more wireless antennas 1426 (e.g., one or more wireless antennas for different communication protocols, such as a cellular antenna, a Bluetooth antenna, etc.). The network interface 1424 may be used to enable wireless connectivity over the Internet with the cloud (e.g., with the server(s) 1478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1400 information about vehicles in proximity to the vehicle 1400 (e.g., vehicles in front of, on the side of, and/or behind the vehicle 1400). This functionality may be part of a cooperative adaptive cruise control functionality of the vehicle 1400.

The network interface 1424 may include an SoC that provides modulation and demodulation functionality and enables the controller(s) 1436 to communicate over wireless networks. The network interface 1424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1400 may further include data store(s) 1428, which may include off-chip (e.g., off the SoC(s) 1404) storage. The data store(s) 1428 may include one or more storage elements including RAM, SRAM, DRAM, VRAM, Flash, hard disks, and/or other components and/or devices that may store at least one bit of data.

The vehicle 1400 may further include GNSS sensor(s) 1458 (e.g., GPS and/or assisted GPS sensors), to assist in mapping, perception, occupancy grid generation, and/or path planning functions. Any number of GNSS sensor(s) 1458 may be used, including, for example and without limitation, a GPS using a USB connector with an Ethernet to serial (RS-232) bridge.

The vehicle 1400 may further include RADAR sensor(s) 1460. The RADAR sensor(s) 1460 may be used by the vehicle 1400 for long-range vehicle detection, even in darkness and/or severe weather conditions. RADAR functional safety levels may be ASIL B. The RADAR sensor(s) 1460 may use the CAN and/or the bus 1402 (e.g., to transmit data generated by the RADAR sensor(s) 1460) for control and to access object tracking data, with access to Ethernet to access raw data, in some examples. A wide variety of RADAR sensor types may be used. For example, and without limitation, the RADAR sensor(s) 1460 may be suitable for front, rear, and side RADAR use. In some example, Pulse Doppler RADAR sensor(s) are used.

The RADAR sensor(s) 1460 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 1400 at higher speeds with minimal interference from traffic in adjacent lanes. The other two antennae may expand the field of view, making it possible to quickly detect vehicles entering or leaving the vehicle's 1400 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 1400 may further include ultrasonic sensor(s) 1462. The ultrasonic sensor(s) 1462, which may be positioned at the front, back, and/or the sides of the vehicle 1400, may be used for park assist and/or to create and update an occupancy grid. A wide variety of ultrasonic sensor(s) 1462 may be used, and different ultrasonic sensor(s) 1462 may be used for different ranges of detection (e.g., 2.5 m, 4 m). The ultrasonic sensor(s) 1462 may operate at functional safety levels of ASIL B.

The vehicle 1400 may include LIDAR sensor(s) 1464. The LIDAR sensor(s) 1464 may be used for object and pedestrian detection, emergency braking, collision avoidance, and/or other functions. The LIDAR sensor(s) 1464 may be functional safety level ASIL B. In some examples, the vehicle 1400 may include multiple LIDAR sensors 1464 (e.g., two, four, six, etc.) that may use Ethernet (e.g., to provide data to a Gigabit Ethernet switch).

In some examples, the LIDAR sensor(s) 1464 may be capable of providing a list of objects and their distances for a 360-degree field of view. Commercially available LIDAR sensor(s) 1464 may have an advertised range of approximately 100 m, with an accuracy of 2 cm-3 cm, and with support for a 100 Mbps Ethernet connection, for example. In some examples, one or more non-protruding LIDAR sensors 1464 may be used. In such examples, the LIDAR sensor(s) 1464 may be implemented as a small device that may be embedded into the front, rear, sides, and/or corners of the vehicle 1400. The LIDAR sensor(s) 1464, in such examples, may provide up to a 120-degree horizontal and 35-degree vertical field-of-view, with a 200 m range even for low-reflectivity objects. Front-mounted LIDAR sensor(s) 1464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1400. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1464 may be less susceptible to motion blur, vibration, and/or shock.

The vehicle may further include IMU sensor(s) 1466. The IMU sensor(s) 1466 may be located at a center of the rear axle of the vehicle 1400, in some examples. The IMU sensor(s) 1466 may include, for example and without limitation, an accelerometer(s), a magnetometer(s), a gyroscope(s), a magnetic compass(es), and/or other sensor types. In some examples, such as in six-axis applications, the IMU sensor(s) 1466 may include accelerometers and gyroscopes, while in nine-axis applications, the IMU sensor(s) 1466 may include accelerometers, gyroscopes, and magnetometers.

In some embodiments, the IMU sensor(s) 1466 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1466 may enable the vehicle 1400 to estimate heading without requiring input from a magnetic sensor by directly observing and correlating the changes in velocity from GPS to the IMU sensor(s) 1466. In some examples, the IMU sensor(s) 1466 and the GNSS sensor(s) 1458 may be combined in a single integrated unit.

The vehicle may include microphone(s) 1496 placed in and/or around the vehicle 1400. The microphone(s) 1496 may be used for emergency vehicle detection and identification, among other things.

The vehicle may further include any number of camera types, including stereo camera(s) 1468, wide-view camera(s) 1470, infrared camera(s) 1472, surround camera(s) 1474, long-range and/or mid-range camera(s) 1498, and/or other camera types. The cameras may be used to capture image data around an entire periphery of the vehicle 1400. The types of cameras used depends on the embodiments and requirements for the vehicle 1400, and any combination of camera types may be used to provide the necessary coverage around the vehicle 1400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 14A and FIG. 14B.

The vehicle 1400 may further include vibration sensor(s) 1442. The vibration sensor(s) 1442 may measure vibrations of components of the vehicle, such as the axle(s). For example, changes in vibrations may indicate a change in road surfaces. In another example, when two or more vibration sensors 1442 are used, the differences between the vibrations may be used to determine friction or slippage of the road surface (e.g., when the difference in vibration is between a power-driven axle and a freely rotating axle).

The vehicle 1400 may include an ADAS system 1438. The ADAS system 1438 may include an SoC, in some examples. The ADAS system 1438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1460, LIDAR sensor(s) 1464, and/or a camera(s). The ACC systems may include longitudinal ACC and/or lateral ACC. Longitudinal ACC monitors and controls the distance to the vehicle immediately ahead of the vehicle 1400 and automatically adjusts the vehicle speed to maintain a safe distance from vehicles ahead. Lateral ACC performs distance keeping, and advises the vehicle 1400 to change lanes when necessary. Lateral ACC is related to other ADAS applications such as LC and CWS.

CACC uses information from other vehicles that may be received via the network interface 1424 and/or the wireless antenna(s) 1426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 1400), while the I2V communication concept provides information about traffic farther ahead. CACC systems may include either or both I2V and V2V information sources. Given the information of the vehicles ahead of the vehicle 1400, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 1460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1400 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1400 if the vehicle 1400 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1400 is backing up. Some RCTW systems include AEB to ensure that the vehicle brakes are applied to avoid a crash. RCTW systems may use one or more rear-facing RADAR sensor(s) 1460, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 1400, the vehicle 1400 itself must, in the case of conflicting results, decide whether to heed the result from a primary computer or a secondary computer (e.g., a first controller 1436 or a second controller 1436). For example, in some embodiments, the ADAS system 1438 may be a backup and/or secondary computer for providing perception information to a backup computer rationality module. The backup computer rationality monitor may run a redundant diverse software on hardware components to detect faults in perception and dynamic driving tasks. Outputs from the ADAS system 1438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1404.

In other examples, ADAS system 1438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 1438 may be fed into the primary computer's perception block and/or the primary computer's dynamic driving task block. For example, if the ADAS system 1438 indicates a forward crash warning due to an object immediately ahead, the perception block may use this information when identifying objects. In other examples, the secondary computer may have its own neural network that is trained and thus reduces the risk of false positives, as described herein.

The vehicle 1400 may further include the infotainment SoC 1430 (e.g., an in-vehicle infotainment system (IVI)). Although illustrated and described as an SoC, the infotainment system may not be a SoC, and may include two or more discrete components. The infotainment SoC 1430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 1400. For example, the infotainment SoC 1430 may include radios, disk players, navigation systems, video players, USB and Bluetooth connectivity, carputers, in-car entertainment, Wi-Fi, steering wheel audio controls, hands-free voice control, a heads-up display (HUD), an HMI display 1434, a telematics device, a control panel (e.g., for controlling and/or interacting with various components, features, and/or systems), and/or other components. The infotainment SoC 1430 may further be used to provide information (e.g., visual and/or audible) to a user(s) of the vehicle, such as information from the ADAS system 1438, autonomous driving information such as planned vehicle maneuvers, trajectories, surrounding environment information (e.g., intersection information, vehicle information, road information, etc.), and/or other information.

The infotainment SoC 1430 may include GPU functionality. The infotainment SoC 1430 may communicate over the bus 1402 (e.g., CAN bus, Ethernet, etc.) with other devices, systems, and/or components of the vehicle 1400. In some examples, the infotainment SoC 1430 may be coupled to a supervisory MCU such that the GPU of the infotainment system may perform some self-driving functions in the event that the primary controller(s) 1436 (e.g., the primary and/or backup computers of the vehicle 1400) fail. In such an example, the infotainment SoC 1430 may put the vehicle 1400 into a chauffeur to safe-stop mode, as described herein.

The vehicle 1400 may further include an instrument cluster 1432 (e.g., a digital dash, an electronic instrument cluster, a digital instrument panel, etc.). The instrument cluster 1432 may include a controller and/or supercomputer (e.g., a discrete controller or supercomputer). The instrument cluster 1432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1430 and the instrument cluster 1432. In other words, the instrument cluster 1432 may be included as part of the infotainment SoC 1430, or vice versa.

Figure 14D:
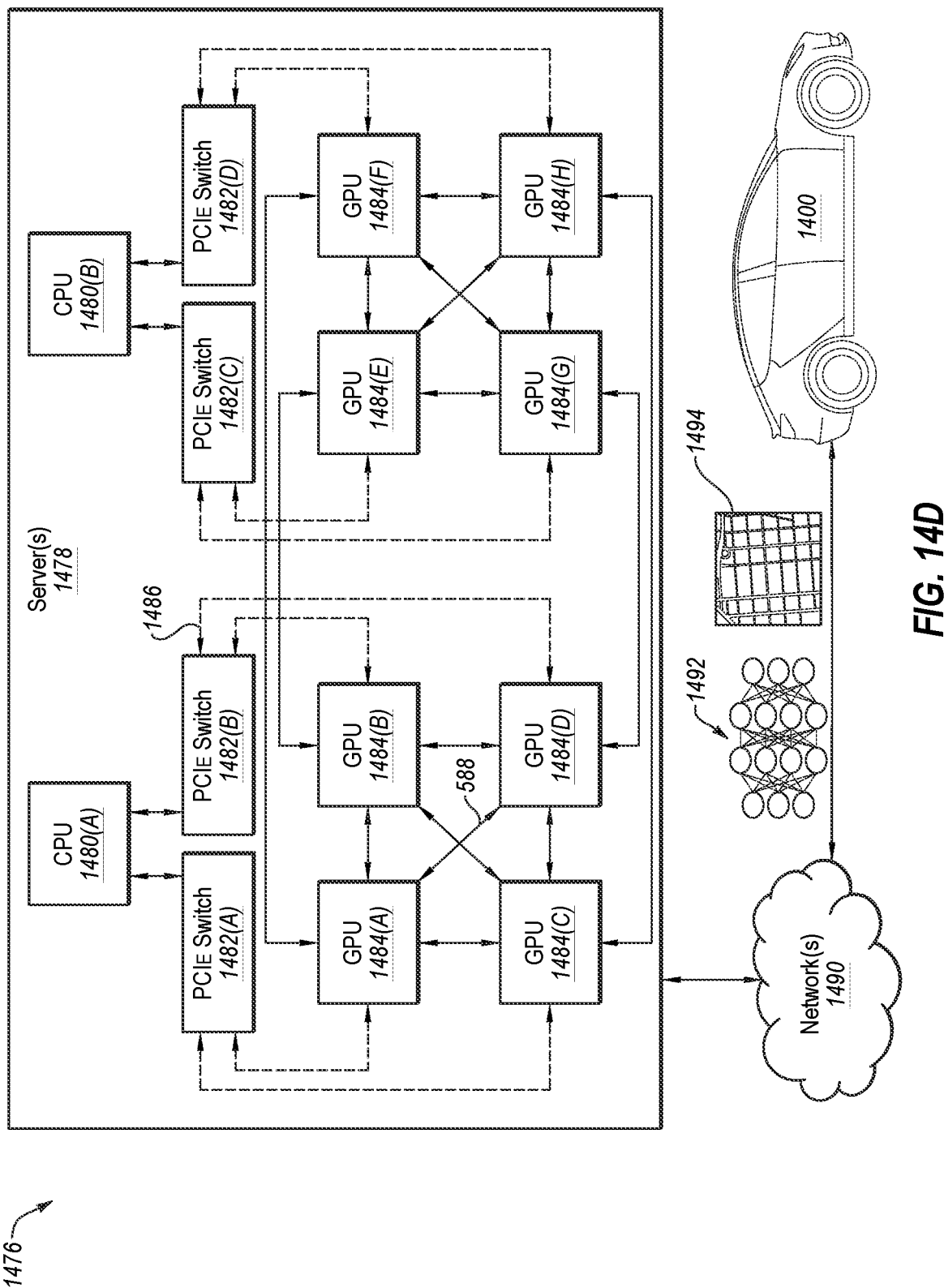
FIG. 14D is a system diagram for communication between cloud-based server(s) and the example autonomous vehicle of FIG. 14A, in accordance with some embodiments of the present disclosure.

FIG. 14D is a system diagram for communication between cloud-based server(s) and the example autonomous vehicle 1400 of FIG. 14A, in accordance with some embodiments of the present disclosure. The system 1476 may include server(s) 1478, network(s) 1490, and vehicles, including the vehicle 1400. The server(s) 1478 may include a plurality of GPUs 1484(A)-1484(H) (collectively referred to herein as GPUs 1484), PCIe switches 1482(A)-1482(H) (collectively referred to herein as PCIe switches 1482), and/or CPUs 1480(A)-1480(B) (collectively referred to herein as CPUs 1480). The GPUs 1484, the CPUs 1480, and the PCIe switches may be interconnected with high-speed interconnects such as, for example and without limitation, NVLink interfaces 1488 developed by NVIDIA and/or PCIe connections 1486. In some examples, the GPUs 1484 are connected via NVLink and/or NVSwitch SoC and the GPUs 1484 and the PCIe switches 1482 are connected via PCIe interconnects. Although eight GPUs 1484, two CPUs 1480, and two PCIe switches are illustrated, this is not intended to be limiting. Depending on the embodiment, each of the server(s) 1478 may include any number of GPUs 1484, CPUs 1480, and/or PCIe switches. For example, the server(s) 1478 may each include eight, sixteen, thirty-two, and/or more GPUs 1484.

The server(s) 1478 may receive, over the network(s) 1490 and from the vehicles, image data representative of images showing unexpected or changed road conditions, such as recently commenced roadwork. The server(s) 1478 may transmit, over the network(s) 1490 and to the vehicles, neural networks 1492, updated neural networks 1492, and/or map information 1494, including information regarding traffic and road conditions. The updates to the map information 1494 may include updates for the HD map 1422, such as information regarding construction sites, potholes, detours, flooding, and/or other obstructions. In some examples, the neural networks 1492, the updated neural networks 1492, and/or the map information 1494 may have resulted from new training and/or experiences represented in data received from any number of vehicles in the environment, and/or based on training performed at a datacenter (e.g., using the server(s) 1478 and/or other servers).

The server(s) 1478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1490, and/or the machine learning models may be used by the server(s) 1478 to remotely monitor the vehicles.

In some examples, the server(s) 1478 may receive data from the vehicles and apply the data to up-to-date real-time neural networks for real-time intelligent inferencing. The server(s) 1478 may include deep-learning supercomputers and/or dedicated AI computers powered by GPU(s) 1484, such as a DGX and DGX Station machines developed by NVIDIA. However, in some examples, the server(s) 1478 may include deep learning infrastructure that use only CPU-powered datacenters.

The deep-learning infrastructure of the server(s) 1478 may be capable of fast, real-time inferencing, and may use that capability to evaluate and verify the health of the processors, software, and/or associated hardware in the vehicle 1400. For example, the deep-learning infrastructure may receive periodic updates from the vehicle 1400, such as a sequence of images and/or objects that the vehicle 1400 has located in that sequence of images (e.g., via computer vision and/or other machine learning object classification techniques). The deep-learning infrastructure may run its own neural network to identify the objects and compare them with the objects identified by the vehicle 1400 and, if the results do not match and the infrastructure concludes that the AI in the vehicle 1400 is malfunctioning, the server(s)

1478 may transmit a signal to the vehicle 1400 instructing a fail-safe computer of the vehicle 1400 to assume control, notify the passengers, and complete a safe parking maneuver.

For inferencing, the server(s) 1478 may include the GPU(s) 1484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 15:
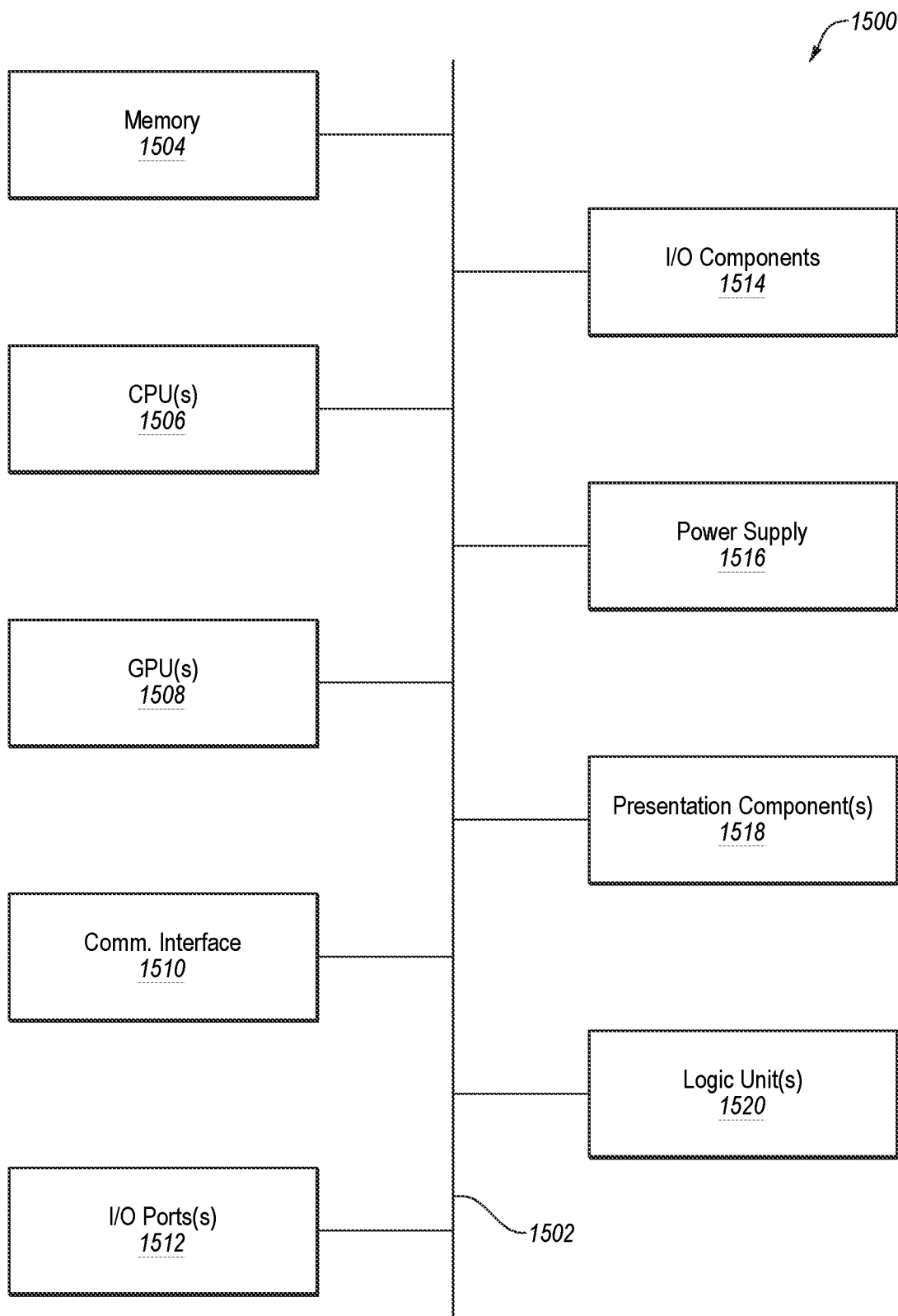
FIG. 15 is a block diagram of an example computing device suitable for use in implementing some embodiments of the present disclosure.

FIG. 15 is a block diagram of an example computing device(s) 1500 suitable for use in implementing some embodiments of the present disclosure. Computing device 1500 may include an interconnect system 1502 that directly or indirectly couples the following devices: memory 1504, one or more central processing units (CPUs) 1506, one or more graphics processing units (GPUs) 1508, a communication interface 1510, I/O ports 1512, input/output components 1514, a power supply 1516, one or more presentation components 1518 (e.g., display(s)), and one or more logic units 1520.

Although the various blocks of FIG. 15 are shown as connected via the interconnect system 1502 with lines, this is not intended to be limiting and is for clarity only. For example, in some embodiments, a presentation component 1518, such as a display device, may be considered an I/O component 1514 (e.g., if the display is a touch screen). As another example, the CPUs 1506 and/or GPUs 1508 may include memory (e.g., the memory 1504 may be representative of a storage device in addition to the memory of the GPUs 1508, the CPUs 1506, and/or other components). In other words, the computing device of FIG. 15 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 15.

The interconnect system 1502 may represent one or more links or busses, such as an address bus, a data bus, a control bus, or a combination thereof. The interconnect system 1502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1506 may be directly connected to the memory 1504. Further, the CPU 1506 may be directly connected to the GPU 1508. Where there is direct, or point-to-point, connection between components, the interconnect system 1502 may include a PCIe link to carry out the connection. In these examples, a PCI bus need not be included in the computing device 1500.

The memory 1504 may include any of a variety of computer-readable media. The computer-readable media may be any available media that may be accessed by the computing device 1500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 1500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1506 may be configured to execute at least some of the computer-readable instructions to control one or more components of the computing device 1500 to perform one or more of the methods and/or processes described herein. The CPU(s) 1506 may each include one or more cores (e.g., one, two, four, eight, twenty-eight, seventy-two, etc.) that are capable of handling a multitude of software threads simultaneously. The CPU(s) 1506 may include any type of processor, and may include different types of processors depending on the type of computing device 1500 implemented (e.g., processors with fewer cores for mobile devices and processors with more cores for servers). For example, depending on the type of computing device 1500, the processor may be an Advanced RISC Machines (ARM) processor implemented using Reduced Instruction Set Computing (RISC) or an x86 processor implemented using Complex Instruction Set Computing (CISC). The computing device 1500 may include one or more CPUs 1506 in addition to one or more microprocessors or supplementary co-processors, such as math co-processors.

In addition to or alternatively from the CPU(s) 1506, the GPU(s) 1508 may be configured to execute at least some of the computer-readable instructions to control one or more components of the computing device 1500 to perform one or more of the methods and/or processes described herein. One or more of the GPU(s) 1508 may be an integrated GPU (e.g., with one or more of the CPU(s) 1506 and/or one or more of the GPU(s) 1508 may be a discrete GPU. In embodiments, one or more of the GPU(s) 1508 may be a coprocessor of one or more of the CPU(s) 1506. The GPU(s) 1508 may be used by the computing device 1500 to render graphics (e.g., 3D graphics) or perform general purpose computations. For example, the GPU(s) 1508 may be used for General-Purpose computing on GPUs (GPGPU). The GPU(s) 1508 may include hundreds or thousands of cores that are capable of handling hundreds or thousands of software threads simultaneously. The GPU(s) 1508 may generate pixel data for output images in response to rendering commands (e.g., rendering commands from the CPU(s) 1506 received via a host interface). The GPU(s) 1508 may include graphics memory, such as display memory, for storing pixel data or any other suitable data, such as GPGPU data. The display memory may be included as part of the memory 1504. The GPU(s) 1508 may include two or more GPUs operating in parallel (e.g., via a link). The link may directly connect the GPUs (e.g., using NVLINK) or may connect the GPUs through a switch (e.g., using NVSwitch). When combined together, each GPU 1508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1506 and/or the GPU(s) 1508, the logic unit(s) 1520 may be configured to execute at least some of the computer-readable instructions to control one or more components of the computing device 1500 to perform one or more of the methods and/or processes described herein. In embodiments, the CPU(s) 1506, the GPU(s) 1508, and/or the logic unit(s) 1520 may discretely or jointly perform any combination of the methods, processes and/or portions thereof. One or more of the logic units 1520 may be part of and/or integrated in one or more of the CPU(s) 1506 and/or the GPU(s) 1508 and/or one or more of the logic units 1520 may be discrete components or otherwise external to the CPU(s) 1506 and/or the GPU(s) 1508. In embodiments, one or more of the logic units 1520 may be a coprocessor of one or more of the CPU(s) 1506 and/or one or more of the GPU(s) 1508.

Examples of the logic unit(s) 1520 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 1510 may include one or more receivers, transmitters, and/or transceivers that enable the computing device 1500 to communicate with other computing devices via an electronic communication network, including wired and/or wireless communications. The communication interface 1510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1512 may enable the computing device 1500 to be logically coupled to other devices including the I/O components 1514, the presentation component(s) 1518, and/or other components, some of which may be built into (e.g., integrated in) the computing device 1500. Illustrative I/O components 1514 include a microphone, mouse, keyboard, joystick, game pad, game controller, satellite dish, scanner, printer, wireless device, etc. The I/O components 1514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1500. The computing device 1500 may include depth cameras, such as stereoscopic camera systems, infrared camera systems, RGB camera systems, touchscreen technology, and combinations of these, for gesture detection and recognition. Additionally, the computing device 1500 may include accelerometers or gyroscopes (e.g., as part of an inertia measurement unit (IMU)) that enable detection of motion. In some examples, the output of the accelerometers or gyroscopes may be used by the computing device 1500 to render immersive augmented reality or virtual reality.

The power supply 1516 may include a hard-wired power supply, a battery power supply, or a combination thereof. The power supply 1516 may provide power to the computing device 1500 to enable the components of the computing device 1500 to operate.

The presentation component(s) 1518 may include a display (e.g., a monitor, a touch screen, a television screen, a heads-up-display (HUD), other display types, or a combination thereof), speakers, and/or other presentation components. The presentation component(s) 1518 may receive data from other components (e.g., the GPU(s) 1508, the CPU(s) 1506, etc.), and output the data (e.g., as an image, video, sound, etc.).

Example Data Center

Figure 16:
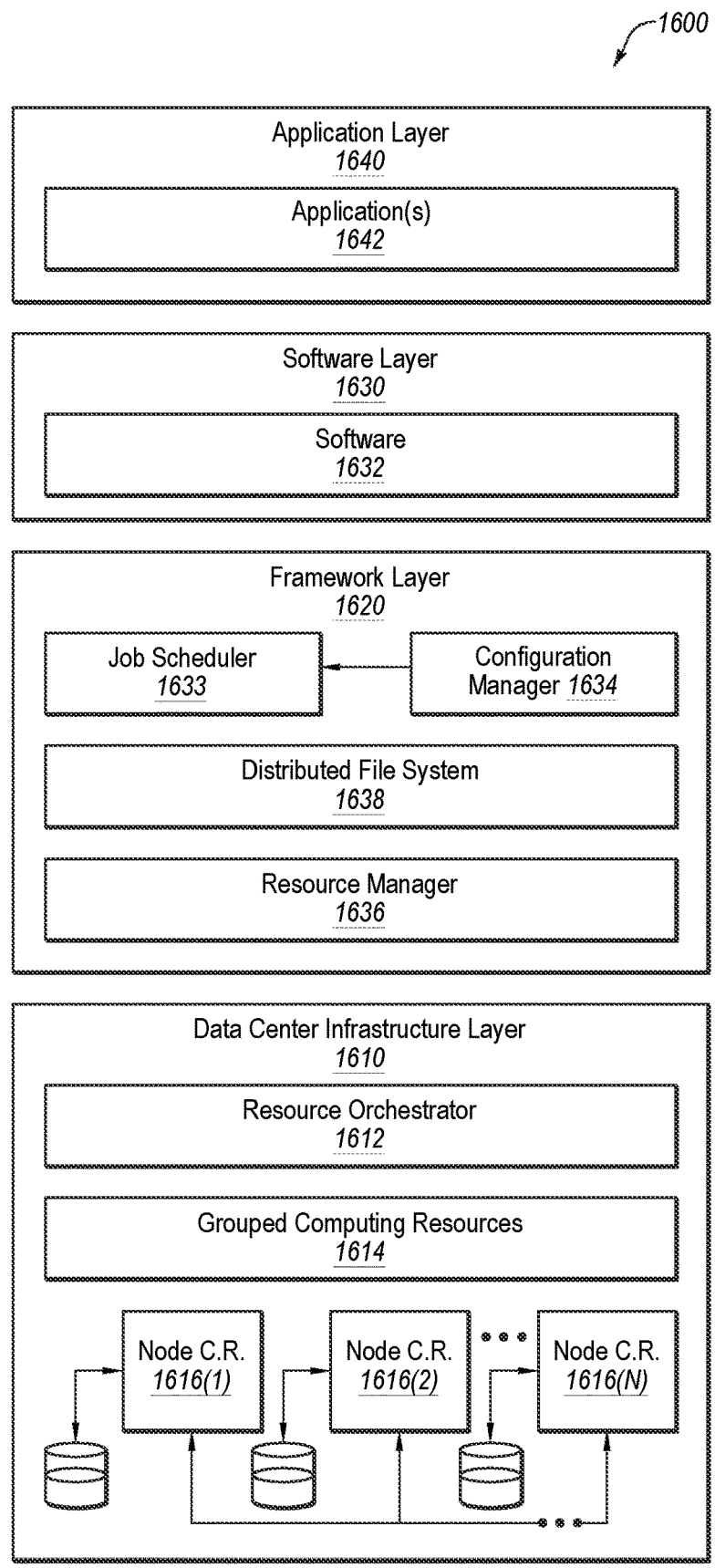
FIG. 16 is a block diagram of an example data center suitable for use in implementing some embodiments of the present disclosure.

FIG. 16 illustrates an example data center 1600 that may be used in at least one embodiments of the present disclosure. The data center 1600 may include a data center infrastructure layer 1610, a framework layer 1620, a software layer 1630, and/or an application layer 1640.

As shown in FIG. 16, the data center infrastructure layer 1610 may include a resource orchestrator 1612, grouped computing resources 1614, and node computing resources ("node C.R.s") 1616(1) 1616(N), where "N" represents any whole, positive integer. In at least one embodiment, node C.R.s 1616(1) 1616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1616(1) 1616(N) may correspond to a server having one or more of the above-mentioned computing resources. In addition, in some embodiments, the node C.R.s 1616(1) 1616(N) may include one or more virtual components, such as vGPUs, vCPUs, and/or the like, and/or one or more of the node C.R.s 1616(1) 1616(N) may correspond to a virtual machine (VM).

In at least one embodiment, grouped computing resources 1614 may include separate groupings of node C.R.s 1616 housed within one or more racks (not shown), or many racks housed in data centers at various geographical locations (also not shown). Separate groupings of node C.R.s 1616 within grouped computing resources 1614 may include grouped compute, network, memory or storage resources that may be configured or allocated to support one or more workloads. In at least one embodiment, several node C.R.s 1616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1612 may configure or otherwise control one or more node C.R.s 1616(1) 1616(N) and/or grouped computing resources 1614. In at least one embodiment, resource orchestrator 1612 may include a software design infrastructure (SDI) management entity for the data center 1600. The resource orchestrator 1612 may include hardware, software, or some combination thereof.

In at least one embodiment, as shown in FIG. 16, framework layer 1620 may include a job scheduler 1633, a configuration manager 1634, a resource manager 1636, and/or a distributed file system 1638. The framework layer 1620 may include a framework to support software 1632 of software layer 1630 and/or one or more application(s) 1642 of application layer 1640. The software 1632 or application(s) 1642 may respectively include web-based service software or applications, such as those provided by Amazon Web Services, Google Cloud and Microsoft Azure. The framework layer 1620 may be, but is not limited to, a type of free and open-source software web application framework such as Apache Spark™ (hereinafter "Spark") that may utilize distributed file system 1638 for large-scale data processing (e.g., "big data"). In at least one embodiment, job scheduler 1633 may include a Spark driver to facilitate scheduling of workloads supported by various layers of data center 1600. The configuration manager 1634 may be capable of configuring different layers such as software layer 1630 and framework layer 1620 including Spark and distributed file system 1638 for supporting large-scale data processing. The resource manager 1636 may be capable of managing clustered or grouped computing resources mapped to or allocated for support of distributed file system 1638 and job scheduler 1633. In at least one embodiment, clustered or grouped computing resources may include grouped computing resource 1614 at data center infrastructure layer 1610. The resource manager 1636 may coordinate with resource orchestrator 1612 to manage these mapped or allocated computing resources.

In at least one embodiment, software 1632 included in software layer 1630 may include software used by at least portions of node C.R.s 1616(1) 1616(N), grouped computing resources 1614, and/or distributed file system 1638 of framework layer 1620. One or more types of software may include, but are not limited to, Internet web page search software, e-mail virus scan software, database software, and streaming video content software.

In at least one embodiment, application(s) 1642 included in application layer 1640 may include one or more types of applications used by at least portions of node C.R.s 1616(1) 1616(N), grouped computing resources 1614, and/or distributed file system 1638 of framework layer 1620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1634, resource manager 1636, and resource orchestrator 1612 may implement any number and type of self-modifying actions based on any amount and type of data acquired in any technically feasible fashion. Self-modifying actions may relieve a data center operator of data center 1600 from making possibly bad configuration decisions and possibly avoiding underutilized and/or poor performing portions of a data center.

The data center 1600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1600. In at least one embodiment, trained or deployed machine learning models corresponding to one or more neural networks may be used to infer or predict information using resources described above with respect to the data center 1600 by using weight parameters calculated through one or more training techniques, such as but not limited to those described herein.

In at least one embodiment, the data center 1600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1500 of FIG. 15—e.g., each device may include similar components, features, and/or functionality of the computing device(s) 1500. In addition, where backend devices (e.g., servers, NAS, etc.) are implemented, the backend devices may be included as part of a data center 1600, an example of which is described in more detail herein with respect to FIG. 16.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1500 described herein with respect to FIG. 15. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C. or elements A. B, and C. In addition, "at least one of element A or element B" may include at least one of element A, at least one of element B. or at least one of element A and at least one of element B. Further, "at least one of element A and element B" may include at least one of element A, at least one of element B. or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   generating a RADAR point cloud based at least on RADAR data associated with a plurality of RADAR scans performed using one or more RADAR sensors, the generating of the RADAR point cloud including:
   transforming the RADAR data from different RADAR scans into a common coordinate system;
   removing one or more portions of the RADAR data that correspond to one or more dynamic objects;
   filtering the RADAR data based at least on strengths of corresponding RADAR return signals with respect to a signal strength threshold that is one or more of:
   a dynamic threshold that varies with respect to generation of different RADAR point clouds; or
   based at least on a target number of RADAR data points to include in the RADAR point cloud; and
   aggregating RADAR data sets of the RADAR data that remain after the filtering into the RADAR point cloud such that the RADAR point cloud includes a subset of the RADAR data and comprises an aggregation of multiple data sets corresponding to multiple RADAR scans.

2. The method of claim 1, wherein the target number of RADAR data points is based at least on a target localization precision related to performing localization using the RADAR point cloud.

3. The method of claim 1, wherein the one or more RADAR sensors is disposed on an ego-machine and wherein the transforming the RADAR data includes compensating for movement of the ego-machine between two or more RADAR scans of the plurality of RADAR scans.

4. The method of claim 1, wherein the RADAR data is obtained from RADAR scans performed using the one or more RADAR sensors.

5. The method of claim 1, wherein the removing the one or more portions of the RADAR data that correspond to one or more dynamic objects includes performing object tracking to identify one or more of the one or more dynamic objects.

6. A system comprising:
one or more circuits to:
obtain RADAR data associated with one or more RADAR scans performed using one or more RADAR sensors, the RADAR data including a plurality of individual RADAR data points respectively corresponding to individual RADAR reflections corresponding to individual locations in an environment of an ego-machine;
select RADAR data points of the RADAR data based at least on a target number of RADAR data points to include in a RADAR point cloud; and
generate the RADAR point cloud based at least on the RADAR data points as selected such that the RADAR point cloud comprises an aggregation of one or more RADAR data sets corresponding to the one or more RADAR scans.

7. The system of claim 6, wherein the one or more circuits are further to determine a signal strength threshold based at least on the target number of RADAR data points, and wherein selecting of the RADAR data points is based at least on the signal strength threshold.

8. The system of claim 7, wherein the signal strength threshold is dynamically determined based at least on a relationship between a total number of RADAR data points included in the RADAR data and the target number of RADAR data points.

9. The system of claim 6, wherein the target number of RADAR data points is based at least on a target localization precision related to performing localization using the RADAR point cloud.

10. The system of claim 6, wherein the generating the RADAR point cloud further includes transforming the RADAR data into a common coordinate system.

11. The system of claim 10, wherein the one or more RADAR sensors are disposed on the ego-machine and wherein the transforming the RADAR data includes compensating for movement of the ego-machine between two or more scans.

12. The system of claim 6, wherein the generating the RADAR point cloud further includes removing one or more portions of the RADAR data that correspond to one or more dynamic objects.

13. The system of claim 6, wherein the one or more RADAR sensors are disposed on the ego-machine, and wherein the RADAR data is used to generate the RADAR point cloud in response to RADAR scans that generate the RADAR data individually being performed using individual RADAR sensors of the one or more RADAR sensors.

14. A system comprising:
one or more processing units to:
obtain RADAR data associated with one or more RADAR scans using one or more RADAR sensors;
select RADAR data points of the RADAR data based at least on a signal strength threshold, the signal strength threshold being determined based at least on a target number of RADAR data points to include in a RADAR point cloud; and
generate the RADAR point cloud based at least on the RADAR data points as selected.

15. The system of claim 14, wherein the target number of RADAR data points is determined based at least on one or more of: a target resolution of the RADAR point cloud, a target data size, one or more RADAR map parameters, one or more RADAR localization parameters, a target spatial coverage of the RADAR point cloud, or a target angular coverage of the RADAR point cloud.

16. The system of claim 14, wherein the generating the RADAR point cloud further includes transforming the RADAR data into a common coordinate system.

17. The system of claim 14, wherein the generating the RADAR point cloud further includes removing one or more portions of the RADAR data that correspond to one or more dynamic objects.

18. The system of claim 14, wherein the one or more RADAR sensors are disposed on an ego-machine and wherein the RADAR data is used to generate the RADAR point cloud in response to RADAR scans that generate the RADAR data individually being performed using individual RADAR sensors of the one or more RADAR sensors.

19. The system of claim 14, wherein the system comprises one or more of:
a control system for an autonomous or semi-autonomous machine;
a perception system for an autonomous or semi-autonomous machine;
a system that performs simulation operations;
a system that performs deep learning operations;
a system that generates synthetic data;
a system that generates multi-dimensional assets using a collaborative content platform;
a system implemented using an edge device;
a system implemented using a robot;
a system incorporating one or more virtual machines (VMs);
a system implemented at least partially in a data center; or
a system implemented at least partially using cloud computing resources.

* * * * *